US012576003B2

(12) United States Patent
Zegenhagen

(10) Patent No.: US 12,576,003 B2
(45) Date of Patent: Mar. 17, 2026

(54) DEVICE FOR STIMULATING A HUMAN EROGENOUS ZONE USING A VARIABLE PRESSURE FIELD

(71) Applicant: NOVOLUTO GmbH, Berlin (DE)

(72) Inventor: Mark Tobias Zegenhagen, Berlin (DE)

(73) Assignee: NOVOLUTO GmbH, Berlin (DE)

( * ) Notice: Subject to any disclaimer, the term of this patent is extended or adjusted under 35 U.S.C. 154(b) by 947 days.

(21) Appl. No.: 17/601,392

(22) PCT Filed: Sep. 30, 2019

(86) PCT No.: PCT/DE2019/100860
§ 371 (c)(1),
(2) Date: Oct. 4, 2021

(87) PCT Pub. No.: WO2020/200339
PCT Pub. Date: Oct. 8, 2020

(65) Prior Publication Data

US 2022/0211570 A1 Jul. 7, 2022

(30) Foreign Application Priority Data

Apr. 4, 2019 (WO) ................ PCT/DE2019/100309

(51) Int. Cl.
*A61H 19/00* (2006.01)
*A61H 9/00* (2006.01)

(52) U.S. Cl.
CPC ........... *A61H 19/34* (2013.01); *A61H 9/0007* (2013.01); *A61H 9/0057* (2013.01); (Continued)

(58) Field of Classification Search
CPC .... A61H 19/34; A61H 9/0007; A61H 9/0057; A61H 2201/0153; A61H 2201/0157; A61H 2201/123; A61H 2201/5005
See application file for complete search history.

(56) References Cited

U.S. PATENT DOCUMENTS 15,626 A 8/1856 Tillotson
787,443 A 4/1905 Godman et al.
(Continued)

FOREIGN PATENT DOCUMENTS

AU 2011351297 7/2013
AU 2018200317 2/2018
(Continued)

OTHER PUBLICATIONS

European Patent Office, "Notification under Article 94 (3) EPC," issued in connection with European Application No. 19161328.0 on Nov. 2, 2020, 8 pages (includes English translation).
(Continued)

*Primary Examiner* — Samuel G Gilbert
(74) *Attorney, Agent, or Firm* — Hanley, Flight & Zimmerman, LLC

(57) ABSTRACT

A device for stimulating a human erogenous zone includes a housing; a drive device; a pressure chamber at least partially surrounded by a chamber wall; a chamber wall portion, the drive device to cause the chamber wall portion to repeatedly move between different wall positions to cause a volume of the pressure chamber to vary to cause pressure in the pressure chamber to modulate between positive pressures and negative pressures relative to an ambient pressure; a housing opening, the positive pressures and the negative pressures to be output via the housing opening; and a seal to seal the pressure chamber with respect to an ambient environment, the drive device including a coil through which an electrical current is to flow, the drive device disposed in a magnetic field and coupled to the chamber wall portion to transmit the drive movement to cause the chamber wall portion to move.

20 Claims, 16 Drawing Sheets

(52) U.S. Cl.
CPC ................ *A61H 2201/0153* (2013.01); *A61H 2201/0157* (2013.01); *A61H 2201/123* (2013.01); *A61H 2201/5005* (2013.01)

(56) References Cited

U.S. PATENT DOCUMENTS 809,810 A 1/1906 Jost
847,360 A 3/1907 Osius
907,749 A 12/1908 Davenport
1,042,058 A 10/1912 Van Hook
1,179,129 A 4/1916 Maxam
1,378,922 A 5/1921 Ward
1,502,440 A 7/1924 Robert
1,730,535 A 10/1929 Rudolph
1,732,310 A 10/1929 Naibert
1,762,692 A 6/1930 Lair
1,805,675 A 5/1931 Rudolph
1,882,040 A 10/1932 Roehm
1,898,652 A 2/1933 Williams
1,914,290 A 6/1933 Popkin
1,941,665 A 1/1934 De Walt
1,964,590 A 6/1934 Muller
1,998,696 A 4/1935 Andis
2,017,284 A 10/1935 Lembright
2,052,098 A 8/1936 Lockett
2,064,418 A 12/1936 Derringer
2,076,410 A 4/1937 McGerry
2,112,646 A 3/1938 Biederman
2,154,427 A 4/1939 Andres
2,189,116 A 2/1940 Niemiec
2,218,081 A 10/1940 Brichieri-Colombi et al.
2,218,443 A 10/1940 Tweddle
2,234,102 A 3/1941 Andres
2,314,590 A 3/1943 Mccarty
2,470,660 A 5/1949 Snyder
2,519,790 A 8/1950 Quinn
2,561,034 A 7/1951 Phillips
2,616,417 A 11/1952 Holbrook
2,661,736 A 12/1953 Schwartz
2,674,994 A 4/1954 Murphy
3,396,720 A 8/1968 Shigeyuki
3,619,673 A * 11/1971 Helms ................ H02K 41/0356 310/13
3,818,904 A 6/1974 Kawada
3,841,323 A 10/1974 Stoughton
3,906,940 A 9/1975 Kawada
3,910,262 A 10/1975 Stoughton
4,033,338 A 7/1977 Igwebike
4,088,128 A 5/1978 Mabuchi
4,175,554 A 11/1979 Gerow
4,203,431 A 5/1980 Abura et al.
4,232,661 A 11/1980 Christensen
4,312,350 A 1/1982 Doan
4,318,038 A * 3/1982 Munehiro .......... H02K 41/0356 400/322
4,428,368 A 1/1984 Torii
4,439,699 A * 3/1984 Brende .............. H02K 41/0356 360/266.8
4,612,592 A * 9/1986 Frandsen ........... H02K 41/0356
4,758,750 A * 7/1988 Itagaki ................. H02K 41/031 310/27
4,813,403 A * 3/1989 Endo .................. A61H 23/0236 601/46
4,900,316 A 2/1990 Yamamoto
5,003,966 A 4/1991 Saka et al.
D323,034 S 1/1992 Reinstein
5,127,396 A 7/1992 McAllister
D329,563 S 9/1992 Rasmussen
5,336,158 A 8/1994 Huggins et al.
D351,236 S 10/1994 Held
5,377,701 A * 1/1995 Fang ...................... A61H 9/005 132/271
5,377,702 A 1/1995 Sakurai
D359,563 S 6/1995 Chi
5,440,183 A * 8/1995 Denne ................... F15B 15/088 310/12.26
5,501,650 A 3/1996 Gellert
5,593,381 A 1/1997 Tannenbaum et al.
5,662,593 A 9/1997 Tillman et al.
5,690,603 A 11/1997 Kain
5,693,002 A 12/1997 Tucker et al.
5,725,473 A 3/1998 Taylor
5,813,973 A 9/1998 Gloth
D402,905 S 12/1998 Kanza et al.
D414,582 S 9/1999 Hwang
D419,893 S 2/2000 Cheng
6,099,463 A 8/2000 Hockhalter
D443,057 S 5/2001 Hovland et al.
D449,690 S 10/2001 Hovland et al.
6,319,211 B1 11/2001 Ito et al.
D463,862 S 10/2002 Lau
6,464,653 B1 10/2002 Hovland et al.
6,517,511 B2 2/2003 Yao
D478,385 S 8/2003 Dirks et al.
6,666,875 B1 12/2003 Sakurai et al.
6,723,060 B2 4/2004 Miller
6,733,438 B1 5/2004 Dann et al.
6,758,826 B2 7/2004 Luettgen et al.
D509,301 S 9/2005 Talbot et al.
6,949,067 B1 9/2005 Dann et al.
D510,441 S 10/2005 Harris, Jr. et al.
6,964,643 B2 11/2005 Hovland et al.
D523,561 S 6/2006 Telford
D523,562 S 6/2006 Telford
D523,963 S 6/2006 Telford
7,079,898 B2 7/2006 Cohn
D545,446 S 6/2007 Wu
7,318,811 B1 1/2008 Corbishley
7,377,890 B2 5/2008 Liu
7,431,718 B2 10/2008 Ikadai
7,530,944 B1 5/2009 Kain
7,534,203 B2 5/2009 Gil
D609,361 S 2/2010 McGarry et al.
D612,510 S 3/2010 Byle
7,682,321 B2 3/2010 Naldoni
D613,417 S 4/2010 Imboden et al.
D621,950 S 8/2010 Seki et al.
7,828,717 B2 11/2010 Lee
D637,308 S 5/2011 Imboden et al.
D637,309 S 5/2011 Park
7,967,740 B2 6/2011 Mertens et al.
D649,657 S 11/2011 Petersen et al.
D652,523 S 1/2012 Bradley et al.
8,100,887 B2 1/2012 Weston et al.
8,147,399 B2 4/2012 Gloth
D665,091 S 8/2012 Mistry et al.
D666,303 S 8/2012 Ding et al.
D671,226 S 11/2012 Aulwes et al.
8,371,999 B2 2/2013 DeAlva
8,382,656 B1 2/2013 Brown
D681,225 S 4/2013 Chen
D681,842 S 5/2013 Chang
D689,382 S 9/2013 Juhng et al.
D692,570 S 10/2013 Luzon et al.
8,556,798 B2 10/2013 Mertens et al.
8,568,342 B2 10/2013 Shaviv
D693,247 S 11/2013 Juhng et al.
8,579,837 B1 11/2013 Makower et al.
8,647,255 B2 2/2014 Levy
8,708,998 B2 4/2014 Weston et al.
D704,345 S 5/2014 Tai
D706,440 S 6/2014 Hahr et al.
D706,441 S 6/2014 Hahr et al.
D706,444 S 6/2014 Hahr et al.
D708,440 S 7/2014 Owen et al.
8,784,297 B2 7/2014 Mertens et al.
8,821,421 B2 9/2014 Imboden et al.
8,874,215 B2 10/2014 Forsell
8,876,760 B2 11/2014 Bosman et al.
D723,160 S 2/2015 Rodan et al.
D723,707 S 3/2015 Matsuura
D723,711 S 3/2015 Elliott
9,022,925 B2 5/2015 Nan

(56) References Cited

U.S. PATENT DOCUMENTS

| | | | |
|---|---|---|---|
| RE45,585 | E | 6/2015 | Peddicord |
| 9,107,797 | B2 | 8/2015 | Levy |
| 9,114,056 | B2 | 8/2015 | Imboden et al. |
| D739,951 | S | 9/2015 | Tai |
| 9,132,058 | B2 | 9/2015 | Imboden et al. |
| D759,256 | S | 6/2016 | Chen |
| D759,261 | S | 6/2016 | Son et al. |
| 9,370,656 | B2 | 6/2016 | Forsell |
| RE46,163 | E | 9/2016 | Peddicord |
| D768,309 | S | 10/2016 | Hetzel |
| D768,310 | S | 10/2016 | Hetzel |
| D771,389 | S | 11/2016 | Since |
| D771,828 | S | 11/2016 | Sedic |
| D772,419 | S | 11/2016 | Courtion et al. |
| D773,061 | S | 11/2016 | Loebel et al. |
| D773,065 | S | 11/2016 | Driscoll et al. |
| 9,486,388 | B2 | 11/2016 | Wright, Jr. |
| 9,498,404 | B2 | 11/2016 | Murison |
| D773,823 | S | 12/2016 | Wong |
| D793,571 | S | 8/2017 | Turchenko |
| D794,854 | S | 8/2017 | Zepter |
| D796,054 | S | 8/2017 | Chen |
| D796,055 | S | 8/2017 | Chen |
| 9,737,457 | B2 | 8/2017 | Allen |
| 9,737,458 | B1 | 8/2017 | Olivares et al. |
| D797,302 | S | 9/2017 | Vahlensieck et al. |
| 9,763,851 | B2 | 9/2017 | Lenke |
| D802,784 | S | 11/2017 | Lee |
| D804,332 | S | 12/2017 | Lim et al. |
| D805,781 | S | 12/2017 | Szymanski et al. |
| 9,849,061 | B2 | 12/2017 | Lenke |
| D809,150 | S | 1/2018 | Nolasco et al. |
| D809,170 | S | 1/2018 | Marzynski |
| 9,855,186 | B2 | 1/2018 | Goldenberg et al. |
| D809,945 | S | 2/2018 | Prommel et al. |
| 9,889,064 | B1 | 2/2018 | Olivares et al. |
| 9,931,271 | B2 | 4/2018 | Peter |
| 9,937,097 | B2 | 4/2018 | Lenke |
| D822,843 | S | 7/2018 | Lenke |
| D825,073 | S | 8/2018 | Enke |
| 10,085,913 | B2 | 10/2018 | Blenk et al. |
| D846,754 | S | 4/2019 | Nelson et al. |
| 10,342,728 | B2 | 7/2019 | Nelson et al. |
| 10,675,208 | B2 | 6/2020 | Nelson et al. |
| 10,857,063 | B2 | 12/2020 | Lenke |
| 10,973,731 | B2 | 4/2021 | Taskinen et al. |
| 11,039,978 | B2 | 6/2021 | Forsell |
| 11,090,220 | B2 | 8/2021 | Lenke |
| 11,103,418 | B2 | 8/2021 | Lenke |
| 11,484,463 | B2 | 11/2022 | Witt |
| 12,251,351 | B2 | 3/2025 | Zegenhagen |
| 2001/0041848 | A1 | 11/2001 | Ito et al. |
| 2002/0120219 | A1 | 8/2002 | Hovland et al. |
| 2002/0198488 | A1 | 12/2002 | Yao |
| 2003/0114804 | A1 | 6/2003 | Putzer |
| 2003/0125768 | A1 | 7/2003 | Peter |
| 2003/0176817 | A1 | 9/2003 | Chang |
| 2004/0102822 | A1 | 5/2004 | Cohn |
| 2004/0193079 | A1 | 9/2004 | Siddhartha |
| 2004/0236254 | A1 | 11/2004 | Nichols |
| 2004/0260209 | A1 | 12/2004 | Ella et al. |
| 2004/0260210 | A1 | 12/2004 | Ella et al. |
| 2004/0260212 | A1 | 12/2004 | Cho |
| 2005/0159684 | A1 | 7/2005 | Ikadai |
| 2005/0159760 | A1 | 7/2005 | Ikadai et al. |
| 2005/0203446 | A1 | 9/2005 | Takashima |
| 2005/0256369 | A1 | 11/2005 | Gloth |
| 2005/0273024 | A1 | 12/2005 | Nan |
| 2006/0089572 | A1 | 4/2006 | Byon |
| 2006/0116612 | A1 | 6/2006 | Drysdale |
| 2006/0229494 | A1 | 10/2006 | Wu |
| 2007/0049792 | A1 | 3/2007 | Levy |
| 2007/0100259 | A1 | 5/2007 | Nan |
| 2007/0185553 | A1 | 8/2007 | Kennedy |
| 2008/0011310 | A1 | 1/2008 | Anderson |
| 2008/0071138 | A1 | 3/2008 | Mertens et al. |
| 2008/0091060 | A1 | 4/2008 | Heilman |
| 2008/0106896 | A1 | 5/2008 | Liu et al. |
| 2008/0275386 | A1 | 11/2008 | Myers |
| 2008/0304984 | A1 | 12/2008 | Chan |
| 2008/0312674 | A1 | 12/2008 | Chen et al. |
| 2009/0016563 | A1 | 1/2009 | Wei et al. |
| 2009/0038069 | A1 | 2/2009 | Heilman |
| 2009/0048581 | A1 | 2/2009 | Sebban |
| 2009/0069629 | A1 | 3/2009 | Calvo |
| 2009/0099413 | A1 | 4/2009 | Kobashikawa et al. |
| 2009/0118573 | A1 | 5/2009 | Tsao |
| 2009/0275796 | A1 | 11/2009 | Gil |
| 2009/0306577 | A1 | 12/2009 | Akridge et al. |
| 2010/0056963 | A1 | 3/2010 | Shaviv |
| 2010/0298745 | A1 | 11/2010 | Liu et al. |
| 2011/0034837 | A1 | 2/2011 | Lee |
| 2011/0098613 | A1 | 4/2011 | Thomas et al. |
| 2011/0133910 | A1 | 6/2011 | Alarcon |
| 2011/0218395 | A1 | 9/2011 | Stout |
| 2011/0230802 | A1 | 9/2011 | Nan |
| 2011/0288370 | A1 | 11/2011 | Orten et al. |
| 2011/0295162 | A1 | 12/2011 | Chang et al. |
| 2012/0150076 | A1 | 6/2012 | Clarvoe |
| 2012/0330097 | A1 | 12/2012 | Lee |
| 2013/0012769 | A1 | 1/2013 | Carlson |
| 2013/0060081 | A1 | 3/2013 | Carter et al. |
| 2013/0109913 | A1 | 5/2013 | Imboden et al. |
| 2013/0116503 | A1 | 5/2013 | Mertens et al. |
| 2013/0226050 | A1 | 8/2013 | Lee |
| 2013/0237751 | A1 | 9/2013 | Alexander |
| 2013/0261385 | A1 | 10/2013 | Zipper |
| 2013/0303975 | A1 | 11/2013 | Gvodas, Jr. |
| 2014/0046127 | A1 | 2/2014 | Topolovac et al. |
| 2014/0088351 | A1 | 3/2014 | Murison |
| 2014/0088468 | A1 | 3/2014 | Murison |
| 2014/0088470 | A1 | 3/2014 | Topolovac et al. |
| 2014/0135798 | A1 | 5/2014 | David |
| 2014/0142374 | A1 | 5/2014 | Makower et al. |
| 2014/0179994 | A1 | 6/2014 | Topolovac et al. |
| 2014/0188017 | A1 | 7/2014 | Wu |
| 2014/0194794 | A1 | 7/2014 | Sedic |
| 2014/0228629 | A1 | 8/2014 | Baetica et al. |
| 2014/0236151 | A1 | 8/2014 | Lee |
| 2014/0243590 | A1 | 8/2014 | Fang et al. |
| 2014/0309565 | A1 | 10/2014 | Allen |
| 2014/0350333 | A1 | 11/2014 | Stout |
| 2015/0000678 | A1 | 1/2015 | Buckler et al. |
| 2015/0003644 | A1 | 1/2015 | George et al. |
| 2015/0105609 | A1 | 4/2015 | Jochum |
| 2015/0133832 | A1 | 5/2015 | Courtion et al. |
| 2015/0133833 | A1 | 5/2015 | Bradley et al. |
| 2015/0164678 | A1 | 6/2015 | Lee et al. |
| 2015/0174387 | A1 | 6/2015 | McInnes et al. |
| 2015/0196453 | A1 | 7/2015 | Wu |
| 2015/0196455 | A1 | 7/2015 | Mertens et al. |
| 2015/0328081 | A1 | 11/2015 | Goldenberg et al. |
| 2015/0351999 | A1 | 12/2015 | Brouse |
| 2015/0366751 | A1 | 12/2015 | Stemple |
| 2016/0000647 | A1 | 1/2016 | Eberhardt |
| 2016/0015595 | A1 | 1/2016 | Blenk et al. |
| 2016/0022533 | A1 | 1/2016 | Makower et al. |
| 2016/0045392 | A1 | 2/2016 | Massey et al. |
| 2016/0058509 | A1 | 3/2016 | Van De Wouw et al. |
| 2016/0058620 | A1 | 3/2016 | George et al. |
| 2016/0074276 | A1 | 3/2016 | Scheuring et al. |
| 2016/0120375 | A1 | 5/2016 | Philips |
| 2016/0120737 | A1 | 5/2016 | Sedic |
| 2016/0128897 | A1 | 5/2016 | George et al. |
| 2016/0136036 | A1 | 5/2016 | Cai |
| 2016/0151236 | A1 | 6/2016 | Makower et al. |
| 2016/0175186 | A1 | 6/2016 | Shadduck |
| 2016/0213557 | A1 | 7/2016 | Lenke |
| 2016/0235621 | A1 | 8/2016 | Choe |
| 2016/0296417 | A1 | 10/2016 | Topolovac et al. |
| 2017/0027809 | A1 | 2/2017 | Lenke |
| 2017/0027810 | A1 | 2/2017 | Murison |
| 2017/0065483 | A1 | 3/2017 | Lenke |
| 2017/0095399 | A1 | 4/2017 | Lee |

(56) References Cited

U.S. PATENT DOCUMENTS

| | | | |
|---|---|---|---|
| 2017/0100303 A1 | 4/2017 | Kotlov | |
| 2017/0135895 A1 | 5/2017 | Jafri | |
| 2017/0156971 A1 | 6/2017 | Topolovac et al. | |
| 2017/0196801 A1 | 7/2017 | Ghazvini et al. | |
| 2017/0202731 A1 | 7/2017 | Goldfarb et al. | |
| 2017/0216135 A1 | 8/2017 | Lenke | |
| 2017/0281457 A1 | 10/2017 | Witt | |
| 2017/0319430 A1 | 11/2017 | Shadduck | |
| 2017/0333282 A1 | 11/2017 | Swartz | |
| 2017/0367925 A1 | 12/2017 | Allen | |
| 2018/0031089 A1 | 2/2018 | Wong et al. | |
| 2018/0031090 A1 | 2/2018 | Wong et al. | |
| 2018/0071167 A1 | 3/2018 | Lee | |
| 2018/0092799 A1 | 4/2018 | Lenke | |
| 2018/0125748 A1 | 5/2018 | Goldenberg et al. | |
| 2018/0153764 A1 | 6/2018 | Lenke | |
| 2018/0243161 A1 | 8/2018 | Lenke | |
| 2018/0243162 A1 | 8/2018 | Lenke | |
| 2018/0325769 A1 | 11/2018 | Scheuring et al. | |
| 2019/0012884 A1 | 1/2019 | Xu et al. | |
| 2019/0015291 A1 | 1/2019 | Sedic | |
| 2019/0083354 A1* | 3/2019 | Pahl | A61H 9/005 |
| 2020/0046599 A1 | 2/2020 | Sedic | |
| 2020/0069850 A1 | 3/2020 | Beadle et al. | |
| 2020/0085676 A1 | 3/2020 | Haddock et al. | |
| 2020/0093681 A1 | 3/2020 | Haddock et al. | |
| 2020/0188221 A1 | 6/2020 | Lenke | |
| 2020/0214932 A1* | 7/2020 | Pahl | A61H 9/005 |
| 2020/0237609 A1 | 7/2020 | Kirsten et al. | |
| 2020/0281808 A1 | 9/2020 | Kirsten et al. | |
| 2020/0330270 A1 | 10/2020 | Foster et al. | |
| 2021/0038468 A1 | 2/2021 | Lenke | |
| 2021/0038469 A1 | 2/2021 | Zegenhagen et al. | |
| 2021/0038470 A1 | 2/2021 | Zegenhagen | |
| 2021/0052463 A1 | 2/2021 | Lenke | |
| 2022/0211569 A1 | 7/2022 | Lenke | |
| 2022/0226186 A1 | 7/2022 | Lenke | |

FOREIGN PATENT DOCUMENTS

| | | |
|---|---|---|
| AU | 2014323661 | 3/2018 |
| AU | 2015386680 | 3/2018 |
| CA | 2923526 | 3/2015 |
| CA | 2978495 | 9/2016 |
| CA | 2943097 | 10/2017 |
| CH | 329193 | 4/1958 |
| CN | 2153351 | 1/1994 |
| CN | 2157772 | 3/1994 |
| CN | 2198900 | 5/1995 |
| CN | 2696611 Y | 5/2005 |
| CN | 2765609 | 3/2006 |
| CN | 1299659 | 2/2007 |
| CN | 201067499 | 6/2008 |
| CN | 201101685 | 8/2008 |
| CN | 201119979 | 9/2008 |
| CN | 201139737 | 10/2008 |
| CN | 101401739 | 4/2009 |
| CN | 101848688 | 9/2010 |
| CN | 102151219 | 8/2011 |
| CN | 202154785 | 3/2012 |
| CN | 102600034 | 7/2012 |
| CN | 102743275 | 10/2012 |
| CN | 102743276 | 10/2012 |
| CN | 202715029 | 2/2013 |
| CN | 103070767 A | 5/2013 |
| CN | 103517697 | 1/2014 |
| CN | 103961246 | 8/2014 |
| CN | 104248500 | 12/2014 |
| CN | 104284648 | 1/2015 |
| CN | 204931954 | 1/2016 |
| CN | 105616124 | 6/2016 |
| CN | 205494128 | 8/2016 |
| CN | 107137218 | 9/2017 |
| CN | 108599516 | 9/2018 |
| DE | 278733 | 8/1912 |
| DE | 538578 | 11/1931 |
| DE | 582196 | 8/1933 |
| DE | 1463673 | 5/1939 |
| DE | 856788 | 11/1952 |
| DE | 1703184 | 7/1955 |
| DE | 7237890 | 3/1973 |
| DE | 3222467 | 12/1983 |
| DE | 3515691 A1 | 2/1986 |
| DE | 3515691 C2 | 8/1990 |
| DE | 9309994 | 10/1993 |
| DE | 4243876 | 6/1994 |
| DE | 4304091 | 8/1994 |
| DE | 4341790 | 6/1995 |
| DE | 69108892 | 12/1995 |
| DE | 19505047 C1 | 1/1997 |
| DE | 19615557 A1 | 10/1997 |
| DE | 29809041 | 11/1998 |
| DE | 29809828 | 11/1998 |
| DE | 19853353 | 6/2000 |
| DE | 10011289 | 9/2001 |
| DE | 20112384 | 10/2001 |
| DE | 20106065 | 11/2001 |
| DE | 10100795 | 8/2002 |
| DE | 10218124 | 11/2003 |
| DE | 202005004843 | 7/2005 |
| DE | 102004017702 | 10/2005 |
| DE | 102006016401 | 8/2007 |
| DE | 102005042092 | 10/2007 |
| DE | 202007016874 | 2/2008 |
| DE | 202007019339 | 1/2012 |
| DE | 202012005414 | 6/2012 |
| DE | 102012015471 | 2/2014 |
| DE | 102013100943 | 7/2014 |
| DE | 212013000027 | 8/2014 |
| DE | 102013110501 | 3/2015 |
| DE | 202014009296 U1 | 3/2015 |
| DE | 202015005041 | 10/2015 |
| DE | 202015105689 | 11/2015 |
| DE | 102016105019 | 7/2017 |
| DE | 202016008414 | 11/2017 |
| DE | 202016008435 | 12/2017 |
| DE | 102017104052 | 8/2018 |
| DE | 202017104021 | 10/2018 |
| DE | 202019104701 | 11/2019 |
| EP | 0251430 | 3/1987 |
| EP | 0365230 | 4/1990 |
| EP | 472965 | 3/1992 |
| EP | 0503027 | 4/1995 |
| EP | 1477149 | 11/2004 |
| EP | 1554947 | 7/2005 |
| EP | 1143909 | 6/2008 |
| EP | 2042147 | 4/2009 |
| EP | 2645979 | 10/2013 |
| EP | 2674142 | 12/2013 |
| EP | 2712601 | 4/2014 |
| EP | 2777680 | 9/2014 |
| EP | 2895135 | 7/2015 |
| EP | 3031438 | 6/2016 |
| EP | 3153148 A1 | 4/2017 |
| EP | 3260106 | 12/2017 |
| EP | 3305266 | 4/2018 |
| EP | 3357383 | 8/2018 |
| EP | 2976057 | 12/2018 |
| FR | 2627693 A1 | 9/1989 |
| FR | 2746639 | 10/1997 |
| GB | 191018973 | 11/1910 |
| GB | 1049972 | 11/1966 |
| GB | 1060507 | 3/1967 |
| GB | 1077143 A | 7/1967 |
| GB | 2137097 | 10/1984 |
| JP | S4728781 Y | 8/1972 |
| JP | 52-157289 | 11/1977 |
| JP | 53135768 | 11/1978 |
| JP | 53149442 | 12/1978 |
| JP | S547433 Y | 4/1979 |
| JP | 54115952 | 9/1979 |
| JP | 57099986 | 6/1982 |
| JP | H05037234 | 5/1993 |
| JP | H6209975 | 8/1994 |

(56) References Cited

FOREIGN PATENT DOCUMENTS

| | | |
|---|---|---|
| JP | 2555943 | 11/1997 |
| JP | 2000197518 | 7/2000 |
| JP | 2005288079 | 10/2005 |
| JP | 2008125577 | 6/2008 |
| JP | 2011-083423 | 4/2011 |
| JP | 2011-188921 A | 9/2011 |
| JP | 2011188921 | 9/2011 |
| JP | 2017164130 | 9/2017 |
| KR | 2000-0002800 | 2/2000 |
| KR | 10-2001-0093088 | 10/2001 |
| KR | 200439531 | 4/2008 |
| KR | 20130068426 | 6/2013 |
| RU | 2014059 | 6/1994 |
| RU | 2005134513 | 4/2006 |
| TW | 201507719 | 3/2015 |
| TW | 201542190 | 11/2015 |
| TW | 201603797 | 2/2016 |
| WO | WO9205758 | 4/1992 |
| WO | 199611767 | 4/1996 |
| WO | 00028939 | 5/2000 |
| WO | 2004004610 | 1/2004 |
| WO | 2004058134 | 7/2004 |
| WO | 2005061042 | 7/2005 |
| WO | 2005099366 | 10/2005 |
| WO | 2005110331 | 11/2005 |
| WO | 2006058291 | 6/2006 |
| WO | 2006063461 | 6/2006 |
| WO | 2007119034 | 10/2007 |
| WO | 2007121107 | 10/2007 |
| WO | 2008002625 | 1/2008 |
| WO | 2008028076 | 3/2008 |
| WO | 2008052151 | 5/2008 |
| WO | 2008107902 | 9/2008 |
| WO | 2009012172 | 1/2009 |
| WO | 2009087627 | 7/2009 |
| WO | 2010149168 | 12/2010 |
| WO | 2011146948 | 11/2011 |
| WO | 2012062256 | 5/2012 |
| WO | 2012152297 | 11/2012 |
| WO | 2013003954 | 1/2013 |
| WO | 2013067367 | 5/2013 |
| WO | 2013134388 | 9/2013 |
| WO | 2013138658 | 9/2013 |
| WO | 2013178223 | 12/2013 |
| WO | 2014008606 | 1/2014 |
| WO | 2014047718 | 4/2014 |
| WO | 2014048884 | 4/2014 |
| WO | 2014081600 | 5/2014 |
| WO | 2014085736 | 6/2014 |
| WO | 2014127531 | 8/2014 |
| WO | 2014131110 | 9/2014 |
| WO | WO2015039787 | 3/2015 |
| WO | 2015060717 | 4/2015 |
| WO | 2015070242 | 5/2015 |
| WO | 2015096179 | 7/2015 |
| WO | 2015101790 | 7/2015 |
| WO | 2016146206 | 9/2016 |
| WO | 2016162319 A1 | 10/2016 |
| WO | 2016172653 | 10/2016 |
| WO | 2017141037 | 8/2017 |
| WO | 2017158107 | 9/2017 |
| WO | 2018065540 | 4/2018 |
| WO | 2018154134 | 8/2018 |
| WO | 2018158250 | 9/2018 |
| WO | 2019158240 | 8/2019 |
| WO | 2019192660 | 10/2019 |
| WO | 2019192661 | 10/2019 |
| WO | 2020056208 | 3/2020 |
| WO | 2020056218 | 3/2020 |

OTHER PUBLICATIONS

European Patent Office, “Extended European Search Report,” issued in connection with European Patent Application No. 21216838.9 on Apr. 5, 2022, 15 pages (includes English translation).

European Patent Office, “Transmittal of Decision / Summons,” issued in connection with opposition of European Patent No. 3705106 on Jun. 13, 2023, 37 pages (includes English translation).

“Written Submission in Preparation to/during Oral Proceedings,” filed with the European Patent Office by EIS GmBH in connection with European Patent No. 3705106 on Dec. 8, 2023, 56 pages (includes English translation).

European Patent Office, “Transmittal of Decision / Summons,” issued in connection with opposition of European Patent No. 3405158 on Jun. 14, 2021, 27 pages (includes English translation).

“Written Submission in Preparation to/during Oral Proceedings,” filed with the European Patent Office by EIS GmBH in connection with opposition of European Patent No. 3405158 on Dec. 7, 2021, 82 pages (includes English translation).

European Patent Office, “Transmittal of Decision / Summons,” issued in connection with opposition of European Patent No. 3405158 on May 18, 2022, 67 pages (includes English translation).

IP Australia, “Examination Report,” issued in connection with Australian Application No. 2017341098 on Jan. 27, 2022, 5 pages.

IP Australia, “Examination Report,” issued in connection with Australian Application No. 2017341098 on May 10, 2022, 6 pages.

IP Australia, “Examination Report,” issued in connection with Australian Application No. 2017341098 on Sep. 20, 2022, 5 pages.

IP Australia, “Examination Report,” issued in connection with Australian Application No. 2019250096 on Jul. 1, 2022, 4 pages.

IP Australia, “Examination Report,” issued in connection with Australian Application No. 2019250096 on Oct. 25, 2022, 5 pages.

Canadian Patent Office, “Office Action,” issued in connection with Canadian Patent Application No. 3098337 on Mar. 18, 2022, 5 pages.

Canadian Patent Office, “Office Action,” issued in connection with Canadian Patent Application No. 3098337 on Jan. 19, 2023, 4 pages.

German Patent and Trademark Office, “Examination Report,” issued in connection with German Application No. 102018107939 on Mar. 29, 2019, 12 pages (includes English translation).

European Patent Office, “Extended European Search Report,” issued in connection with European Patent Application No. EP 19153494.0 on Sep. 17, 2019, 12 pages (includes English translation).

European Patent Office, “Notification under Article 94 (3) EPC,” issued in connection with European Application No. 19153494.0 on Jun. 4, 2020, 8 pages (includes English translation).

European Patent Office, “Extended European Search Report,” issued in connection with European Patent Application No. 21175706.7 on Sep. 20, 2021, 12 pages (includes English translation).

European Patent Office, “Transmittal of Decision/Summons,” issued in connection with opposition of European Patent No. 3685809 on Oct. 25, 2022, 35 pages (includes English translation).

“Written Submission in Preparation to/during Oral Proceedings,” filed with the European Patent Office by EIS GmBH in connection with opposition of European Patent No. 3685809 on Mar. 24, 2023, 44 pages (includes English translation).

European Patent Office, “Transmittal of Decision / Summons,” issued in connection with opposition of European Patent No. 3685809 on Jun. 22, 2023, 283 pages (includes English translation).

“Statement of Grounds of Appeal,” filed with the European Patent Office by EIS GmbH in connection with opposition of European Patent No. 3685809 on Nov. 1, 2023, 188 pages (includes English translation).

International Searching Authority, “International Search Report,” issued in connection with International Patent Application No. PCT/DE2019/100860, dated Dec. 18, 2019, 6 pages (English translation included).

International Searching Authority, “Written Opinion,” issued in connection with International Patent Application No. PCT/DE2019/100860, dated Dec. 18, 2019, 6 pages.

Gillan et al., “Vaginal and Pelvic Floor Responses to Sexual Stimulation,” Psychophysiology, vol. 16, No. 5, Sep. 1, 1979, pp. 471-481, 12 pages.

International Searching Authority, “Search Report,” issued in connection with PCT Patent Application No. PCT/DE2019/100309, dated Jul. 15, 2019, 7 pages (English translation included).

(56) References Cited

OTHER PUBLICATIONS

International Searching Authority, "Written Opinion," issued in connection with PCT Patent Application No. PCT/DE2019/100309, dated Jul. 15, 2019, 13 pages (English translation included).
United States Patent and Trademark Office, "Notice of Filing Date Accorded to Petition and Time for Filing Patent Owner Preliminary Response," issued in connection with Case IPR2019-01444 on Aug. 14, 2019, 6 pages.
"Patent Owner's Amended Mandatory Notices Pursuant to 37 C.F.R. 42.8," filed with the United States Patent and Trademark Office in connection with case IPR2019-01444 on Aug. 26, 2019, 6 pages.
"Patent Owner's Amended Mandatory Notices Pursuant to 37 C.F.R. 42.8," filed with the United States Patent and Trademark Office in connection with case IPR2019-01444 on Sep. 30, 2019, 6 pages.
"Patent Owner's Amended Mandatory Notices Pursuant to 37 C.F.R. 42.8," filed with the United States Patent and Trademark Office in connection with case IPR2019-01444 on Oct. 23, 2019, 6 pages.
"Patent Owner's Mandatory Notices," filed with the United States Patent and Trademark Office in connection with case IPR2019-01444 on Aug. 21, 2019, 5 pages.
"Petitioner's Amended Mandatory Notices," filed with the United States Patent and Trademark Office in connection with case IPR2019-01444 on Oct. 8, 2019, 5 pages.
"Patent Owner's Preliminary Response Pursuant to 37 C.F.R. § 42.107," filed with the United States Patent and Trademark Office in connection with case IPR2019-01444 on Nov. 14, 2019, 88 pages.
"Patent Owner's Preliminary Response Pursuant to 37 C.F.R. § 42.107," Exhibit 2001, filed with the United States Patent and Trademark Office in connection with Case IPR2019-01444 on Nov. 14, 2019, 81 pages.
"Patent Owner's Preliminary Response Pursuant to 37 C.F.R. § 42.107," Exhibit 2002, filed with the United States Patent and Trademark Office in connection with Case IPR2019-01444 on Nov. 14, 2019, 36 pages.
"Patent Owner's Preliminary Response Pursuant to 37 C.F.R. § 42.107," Exhibit 2003, filed with the United States Patent and Trademark Office in connection with Case IPR2019-01444 on Nov. 14, 2019, 18 pages.
"Patent Owner's Preliminary Response Pursuant to 37 C.F.R. § 42.107," Exhibit 2004, filed with the United States Patent and Trademark Office in connection with Case IPR2019-01444 on Nov. 14, 2019, 97 pages.
"Patent Owner's Preliminary Response Pursuant to 37 C.F.R. § 42.107," Exhibit 2005, filed with the United States Patent and Trademark Office in connection with Case IPR2019-01444 on Nov. 14, 2019, 61 pages.
"Patent Owner's Preliminary Response Pursuant to 37 C.F.R. § 42.107," Exhibit 2006, filed with the United States Patent and Trademark Office in connection with Case IPR2019-01444 on Nov. 14, 2019, 60 pages.
"Patent Owner's Preliminary Response Pursuant to 37 C.F.R. § 42.107," Exhibit 2007, filed with the United States Patent and Trademark Office in connection with Case IPR2019-01444 on Nov. 14, 2019, 22 pages.
"Patent Owner's Preliminary Response Pursuant to 37 C.F.R. § 42.107," Exhibit 2008, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2009, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2010, filed with the United States Patent and Trademark Office in connection with Case IPR2019-01444 on Nov. 14, 2019, 16 pages.
"Patent Owner's Preliminary Response Pursuant to 37 C.F.R. § 42.107," Exhibit 2011, filed with the United States Patent and Trademark Office in connection with Case IPR2019-01444 on Nov. 14, 2019, 10 pages.
"Patent Owner's Preliminary Response Pursuant to 37 C.F.R. § 42.107," Exhibit 2012, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2013, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2014, filed with the United States Patent and Trademark Office in connection with Case IPR2019-01444 on Nov. 14, 2019, 2 pages.
"Patent Owner's Preliminary Response Pursuant to 37 C.F.R. § 42.107," Exhibit 2015, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2016, filed with the United States Patent and Trademark Office in connection with Case IPR2019-01444 on Nov. 14, 2019, 172 pages.
"Patent Owner's Preliminary Response Pursuant to 37 C.F.R. § 42.107," Exhibit 2017, filed with the United States Patent and Trademark Office in connection with Case IPR2019-01444 on Nov. 14, 2019, 40 pages.
"Patent Owner's Preliminary Response Pursuant to 37 C.F.R. § 42.107," Exhibit 2018, filed with the United States Patent and Trademark Office in connection with Case IPR2019-01444 on Nov. 14, 2019, 153 pages.
"Patent Owner's Preliminary Response Pursuant to 37 C.F.R. § 42.107," Exhibit 2019, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2020, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2021, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2022, filed with the United States Patent and Trademark Office in connection with Case IPR2019-01444 on Nov. 14, 2019, 11 pages.
"Patent Owner's Preliminary Response Pursuant to 37 C.F.R. § 42.107," Exhibit 2023, filed with the United States Patent and Trademark Office in connection with Case IPR2019-01444 on Nov. 14, 2019, 8 pages.
"Patent Owner's Preliminary Response Pursuant to 37 C.F.R. § 42.107," Exhibit 2024, filed with the United States Patent and Trademark Office in connection with Case IPR2019-01444 on Nov. 14, 2019, 20 pages.
"Patent Owner's Preliminary Response Pursuant to 37 C.F.R. § 42.107," Exhibit 2025, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2026, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2027, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2028, filed with the United States Patent and Trademark Office in connection with Case IPR2019-01444 on Nov. 14, 2019, 7 pages.

(56) References Cited

OTHER PUBLICATIONS

"Patent Owner's Preliminary Response Pursuant to 37 C.F.R. § 42.107," Exhibit 2029, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2030, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2031, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2032, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2033, filed with the United States Patent and Trademark Office in connection with Case IPR2019-01444 on Nov. 14, 2019, 25 pages.
"Patent Owner's Preliminary Response Pursuant to 37 C.F.R. § 42.107," Exhibit 2034, filed with the United States Patent and Trademark Office in connection with Case IPR2019-01444 on Nov. 14, 2019, 3 pages.
United States Patent and Trademark Office, "Notice of Filing Date Accorded to Petition and Time for Filing Patent Owner Preliminary Response," issued in connection with Case IPR2020-00007 on Oct. 8, 2019, 5 pages.
"Patent Owner's Amended Mandatory Notices Pursuant to 37 C.F.R. 42.8," filed with the United States Patent and Trademark Office in connection with case IPR2020-00007 on Oct. 23, 2019, 6 pages.
*EIS, Inc.* v. *Wow Tech International GmbH*, "Declaration of Frank Ferrari in Support of Defendants, Wow Tech International GmbH, Wow Tech Canada Ltd., and Novoluto GmbH's Consolidated Motion to Dismiss,".
Filed with the United States District Court for the District of Delaware in connection with Case No. 1:19-cv-1277-LPS on Oct. 2, 2019, 3 pages.
*EIS, Inc.* v. *Wow Tech International GmbH*, "Declaration of Florian Holst in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Declaration of Johannes Plettenberg in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Defendants' Opening Brief in Support of their Consolidated Motion to Dismiss Pursuant to Federal Rules of Civil Procedure 12(B)(2) and 12(B)(6)," filed with the United States District Court for the District of Delaware in connection with Case No. 1:19-cv-1277-LPS on Oct. 2, 2019, 42 pages.
The International Bureau of Wipo, "English Translation of International Report on Patentability," issued in connection with application No. PCT/EP2017/075400, on Apr. 9, 2019, 12 pages.
Israel Patent Office, "Office Action," issued in connection with Israeli Patent Application No. 254607, on Dec. 1, 2019, 6 pages (includes English translation).
Canadian Patent Office, "Office Action," issued in connection with Canadian Patent Application No. 3,051,672, on Oct. 3, 2019, 7 pages.
United States Patent and Trademark Office, "Notice of Allowance," issued in connection with U.S. Appl. No. 15/354,599, on Dec. 16, 2019, 21 pages.
"Patent Owner's Preliminary Response Pursuant to 37 C.F.R. § 42.107," filed with the United States Patent and Trademark Office in connection with case IPR2020-00007 on Jan. 8, 2020, 87 pages.
"Patent Owner's Preliminary Response Pursuant to 37 C.F.R. § 42.107," Exhibit 2001, filed with the United States Patent and Trademark Office in connection with Case IPR2020-00007 on Jan. 8, 2020, 72 pages.
"Patent Owner's Preliminary Response Pursuant to 37 C.F.R. § 42.107," Exhibit 2002, filed with the United States Patent and Trademark Office in connection with Case IPR2020-00007 on Jan. 8, 2020, 36 pages.
"Patent Owner's Preliminary Response Pursuant to 37 C.F.R. § 42.107," Exhibit 2003, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2004, filed with the United States Patent and Trademark Office in connection with Case IPR2020-00007 on Jan. 8, 2020, 62 pages.
"Patent Owner's Preliminary Response Pursuant to 37 C.F.R. § 42.107," Exhibit 2005, filed with the United States Patent and Trademark Office in connection with Case IPR2020-00007 on Jan. 8, 2020, 60 pages.
"Patent Owner's Preliminary Response Pursuant to 37 C.F.R. § 42.107," Exhibit 2006, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2007, filed with the United States Patent and Trademark Office in connection with Case IPR2020-00007 on Jan. 8, 2020, 5 pages.
"Patent Owner's Preliminary Response Pursuant to 37 C.F.R. § 42.107," Exhibit 2008, filed with the United States Patent and Trademark Office in connection with Case IPR2020-00007 on Jan. 8, 2020, 10 pages.
"Patent Owner's Preliminary Response Pursuant to 37 C.F.R. § 42.107," Exhibit 2009, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2010, filed with the United States Patent and Trademark Office in connection with Case IPR2020-00007 on Jan. 8, 2020, 14 pages.
"Patent Owner's Preliminary Response Pursuant to 37 C.F.R. § 42.107," Exhibit 2011, filed with the United States Patent and Trademark Office in connection with Case IPR2020-00007 on Jan. 8, 2020, 16 pages.
"Patent Owner's Preliminary Response Pursuant to 37 C.F.R. § 42.107," Exhibit 2012, filed with the United States Patent and Trademark Office in connection with Case IPR2020-00007 on Jan. 8, 2020, 12 pages.
"Patent Owner's Preliminary Response Pursuant to 37 C.F.R. § 42.107," Exhibit 2013, filed with the United States Patent and Trademark Office in connection with Case IPR2020-00007 on Jan. 8, 2020, 9 pages.
"Patent Owner's Preliminary Response Pursuant to 37 C.F.R. § 42.107," Exhibit 2014, filed with the United States Patent and Trademark Office in connection with Case IPR2020-00007 on Jan. 8, 2020, 2 pages.
"Patent Owner's Preliminary Response Pursuant to 37 C.F.R. § 42.107," Exhibit 2015, filed with the United States Patent and Trademark Office in connection with Case IPR2020-00007 on Jan. 8, 2020, 7 pages.
"Patent Owner's Preliminary Response Pursuant to 37 C.F.R. § 42.107," Exhibit 2016, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2017, filed with the United States Patent and Trademark Office in connection with Case IPR2020-00007 on Jan. 8, 2020, 77 pages.

(56) References Cited

OTHER PUBLICATIONS

"Patent Owner's Preliminary Response Pursuant to 37 C.F.R. § 42.107," Exhibit 2018, filed with the United States Patent and Trademark Office in connection with Case IPR2020-00007 on Jan. 8, 2020, 76 pages.
"Patent Owner's Preliminary Response Pursuant to 37 C.F.R. § 42.107," Exhibit 2019, filed with the United States Patent and Trademark Office in connection with Case IPR2020-00007 on Jan. 8, 2020, 169 pages.
"Patent Owner's Preliminary Response Pursuant to 37 C.F.R. § 42.107," Exhibit 2020, filed with the United States Patent and Trademark Office in connection with Case IPR2020-00007 on Jan. 8, 2020, 40 pages.
"Patent Owner's Preliminary Response Pursuant to 37 C.F.R. § 42.107," Exhibit 2021, filed with the United States Patent and Trademark Office in connection with Case IPR2020-00007 on Jan. 8, 2020, 7 pages.
"Patent Owner's Preliminary Response Pursuant to 37 C.F.R. § 42.107," Exhibit 2022, filed with the United States Patent and Trademark Office in connection with Case IPR2020-00007 on Jan. 8, 2020, 6 pages.
"Patent Owner's Preliminary Response Pursuant to 37 C.F.R. § 42.107," Exhibit 2023, filed with the United States Patent and Trademark Office in connection with Case IPR2020-00007 on Jan. 8, 2020, 8 pages.
"Patent Owner's Preliminary Response Pursuant to 37 C.F.R. § 42.107," Exhibit 2024, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2025, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2026, filed with the United States Patent and Trademark Office in connection with Case IPR2020-00007 on Jan. 8, 2020, 13 pages.
"Patent Owner's Preliminary Response Pursuant to 37 C.F.R. § 42.107," Exhibit 2027, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2028, filed with the United States Patent and Trademark Office in connection with Case IPR2020-00007 on Nov. 14, 2019, 7 pages.
"Patent Owner's Preliminary Response Pursuant to 37 C.F.R. § 42.107," Exhibit 2029, filed with the United States Patent and Trademark Office in connection with Case IPR2020-00007 on Jan. 8, 2020, 25 pages.
"Patent Owner's Preliminary Response Pursuant to 37 C.F.R. § 42.107," Exhibit 2030, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2031, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2032, filed with the United States Patent and Trademark Office in connection with Case IPR2020-00007 on Jan. 8, 2020, 4 pages.
United States Patent and Trademark Office, "Non-Final Office Action," issued in connection with U.S. Appl. No. 16/811,907, dated Jul. 22, 2022, 30 pages.
*EIS, Inc.* v. *Wow Tech International GmbH*, "Third Amended Complaint," filed with the United States District Court for the District of Delaware in connection with Case No. 1:19-cv-01227-LPS on Sep. 16, 2021, 753 pages. (uploaded in 5 parts).
"Opposition to a European Patent, Exhibit D11" filed with the European Patent Office by Fun Factory GmbH in connection with European Patent No. EP3305266 on Feb. 11, 2021, 7 pages.
"Opposition to a European Patent, Exhibit D11a" filed with the European Patent Office by Fun Factory GmbH in connection with European Patent No. EP3305266 on Feb. 11, 2021, 18 pages (includes English translation).
"Opposition to a European Patent, Exhibit D12" filed with the European Patent Office by Fun Factory GmbH in connection with European Patent No. EP3305266 on Feb. 11, 2021, 176 pages.
"Opposition to a European Patent, Exhibit D12a" filed with the European Patent Office by Fun Factory GmbH in connection with European Patent No. EP3305266 on Feb. 11, 2021, 2 pages.
"Opposition to a European Patent, Exhibit D13" filed with the European Patent Office by Fun Factory GmbH in connection with European Patent No. EP3305266 on Feb. 11, 2021, 5 pages.
"Opposition to a European Patent, Exhibit D1a" filed with the European Patent Office by EIS GmbH in connection with European Patent No. EP3305266 on Feb. 15, 2021, 2 pages (includes English translation).
"Opposition to a European Patent, Exhibit E1" filed with the European Patent Office by EIS GmbH in connection with European Patent No. EP3305266 on Feb. 15, 2021, 3 pages (includes English translation).
"Opposition to a European Patent, Exhibit E2" filed with the European Patent Office by EIS GmbH in Connection with European Patent No. EP3305266 on Feb. 15, 2021, 218 pages (includes English translation). (uploaded in 4 parts, each part with a corresponding translation).
"Opposition to a European Patent, Exhibit E3" filed with the European Patent Office by EIS GmbH in connection with European Patent No. EP3305266 on Feb. 15, 2021, 176 pages.
"Opposition to a European Patent, Exhibit E4" filed with the European Patent Office by EIS GmbH in connection with European Patent No. EP3305266 on Feb. 15, 2021, 157 pages (includes English translation).(uploaded in 3 parts, each part with a corresponding translation).
"Opposition to a European Patent, Exhibit E5" filed with the European Patent Office by EIS GmbH in connection with European Patent No. EP3305266 on Feb. 15, 2021, 152 pages.
"Opposition to a European Patent, Exhibit E6" filed with the European Patent Office by EIS GmbH in connection with European Patent No. EP3305266 on Feb. 15, 2021, 102 pages.
"Opposition to a European Patent, Exhibit E7" filed with the European Patent Office by EIS GmbH in connection with European Patent No. EP3305266 on Feb. 15, 2021, 3 pages.
"Opposition to a European Patent, Exhibit E8" filed with the European Patent Office by EIS GmbH in connection with European Patent No. EP3305266 on Feb. 15, 2021, 206 pages.
"Opposition to a European Patent, Exhibit E8a" filed with the European Patent Office by EIS GmbH in connection with European Patent No. EP3305266 on Feb. 15, 2021, 2 pages.
"Opposition to a European Patent, Exhibit E9" filed with the European Patent Office by EIS GmbH in connection with European Patent No. EP3305266 on Feb. 15, 2021, 161 pages (includes English translation). (uploaded in 3 parts, each part with a corresponding translation).
"Opposition to a European Patent, Exhibit E9a" filed with the European Patent Office by EIS GmbH in connection with European Patent No. EP3305266 on Feb. 15, 2021, 5 pages (includes English translation).
"Opposition to a European Patent, Exhibit E10" filed with the European Patent Office by EIS GmbH in connection with European Patent No. EP3305266 on Feb. 15, 2021, 1 page.
"Opposition to a European Patent, Exhibit E10a" filed with the European Patent Office by EIS GmbH in connection with European Patent No. EP3305266 on Feb. 15, 2021, 2 pages.
"Opposition to a European Patent, Exhibit E11" filed with the European Patent Office by EIS GmbH in connection with European Patent No. e EP3305266 on Feb. 15, 2021, 278 pages (includes English translation). (uploaded in 7 parts, each part with a corresponding translation).

(56) References Cited

OTHER PUBLICATIONS

"Opposition to a European Patent, Exhibit E11a" filed with the European Patent Office by EIS GmbH in connection with European Patent No. EP3305266 on Feb. 15, 2021, 2 pages.
"Opposition to a European Patent, Exhibit E12" filed with the European Patent Office by EIS GmbH in connection with European Patent No. EP3305266 on Feb. 15, 2021, 2 pages (includes English translation).
"Opposition to a European Patent, Exhibit E13" filed with the European Patent Office by EIS GmbH in connection with European Patent No. EP3305266 on Feb. 15, 2021, 2 pages (includes English translation).
"Opposition to a European Patent, Exhibit E14" filed with the European Patent Office by EIS GmbH in connection with European Patent No. EP3305266 on Feb. 15, 2021, 24 pages.
"Opposition to a European Patent, Exhibit E15" filed with the European Patent Office by EIS GmbH in connection with European Patent No. EP3305266 on Feb. 15, 2021, 4 pages (includes English translation).
"Opposition to a European Patent, Exhibit E16" filed with the European Patent Office by EIS GmbH in connection with European Patent No. EP3305266 on Feb. 15, 2021, 1 page.
"Opposition to a European Patent, Exhibit E17" filed with the European Patent Office by EIS GmbH in connection with European Patent No. EP3305266 on Feb. 15, 2021, 2 pages (includes English translation).
"Opposition to a European Patent, Exhibit E18" filed with the European Patent Office by EIS GmbH in connection with European Patent No. EP3305266 on Feb. 15, 2021, 1 page.
"Opposition to a European Patent, Exhibit E19" filed with the European Patent Office by EIS GmbH in connection with European Patent No. EP3305266 on Feb. 15, 2021, 3 pages.
"Opposition to a European Patent, Exhibit E20" filed with the European Patent Office by EIS GmbH in connection with European Patent No. EP3305266 on Feb. 15, 2021, 1 page.
"Opposition to a European Patent, Exhibit E21" filed with the European Patent Office by EIS GmbH in connection with European Patent No. EP3305266 on Feb. 15, 2021, 1 page.
"Opposition to a European Patent, Exhibit E21a" filed with the European Patent Office by EIS GmbH in connection with European Patent No. EP3305266 on Feb. 15, 2021, 2 pages (includes English translation).
"Opposition to a European Patent, Exhibit E22" filed with the European Patent Office by EIS GmbH in connection with European Patent No. EP3305266 on Feb. 15, 2021, 1 page.
"Opposition to a European Patent, Exhibit E22a" filed with the European Patent Office by EIS GmbH in connection with European Patent No. EP3305266 on Feb. 15, 2021, 2 pages (includes English translation).
"Opposition to a European Patent, Exhibit E23" filed with the European Patent Office by EIS GmbH in connection with European Patent No. EP3305266 on Feb. 15, 2021, 2 pages.
"Opposition to a European Patent, Exhibit E24a" filed with the European Patent Office by EIS GmbH in connection with European Patent No. EP3305266 on Feb. 15, 2021, 1 page.
"Opposition to a European Patent, Exhibit E24b" filed with the European Patent Office by EIS GmbH in connection with European Patent No. EP3305266 on Feb. 15, 2021, 1 page.
"Opposition to a European Patent, Exhibit E25" filed with the European Patent Office by EIS GmbH in connection with European Patent No. EP3305266 on Feb. 15, 2021, 3 pages (includes English translation).
"Opposition to a European Patent, Exhibit E26" filed with the European Patent Office by EIS GmbH in connection with European Patent No. EP3305266 on Feb. 15, 2021, 3 pages (includes English translation).
"Opposition to a European Patent, Exhibit E27" filed with the European Patent Office by EIS GmbH in connection with European Patent No. EP3305266 on Feb. 15, 2021, 3 pages (includes English translation).
"Opposition to a European Patent, Exhibit E28" filed with the European Patent Office by EIS GmbH in connection with European Patent No. EP3305266 on Feb. 15, 2021, 1 page.
"Opposition to a European Patent, Exhibit E29" filed with the European Patent Office by EIS GmbH in connection with European Patent No. EP3305266 on Feb. 15, 2021, 1 page.
"Opposition to a European Patent, Exhibit E30" filed with the European Patent Office by EIS GmbH in connection with European Patent No. EP3305266 on Feb. 15, 2021, 2 pages (includes English translation).
"Opposition to a European Patent, Exhibit E31a" filed with the European Patent Office by EIS GmbH in connection with European Patent No. EP3305266 on Feb. 15, 2021, 4 pages.
"Opposition to a European Patent, Exhibit E32" filed with the European Patent Office by EIS GmbH in connection with European Patent No. EP3305266 on Feb. 15, 2021, 10 pages (includes English translation).
"Opposition to a European Patent, Exhibit E33" filed with the European Patent Office by EIS GmbH in connection with European Patent No. EP3305266 on Feb. 15, 2021, 11 pages (includes English translation).
"Opposition to a European Patent, Exhibit E34" filed with the European Patent Office by EIS GmbH in connection with European Patent No. EP3305266 on Feb. 15, 2021, 6 pages (includes English translation).
"Opposition to a European Patent, Exhibit E35" filed with the European Patent Office by EIS GmbH in connection with European Patent No. EP3305266 on Feb. 15, 2021, 2 pages (includes English translation).
"Statement of Grounds and Particulars of Opposition Exhibit E3" filed with IP Australia in connection with Australian Patent Application No. 2018222907 on Feb. 24, 2021, 176 pages.
"Statement of Grounds and Particulars of Opposition Exhibit E5" filed with IP Australia in connection with Australian Patent Application No. 2018222907 on Feb. 24, 2021, 152 pages.
"Statement of Grounds and Particulars of Opposition Exhibit E6" filed with IP Australia in connection with Australian Patent Application No. 2018222907 on Feb. 24, 2021, 102 pages.
"Statement of Grounds and Particulars of Opposition Exhibit E8" filed with IP Australia in connection with Australian Patent Application No. 2018222907 on Feb. 24, 2021, 206 pages.
"Statement of Grounds and Particulars of Opposition Exhibit E8a" filed with IP Australia in connection with Australian Patent Application No. 2018222907 on Feb. 24, 2021, 2 pages.
"Statement of Grounds and Particulars of Opposition Exhibit E10" filed with IP Australia in connection with Australian Patent Application No. 2018222907 on Feb. 24, 2021, 174 pages.
"Statement of Grounds and Particulars of Opposition Exhibit E10a" filed with IP Australia in connection with Australian Patent Application No. 2018222907 on Feb. 24, 2021, 2 pages.
United States Patent and Trademark Office, "Office Action," issued in connection with U.S. Appl. No. 16/339,969, dated Dec. 21, 2021, 7 pages.
United States Patent and Trademark Office, "Notice of Allowance," issued in connection with U.S. Appl. No. 16/339,969, dated Apr. 4, 2022, 7 pages.
United States Patent and Trademark Office, "Restriction Requirement" issued in connection with U.S. Appl. No. 16/752,283, dated Apr. 19, 2022, 6 pages.
*Novoluto GmbH* v. *XR, LLC*, "Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 31 pages.
*Novoluto GmbH* v. *XR, LLC*, "Exhibit 1 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 18 pages.
*Novoluto GmbH* v. *XR, LLC*, "Exhibit 2 filed with Answer, Affirmative Defenses and Counterclaims of Defendant XR, LLC and Request for Jury Trial," filed with the United States District Court

(56) References Cited

OTHER PUBLICATIONS for the Central District of California, Southern Division, in connection with Case No. 8:24-cv-01907-JDE on Oct. 11, 2024, 10 pages.

*Novoluto GmbH* v. *XR, LLC*, "Exhibit 3 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.

*Novoluto GmbH* v. *XR, LLC*, "Exhibit 4 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.

*Novoluto GmbH* v. *XR, LLC*, "Exhibit 5 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 18 pages.

*Novoluto GmbH* v. *XR, LLC*, "Exhibit 6 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 12 pages.

*EIS Inc.* v. *IntiHealth Ger GmbH et al.*, "Plaintiff's Letter Brief in Opposition to Defendants' Motion to Strike Portions of Dr. Abraham's Reports on Invalidity," filed with the United States District Court for the District of Delaware in connection with Case No. 1:19-cv-1227-GBW on Jul. 6, 2023, 8 pages.

*EIS Inc.* v. *IntiHealth Ger GmbH et al.*, "Defendant Novoluto's Concise Statement of Material Facts in Support of Its Motion for Summary Judgment of IPR Estoppel (Redacted Public Version)," filed with the United States District Court for the District of Delaware in connection with Case No. 1:19-cv-1227-GBW on Aug. 4, 2023, 8 pages.

*EIS Inc.* v. *IntiHealth Ger GmbH et al.*, "Defendants' and Counterclaim Defendants' Answering Brief in Opposition to Defendants' Motion for Summary Judgment of IPR Estoppel (Redacted Public Version)," filed with the United States District Court for the District of Delaware in connection with Case No. 1:19-cv-1227-GBW on Aug. 14, 2023, 16 pages.

*EIS Inc.* v. *IntiHealth Ger GmbH et al.*, "Declaration of Allan M. Soobert in Support of Plaintiff and Counterclaim Defendants' Opposition to Defendants' Motion for Summary Judgment of IPR Estoppel vol. 1 of 2 (Redacted Public Version) and Exhibit A (attachments 1-9)," filed with the United States District Court for the District of Delaware in connection with Case No. 1:19-cv-1227-GBW on Aug. 14, 2023, 239 pages.

*EIS Inc.* v. *IntiHealth Ger GmbH et al.*, "Exhibit A (attachments 10-18) filed with Declaration of Allan M. Soobert in Support of Plaintiff and Counterclaim Defendants' Opposition to Defendants' Motion for Summary Judgment of IPR Estoppel vol. 1 of 2 (Redacted Public Version)," filed with the United States District Court for the District of Delaware in connection with Case No. 1:19-cv-1227-GBW on Aug. 14, 2023, 236 pages.

*EIS Inc.* v. *IntiHealth Ger GmbH et al.*, "Exhibit A (attachments 19-23) filed with Declaration of Allan M. Soobert in Support of Plaintiff and Counterclaim Defendants' Opposition to Defendants' Motion for Summary Judgment of IPR Estoppel vol. 1 of 2 (Redacted Public Version)," filed with the United States District Court for the District of Delaware in connection with Case No. 1:19-cv-1227-GBW on Aug. 14, 2023, 239 pages.

*EIS Inc.* v. *IntiHealth Ger GmbH et al.*, "Declaration of Allan M. Soobert in Support of Plaintiff and Counterclaim Defendants' Opposition to Defendants' Motion for Summary Judgment of IPR Estoppel vol. 2 of 2 (Redacted Public Version) and Exhibit A (attachments 23-29)," filed with the United States District Court for the District of Delaware in connection with Case No. 1:19-cv-1227-GBW on Aug. 14, 2023, 266 pages.

*EIS Inc.* v. *IntiHealth Ger GmbH et al.*, "Exhibits B-D filed with Declaration of Allan M. Soobert in Support of Plaintiff and Counterclaim Defendants' Opposition to Defendants' Motion for Summary Judgment of IPR Estoppel vol. 2 of 2 (Redacted Public Version)," filed with the United States District Court for the District of Delaware in connection with Case No. 1:19-cv-1227-GBW on Aug. 14, 2023, 204 pages.

*EIS Inc.* v. *IntiHealth Ger GmbH et al.*, "Plaintiff's and Counterclaim Defendants' Statement of Material Facts and Responsive Statement of Material Facts (Redacted Public Version)," filed with the United States District Court for the District of Delaware in connection with Case No. 1:19-cv-1227-GBW on Aug. 14, 2023, 9 pages.

United States Patent and Trademark Office, "Final Office action," issued in connection with U.S. Appl. No. 15/719,085, on May 7, 2018, 14 pages.

"Notification of an Opposition," issued by the European Patent Office in connection with European Patent No. EP3685809 on Mar. 4, 2022, opposition filed by EIS GmbH, 179 pages (includes English translation).

Sparks et al., "Use of Silicone Materials to Simulate Tissue Biomechanics as Related to Deep Tissue Injury," Advances in Skin & Wound Care; vol. 28 No. 2, Feb. 2015; pp. 59-68, 10 pages.

Wu et al., "Simultaneous determination of the nonlinear-elastic properties of skin and subcutaneous tissue in unconfined compression tests," Skin Research and Technology 2007; 13: pp. 34-42, 9 pages.

Zahouani et al., "Characterization of the mechanical properties of a dermal equivalent compared with human skin in vivo by indentation and static friction tests," Skin Research and Technology 2009; 15: pp. 68-76, 9 pages.

The International Bureau of WIPO, "International Search Report and Written Opinion," issued in connection with International Application No. PCT/EP2015/067017, on Jul. 22, 2016, 34 pages (English translation included).

Linder-Ganz et al., "Assessment of mechanical conditions in sub-dermal tissues during sitting: a combined experimental-MRI and finite element approach," Journal of Biomechanics 40 (2007) pp. 1443-1454, 12 pages.

"valve," Merriam Webster.com, Merriam Webster, 2016, Dec. 26, 2016, 1 pg.

"can," Thefreedictionary.com, The free dictionary by Farlex, 2016, Dec. 26, 2016, 1 pg.

"pump," Merriam Webster.com, Merriam Webster, 2016, Dec. 26, 2016, 1 pg.

United States Patent and Trademark Office, "Notice of Allowance and Fee(s) Due," issued in connection with U.S. Appl. No. 15/023,471, on May 12, 2017, 10 pages.

United States Patent and Trademark Office, "Non-Final Office action," issued in connection with U.S. Appl. No. 15/302,981, on Jun. 2, 2017, 17 pages.

United States Patent and Trademark Office, "Non-Final Office action," issued in connection with U.S. Appl. No. 15/487,123, on Jun. 2, 2017, 16 pages.

United States Patent and Trademark Office, "Final Office action," issued in connection with U.S. Appl. No. 15/354,599, on Sep. 12, 2017, 47 pages.

United States Patent and Trademark Office, "Final Office action," issued in connection with U.S. Appl. No. 15/487,123, on Sep. 29, 2017, 7 pages.

United States Patent and Trademark Office, "Notice of Allowance and Fee(s) Due," issued in connection with U.S. Appl. No. 15/302,981, on Oct. 12, 2017, 5 pages.

United States Patent and Trademark Office, "Restriction Requirement," issued in connection with U.S. Appl. No. 15/719,085, on Nov. 8, 2017, 6 pages.

United States Patent and Trademark Office, "Supplemental Notice of Allowability," issued in connection with U.S. Appl. No. 15/302,981, on Nov. 17, 2017, 2 pages.

(56) References Cited

OTHER PUBLICATIONS

United States Patent and Trademark Office, "Notice of Allowance and Fee(s) Due," issued in connection with U.S. Appl. No. 15/487,123, on Dec. 11, 2017, 5 pages.
United States Patent and Trademark Office, "Non-Final Office action," issued in connection with U.S. Appl. No. 15/354,599, on Dec. 29, 2017, 46 pages.
United States Patent and Trademark Office, "Non-Final Office action," issued in connection with U.S. Appl. No. 15/719,085, on Jan. 25, 2018, 15 pages.
United States Patent and Trademark Office, "Corrected Notice of Allowability," issued in connection with U.S. Appl. No. 15/487,123, on Mar. 13, 2018, 2 pages.
United States Patent and Trademark Office, "Notice of Allowance and Fee(s) Due," issued in connection with U.S. Appl. No. 15/719,085, on Dec. 12, 2018, 11 pages.
United States Patent and Trademark Office, "Supplemental Notice of Allowability," issued in connection with U.S. Appl. No. 15/719,085, on Jan. 11, 2019, 9 pages.
IP Australia, "Examination Report No. 2 for Standard Patent Application," issued in connection with Australian Application No. 2018200852, on Dec. 19, 2018, 4 pages.
International Searching Authority, "International Search Report and Written Opinion," issued in connection with International Application No. PCT/EP2018/082681, on Jan. 30, 2019, 21 pages (includes English translation of pp. 13 to 17).
United States Patent and Trademark Office, "Notice of Allowance," issued in connection with U.S. Appl. No. 15/719,085, on Mar. 20, 2019, 12 pages.
China National Intellectual Property Administration, "First Office Action," issued in connection with Chinese Application No. 201710927530.4, on Mar. 25, 2019, 5 pages (English translation included).
German Patent and Trademark Office, "Examination Report," issued in connection with German Application No. 10 2016 118 911.1, on Nov. 4, 2016, 10 pages. (English translation included.).
Zimmerman et al., "The Gentle Touch Receptors of Mammalian Skin," Special Section: Skin, Science, Nov. 21, 2014, vol. 346, Issue 6212, 6 pages.
Verkauf et al., "Clitoral Size in Normal Women," Obstetrics & Gynecology, vol. 80, No. 1, Jul. 1992, 4 pages.
IP Australia, "Notice of Acceptance for Patent Application," issued in connection with Australian Application No. 2017228536, on Jun. 21, 2018, 3 pages.
International Searching Authority, "Written Opinion," issued in connection with International Application No. PCT/EP2017/075400, on May 18, 2018, 10 pages.
International Searching Authority, "International Search Report," issued in connection with International Application No. PCT/EP2017/075400, on May 18, 2018, 6 pages.
United States Patent and Trademark Office, "Notice of Allowance," issued in connection with U.S. Appl. No. 15/888,568, dated Aug. 26, 2022, 8 pages.
"Brief for Appellant EIS GmbH" filed with the United States Court of Appeals for the Federal Circuit in connection with cases 2021-2215, 2022-1020, and 2022-1191 (Consolidated Appeal from the United States Patent and Trademark Office, Patent Trial and Appeal Board in Nos. IPR2019-01302, IPR2019-01444, and IPR2020-00007), filed Apr. 25, 2022, 321 pages (uploaded in 3 parts).
"Brief of Appellee Novoluto GmbH," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Jun. 21, 2022, 52 pages.
"Appellant's Reply Brief," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019- 01444, and IPR2020-00007), filed Aug. 2, 2022, 26 pages.
"Joint Appendix, vol. I of II," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 9, 2022, 674 pages (uploaded in 9 parts).
"Joint Appendix, vol. II of II," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 9, 2022, 682 pages (uploaded in 9 parts).
United States Patent and Trademark Office, "Office Communication Concerning Third Party Submission Under 37 C.F.R. § 1.290," issued in connection with U.S. Appl. No. 17/029,974, dated May 23, 2022, 19 pages.
*EIS Inc.* v. *IntiHealth Ger GmbH et al.*, "Joint Claim Construction Brief (Redacted—Public Version)," filed with the United States District Court for the District of Delaware in connection with Case No. 1:19-cv-1227-VAC-MPT on Jul. 7, 2022, 101 pages.
*EIS Inc.* v. *IntiHealth Ger GmbH et al.*, "Appendix to Joint Claim Construction Brief, vol. 1 of 2, Exhibits 12, 13, 15-20, and 22-50," filed with the United States District Court for the District of Delaware in connection with Case No. 1:19-cv-1227-VAC-MPT on Jun. 30, 2022, 869 pages (uploaded in 3 parts).
*EIS Inc.* v. *IntiHealth Ger GmbH et al.*, "Appendix to Joint Claim Construction Brief, vol. 2 of 2, Exhibits 51-41," filed with the United States District Court for the District of Delaware in connection with Case No. 1:19-cv-1227-VAC-MPT on Jun. 30, 2022, 261 pages.
*EIS Inc.* v. *IntiHealth Ger GmbH et al.*, "Exhibits 14 and 21 to Appendix Joint Claim Construction Brief (Redacted—Public Version)," filed with the United States District Court for the District of Delaware in connection with Case No. 1:19-cv-1227-VAC-MPT on Jul. 7, 2022, 25 pages.
*EIS Inc.* v. *IntiHealth Ger GmbH et al.*, "Plaintiff and Counterclaim-Defendants' Comments and Objections on Novoluto's Technology Tutorial," filed with the United States District Court for the District of Delaware in connection with Case No. 1:19-cv-1227-VAC-MPT on Jun. 30, 2022, 8 pages.
"Complaint Response," filed with the German Patent and Trademark in connection with opposition of German Patent No. 102013110501.7 on Apr. 14, 2022, 71 pages (includes English translation).
"Complaint Response, Exhibit ES2," filed with the German Patent and Trademark in connection with opposition of German Patent No. 102013110501.7 on Apr. 14, 2022, 82 pages.
"Accession of the Alleged Patent Infringer According to Art. 105 EPC," filed with the European Patent Office by Triple A Sales GmBH in connection with European Patent No. EP2976057 on May 3, 2022, 86 pages (includes English translation).
"Accession of the Alleged Patent Infringer According to Art. 105 EPC, Exhibit B1," filed with the European Patent Office by Triple A Sales GmBH in connection with European Patent No. EP2976057 on May 3, 2022, 16 pages (includes English translation).
"Accession of the Alleged Patent Infringer According to Art. 105 EPC, Exhibit B2," filed with the European Patent Office by Triple A Sales GmBH in connection with European Patent No. EP2976057 on May 3, 2022, 4 pages (includes English translation).
"Accession of the Alleged Patent Infringer According to Art. 105 EPC, Exhibit B3," filed with the European Patent Office by Triple A Sales GmBH in connection with European Patent No. EP2976057 on May 3, 2022, 12 pages (includes English translation).
"Accession of the Alleged Patent Infringer According to Art. 105 EPC, Exhibit B4," filed with the European Patent Office by Triple A Sales GmBH in connection with European Patent No. EP2976057 on May 3, 2022, 1 page.
"Accession of the Alleged Patent Infringer According to Art. 105 EPC, Exhibit B5," filed with the European Patent Office by Triple

(56) References Cited

OTHER PUBLICATIONS

A Sales GmBH in connection with European Patent No. EP2976057 on May 3, 2022, 2 pages (includes English translation).
"Accession of the Alleged Patent Infringer According to Art. 105 EPC, Exhibit 50," filed with the European Patent Office by Triple A Sales GmBH in connection with European Patent No. EP2976057 on May 3, 2022, 24 pages.
"Accession of the Alleged Patent Infringer According to Art. 105 EPC, Exhibit 50A," filed with the European Patent Office by Triple A Sales GmBH in connection with European Patent No. EP2976057 on May 3, 2022, 24 pages.
"Accession of the Alleged Patent Infringer According to Art. 105 EPC, Exhibit 51," filed with the European Patent Office by Triple A Sales GmBH in connection with European Patent No. EP2976057 on May 3, 2022, 18 pages (includes English translation).
"Accession of the Alleged Patent Infringer According to Art. 105 EPC," filed with the European Patent Office by Triple A Sales GmBH in connection with European Patent No. 3308762 on May 3, 2022, 82 pages (includes English translation).
"Accession of the Alleged Patent Infringer According to Art. 105 EPC, Exhibit B1," filed with the European Patent Office by Triple A Sales GmBH in connection with European Patent No. EP3308762 on May 3, 2022, 16 pages (includes English translation).
"Accession of the Alleged Patent Infringer According to Art. 105 EPC, Exhibit B2," filed with the European Patent Office by Triple A Sales GmBH in connection with European Patent No. EP3308762 on May 3, 2022, 4 pages (includes English translation).
"Accession of the Alleged Patent Infringer According to Art. 105 EPC, Exhibit B3," filed with the European Patent Office by Triple A Sales GmBH in connection with European Patent No. EP3308762 on May 3, 2022, 12 pages (includes English translation).
"Accession of the Alleged Patent Infringer According to Art. 105 EPC, Exhibit B4," filed with the European Patent Office by Triple A Sales GmBH in connection with European Patent No. EP3308762 on May 3, 2022, 1 page.
"Accession of the Alleged Patent Infringer According to Art. 105 EPC, Exhibit B5," filed with the European Patent Office by Triple A Sales GmBH in connection with European Patent No. EP3308762 on May 3, 2022, 2 pages (includes English translation).
"Accession of the Alleged Patent Infringer According to Art. 105 EPC, Exhibit 43," filed with the European Patent Office by Triple A Sales GmBH in connection with European Patent No. EP3308762 on May 3, 2022, 24 pages.
"Accession of the Alleged Patent Infringer According to Art. 105 EPC, Exhibit 43A," filed with the European Patent Office by Triple A Sales GmBH in connection with European Patent No. EP3308762 on May 3, 2022, 24 pages.
"Accession of the Alleged Patent Infringer According to Art. 105 EPC, Exhibit 44," filed with the European Patent Office by Triple A Sales GmBH in connection with European Patent No. EP3308762 on May 3, 2022, 12 pages.
"Appeal Letter," filed with the European Patent Office by Novoluto GmBH in connection with European Patent No. EP2976057 on July 20, 2022, 148 pages (includes English translation).
"Appeal Letter," filed with the European Patent Office by Novoluto GmBH in connection with European Patent No. EP3308762 on July 20, 2022, 148 pages (includes English translation).
Chinese National Intellectual Property Adminstration, "Fourth Office Action," issued in connection with Chinese Patent Application No. 2014800521948, dated October 10, 2022, 17 pages (includes English translation).
United States Patent and Trademark Office, "Notice of Allowance," issued in connection with U.S. Appl. No. 16/339,969, dated Aug. 10, 2022, 7 pages.
*Novoluto GmbH* v. *Uccellini LLC*, "First Amended Complaint," filed with the United States District Court for the District of Oregon in connection with Case No. 6:20-cv-02284-MK on Feb. 4, 2022, 368 pages (uploaded in 3 parts).
*Novoluto GmbH* v. *Uccellini LLC*, "Answer and Affirmative Defenses to First Amended Complaint," filed with the United States District Court for the District of Oregon in connection with Case No. 6:20-cv-02284-MK on Feb. 17, 2022, 18 pages.
"Notification of an Opposition," issued by the European Patent Office in connection with European Patent No. EP375106 on Oct. 11, 2022, opposition filed by EIS GmbH, 128 pages (includes English translation).
"Opposition to a European Patent, Exhibit D6" filed with the European Patent Office by EIS GmbH in connection with European Patent No. EP375106 on Oct. 5, 2022, 18 pages (includes English translation).
"Opposition to a European Patent, Exhibit D7" filed with the European Patent Office by EIS GmbH in connection with European Patent No. EP375106 on Oct. 5, 2022, 18 pages (includes English translation).
"Opposition to a European Patent, Exhibit D8" filed with the European Patent Office by EIS GmbH in connection with European Patent No. EP375106 on Oct. 5, 2022, 18 pages (includes English translation).
Smith, J., "Fetish Fantasy Series Clit Pump: PD323100," May 21, 2013, https://www.youtube.com/watch?v=zJbKY1SQDas, 1 page.
FunkyCondom, "Jesse's Vibro Pussy Sucker," Feb. 5, 2011, https://www.youtube.com/watch?v=-YpufGFnKHQ, 1 page.
SexToyCanada, "Dr. Laura Berman Selene Vibrating Clitoral Pump Product Demo," Jun. 20, 2013, https://www.youtube.com/watch?v=4ZMybp0yWxU, 1 page.
Novelties for Lovers, "Dr. Laura Berman—Intimate Basics—Selene—Vibrating Clit Pump," Feb. 16, 2014, https://www.youtube.com/watch?v=-t85zgK2wHg, 1 page.
SexToyCanada, "Dr Laura Berman Intimate Basics Collection Thea Waterproof Silicone Clitoral PumpProduct D," Nov. 4, 2014, https://www.youtube.com/watch?v=K5jfBESc8p0.
SexToySuperMall, "Advanced Clitoral Pump," Sep. 1, 2009, https://www.youtube.com/watch?v=rlEaFHeiDCI, 1 page.
DiscreetFantasy, "Advanced Clitoral Pumps: SE062350," May 14, 2013, https://www.youtube.com/watch?v=E8a8J6TjENE, 1 page.
Pipedream, "Fetish Fantasy Series: Vibrating Stimulators," 2012, http://web.archive.org/web/20121105173055/http:/www.pipedreamproducts.com/showsection-20b.php?Section=04&Sub1=Vibrating%20Stimulators, 3 pages.
Extreme Restraints, "The Clit Intensifier Pump," 2022, https://www.extremerestraints.com/the-clit-intensifier-pump.html, 6 pages.
Extreme Restraints, "Unique Vibrators," 2012, http://web.archive.org/web/20120104164504/http:/www.extremerestraints.com/unique-vibrators_85/, 2 pages.
Katherine McAlpine, "Balls, Cups and Discs: A History of Vibrators and Massage Machines, 1900-1940, Dissertation 2012," available at https://www.academia.edu/28556168/Balls_Cups_and_Discs_A_history_of_vibrators_and_massage_machines_1900_1940_Dissertation 2012, 41 pages.
CalExotics, Intimate Pump Vibro Pussy Sucker, 2022, https://calexotics.com/intimate-pump-vibro-pussy-sucker/, 5 pages.
MySexToySpot.com, "Clit Suckers & Pussy Pumps," 2013, available at https://web.archive.org/web/20131214165302/http://mysextoyspot.com/Extras/Pussy-Pumps-Pelvic-Exercisers/Clit-Suckers-Pussy-Pumps, 2 pages.
California Exotic Novelties, "Couture Collection," 2009, available at https://web.archive.org/web/20100628224310/calexotics.com/index.php, 3 pages.
Schroder, M. et al., "Clitoral Therapy Device for Treatment of Sexual Dysfunction In Irradiated Cervical Cancer Patients," 2005, International Journal of Radiation Oncology Biology Physics, 61(4), pp. 1078-1086, 9 pages.
Cellulite, "A Little Cellulite: Primer for the Beauty Vital 1000/1002/3000 and the TheraVac," Oct. 31, 2013, available at https://www.yumpu.com/de/document/read/21185793/c-e-1-1-u-1-i-t-e-mag-frenkel-midovital, 10 pages (English translation provided upon request).
*EIS Inc.* v. *IntiHealth Ger GmbH et al.*, "Letter to The Honorable Gregory B. Williams from Gregory E. Stuhlman, Esquire Regarding Notifying the Court that Wow Tech Will Present Live Expert Witnesses at the Upcoming Claim Construction Hearing," filed with

(56) References Cited

OTHER PUBLICATIONS the United States District Court for the District of Delaware in connection with Case No. 1:19-cv-1227-GBW on Nov. 11, 2022, 2 pages.
*EIS Inc.* v. *IntiHealth Ger GmbH et al.*, "Letter to The Honorable Gregory B. Williams from Brian P. Egan Regarding Claim Construction Disputes," filed with the United States District Court for the District of Delaware in connection with Case No. 1:19-cv-1227-GBW on Nov. 16, 2022, 6 pages.
*EIS Inc.* v. *IntiHealth Ger GmbH et al.*, "Defendants' Motion and Memorandum in Support of Its Motion for Leave to File Early Motion for Partial Summary Judgment," filed with the United States District Court for the District of Delaware in connection with Case No. 1:19-cv-1227-GBW on Dec. 20, 2022, 21 pages.
*EIS Inc.* v. *IntiHealth Ger GmbH et al.*, "Order," issued by the United States District Court for the District of Delaware in connection with Case No. 1:19-cv-1227-GBW on Jan. 9, 2023, 2 pages.
*EIS Inc.* v. *IntiHealth Ger GmbH et al.*, "Plaintiff's Answering Brief in Opposition to Defendants' Motion for Leave to File Early Motion for Partial Summary Judgment," filed with the United States District Court for the District of Delaware in connection with Case No. 1:19-cv-1227-GBW on Jan. 10, 2023, 24 pages.
*Novoluto GmbH* v. *Uccellini LLC*, "Novoluto GmbH's Notice that Claim Construction Briefing and Hearing Are Unnecessary," filed with the United States District Court for the District of Oregon in connection with Case No. 6:20-cv-02284-MK on Dec. 22, 2022, 29 pages.
*EIS Inc.* v. *IntiHealth Ger GmbH et al.*, "Defendants' Statement of Undisputed Material Facts in Support of Its Opposition to Plaintiff's and Counterclaimdefendants' Motion for Partial Summary Judgment (No. 4)," filed with the United States District Court for the District of Delaware in connection with Case No. 1:19-cv-1227-GBW on Jun. 2, 2023, 5 pages.
*EIS Inc.* v. *IntiHealth Ger GmbH et al.*, "Defendants' Statement of Undisputed Material Facts in Support of Its Opposition to Plaintiff and Counterclaimdefendants' Motion for Partial Summary Judgment (No. 5)," filed with the United States District Court for the District of Delaware in connection with Case No. 1:19-cv-1227-GBW on Jun. 2, 2023, 4 pages.
*EIS Inc.* v. *IntiHealth Ger GmbH et al.*, "Plaintiff's and Counterclaim Defendants' Reply in Support of Its Daubert Motion to Exclude Opinions of Robert L. Stoll," filed with the United States District Court for the District of Delaware in connection with Case No. 1:19-cv-1227-GBW on Jun. 9, 2023, 9 pages.
*EIS Inc.* v. *IntiHealth Ger GmbH et al.*, "Plaintiff's and Counterclaim Defendants' Reply in Support of Their Daubert Motion to Exclude Certain "Stimulation Device" Opinions," filed with the United States District Court for the District of Delaware in connection with Case No. 1:19-cv-1227-GBW on Jun. 9, 2023, 5 pages.
*EIS Inc.* v. *IntiHealth Ger GmbH et al.*, "Plaintiff's and Counterclaim Defendants' Reply in Support of Their Daubert Motion to Exclude Certain Opinions of Drs. Cameron and Herbenick," filed with the United States District Court for the District of Delaware in connection with Case No. 1:19-cv-1227-GBW on Jun. 9, 2023, 7 pages.
*EIS Inc.* v. *IntiHealth Ger GmbH et al.* "Declaration of Allan M. Soobert in Support of Plaintiff and Counterclaim Defendants' Reply in Support of Their Daubert Motion to Exclude Certain Opinions of Drs. Cameron and Herbenick," filed with the United States District Court for the District of Delaware in connection with Case No. 1:19-cv-1227-GBW on Jun. 9, 2023, 92 pages.
*EIS Inc.* v. *IntiHealth Ger GmbH et al.* "Plaintiff's and Counterclaim Defendants' Reply in Support of Its Daubert Motion to Exclude Opinions of Dr. Debra Herbenick," filed with the United States District Court for the District of Delaware in connection with Case No. 1:19-cv-1227-GBW on Jun. 9, 2023, 5 pages.
*EIS Inc.* v. *IntiHealth Ger GmbH et al.*, "Plaintiff's and Counterclaim Defendants' Reply in Support of Their Motion for Partial Summary Judgment as to Effective Filing Date of the Asserted Claims of U.S. Patent Nos. 11,090,220, 11,103,418, 9,937,097 (No. 2)," filed with the United States District Court for the District of Delaware in connection with Case No. 1:19-cv-1227-GBW on Jun. 9, 2023, 16 pages (includes publicly available version of Exhibit N retrieved from PACER).
*EIS Inc.* v. *IntiHealth Ger GmbH et al.*, "Plaintiff's and Counterclaim Defendants' Response to Defendants' Statement of Material Facts Regarding Motion No. 2 for Partial Summary Judgment That the Asserted Claims of U.S. Patent Nos. 11,090,220, 11,103,418, 9,937,097 Are Not Entitled to an Effective Filing Date of Their Respective Earliest U.S. Parent Patents," filed with the United States District Court for the District of Delaware in connection with Case No. 1:19-cv-1227-GBW on Jun. 9, 2023, 7 pages.
*EIS Inc.* v. *IntiHealth Ger GmbH et al.*, "Plaintiff's and Counterclaim Defendants' Reply in Support of Their Motion for Partial Summary Judgment of Noninfringement of All Asserted Claims of U.S. Pat. No. 9,763,851 (No. 4)," filed with the United States District Court for the District of Delaware in connection with Case No. 1:19-cv-1227-GBW on Jun. 9, 2023, 7 pages.
*EIS Inc.* v. *IntiHealth Ger GmbH et al.*, "Plaintiff's And Counterclaim Defendants' Response to Defendant's Statement of Undisputed Material Facts in Support of Its Opposition to Plaintiff And Counterclaim-Defendants' Motion for Partial Summary Judgment (No. 4)," filed with the United States District Court for the District of Delaware in connection with Case No. 1:19-cv-1227-GBW on Jun. 9, 2023, 5 pages.
*EIS Inc.* v. *IntiHealth Ger GmbH et al.*, "Plaintiff's and Counterclaim Defendants' Reply in Support of Their Motion No. 5 for Partial Summary Judgment of Invalidity of the Asserted Claims of U.S. Patent Nos. 11,090,220 and 11,103,418," filed with the United States District Court for the District of Delaware in connection with Case No. 1:19-cv-1227-GBW on Jun. 9, 2023, 5 pages.
*EIS Inc.* v. *IntiHealth Ger GmbH et al.*, "Plaintiff's and Counterclaim Defendants' Response to Defendant's Statement of Undisputed Material Facts in Support of Its Opposition to Plaintiff And Counterclaim-Defendants' Motion for Partial Summary Judgment (No. 5)," filed with the United States District Court for the District of Delaware in connection with Case No. 1:19-cv-1227-GBW on Jun. 9, 2023, 6 pages.
*EIS Inc.* v. *IntiHealth Ger GmbH et al.*, "Memorandum Order," issued by the United States District Court for the District of Delaware in connection with Case No. 1:19-cv-1227-GBW on Jun. 13, 2023, 3 pages.
*EIS Inc.* v. *IntiHealth Ger GmbH et al.*, "Memorandum Opinion," issued by the United States District Court for the District of Delaware in connection with Case No. 1:19-cv-1227-GBW on Aug. 23, 2023, unsealed on Sep. 5, 2023, 22 pages.
*EIS Inc.* v. *IntiHealth Ger GmbH et al.*, "Letter to The Honorable Gregory B. Williams from Brian P. Eagan Regarding Case Narrowing," filed with the United States District Court for the District of Delaware in connection with Case No. 1:19-cv-1227-GBW on Sep. 7, 2023, 3 pages.
*EIS Inc.* v. *IntiHealth Ger GmbH et al.*, "Letter to The Honorable Gregory B. Williams Regarding IPR," filed with the United States District Court for the District of Delaware in connection with Case No. 1:19-cv-1227-GBW on Sep. 12, 2023, 3 pages.
*EIS Inc.* v. *IntiHealth Ger GmbH et al.*, "Redacted Public Version of Jury Verdict," posted by the United States District Court for the District of Delaware in connection with Case No. 1:19-cv-1227-GBW on Sep. 15, 2023, 17 pages.
*EIS Inc.* v. *IntiHealth Ger GmbH et al.*, "Letter to the Honorable Gregory B. Williams Regarding IPR (Redacted Public Version)," filed with the United States District Court for the District of Delaware in connection with Case No. 1:19-cv-1227-GBW on Sep. 26, 2023, 20 pages.
*EIS Inc.* v. *IntiHealth Ger GmbH et al.*, "Joint Motion to Seal and Redact Memorandum Order (Redacted Public Version)," filed with the United States District Court for the District of Delaware in connection with Case No. 1:19-cv-1227-GBW on Sep. 26, 2023, 68 pages.
*EIS Inc.* v. *IntiHealth Ger GmbH et al.*, "Post-Trial Status Report," filed with the United States District Court for the District of Delaware in connection with Case No. 1:19-cv-1227-GBW on Sep. 26, 2023, 19 pages.

(56) References Cited

OTHER PUBLICATIONS

*EIS Inc.* v. *IntiHealth Ger GmbH et al.*, "Memorandum Opinion," issued by the United States District Court for the District of Delaware in connection with Case No. 1:19-cv-1227-GBW on Aug. 30, 2023, unsealed on Sep. 28, 2023, 14 pages.
*EIS Inc.* v. *IntiHealth Ger GmbH et al.*, "Plaintiff's and Counterclaim Defendants' Brief in Support of Their Inequitable Conduct and Unclean Hands Defenses (Redacted Public Version)," filed with the United States District Court for the District of Delaware in connection with Case No. 1:19-cv-1227-GBW on Nov. 17, 2023, 33 pages.
*EIS Inc.* v. *IntiHealth Ger GmbH et al.*, "Plaintiff's and Counterclaim Defendants' Proposed Findings of Fact and Conclusions of Law Regarding Defendants' Inequitable Conduct and Unclean Hands Defenses (Redacted Public Version)," filed with the United States District Court for the District of Delaware in connection with Case No. 1:19-cv-1227-GBW on Nov. 17, 2023, 29 pages.
*EIS Inc.* v. *IntiHealth Ger GmbH et al.*, "Declaration of Allan M. Soobert in Support of Plaintiff's And Counterclaim Defendants' Brief in Support of Their Inequitable Conduct and Unclean Hands Defenses (Redacted Public Version)," filed with the United States District Court for the District of Delaware in connection with Case No. 1:19-cv-1227-GBW on Nov. 17, 2023, 50 pages.
*EIS Inc.* v. *IntiHealth Ger GmbH et al.*, "Defendants' and Counterclaimant's Response to Plaintiff's Opening Brief on Its Unenforceability Defenses (Redacted Public Version)," filed with the United States District Court for the District of Delaware in connection with Case No. 1:19-cv-1227-GBW on Dec. 15, 2023, 37 pages.
*EIS Inc.* v. *IntiHealth Ger GmbH et al.*, "Declaration of Califf T. Cooper in Support of Defendants' and Counterclaimants' Opening Brief on Plaintiff's Unenforceability Defenses (Redacted Public Version)," filed with the United States District Court for the District of Delaware in connection with Case No. 1:19-cv-1227-GBW on Dec. 15, 2023, 37 pages.
*EIS Inc.* v. *IntiHealth Ger GmbH et al.*, "Defendants' Proposed Findings of Fact and Conclusions of Law in Support of Its Response to Plaintiff's Opening Brief on Its Unenforceability Defenses (Redacted Public Version)," filed with the United States District Court for the District of Delaware in connection with Case No. 1:19-cv-1227-GBW on Dec. 15, 2023, 22 pages.
*EIS Inc.* v. *IntiHealth Ger GmbH et al.*, "Plaintiff's and Counterclaim Defendants' Reply Brief in Support of Their Inequitable Conduct and Unclean Hands Defenses," filed with the United States District Court for the District of Delaware in connection with Case No. 1:19-cv-1227-GBW on Dec. 22, 2023, 17 pages.
*EIS Inc.* v. *IntiHealth Ger GmbH et al.*, "Declaration of Allan M. Soobert in Support of Plaintiff's And Counterclaim Defendants' Reply Brief in Support of Their Inequitable Conduct and Unclean Hands Defenses," filed with the United States District Court for the District of Delaware in connection with Case No. 1:19-cv-1227-GBW on Dec. 22, 2023, 56 pages.
Eros by NuGyn, Inc., May 31, 2011, available at https://www.youtube.com/watch?v=N9c3fv6vfeg, 1 page.
*EIS Inc.* v. *IntiHealth Ger GmbH et al.*, "Plaintiff's and Counterclaim Defendants' Answering Brief in Opposition to Defendants' Summary Judgment and Daubert Motions (Redacted Public Version)," filed with the United States District Court for the District of Delaware in connection with Case No. 1:19-cv-1227-GBW on Jun. 16, 2023, 61 pages.
*EIS Inc.* v. *IntiHealth Ger GmbH et al.*, "Plaintiff and Counterclaim Defendants' Statement of Material Facts and Responsive Statement of Material Facts (Redacted Public Version)," filed with the United States District Court for the District of Delaware in connection with Case No. 1:19-cv-1227-GBW on Jun. 16, 2023, 28 pages.
*EIS Inc.* v. *IntiHealth Ger GmbH et al.*, "Declaration of Allan M. Soobert in Support of Plaintiff and Counterclaim Defendants' Opposition to Defendants' Motions For Partial Summary Judgment and Daubert Motions and Exhibits A-C," filed with the United States District Court for the District of Delaware in connection with Case No. 1:19-cv-1227-GBW on Jun. 16, 2023, 62 pages.
*EIS Inc.* v. *IntiHealth Ger GmbH et al.*, "Exhibit D filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 124 pages (uploaded in 4 parts).
*EIS Inc.* v. *IntiHealth Ger GmbH et al.*, "Exhibits E filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 91 pages.
*EIS Inc.* v. *IntiHealth Ger GmbH et al.*, "Exhibit F filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 40 pages.
*EIS Inc.* v. *IntiHealth Ger GmbH et al.*, "Exhibit G filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 110 pages.
*EIS Inc.* v. *IntiHealth Ger GmbH et al.*, "Exhibit H filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 116 pages.
*EIS Inc.* v. *IntiHealth Ger GmbH et al.*, "Exhibit I-N filed with Declaration of Allan M. Soobert in Support of Plaintiff And Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 101 pages.
*EIS Inc.* v. *IntiHealth Ger GmbH et al.*, "Exhibits O-S filed with Declaration of Allan M. Soobert in Support of Plaintiff and Counterclaim Defendants' Opposition TO Defendants' Motions for Partial Summary Judgment and Daubert Motions," filed with the United States District Court for the District of Delaware in connection with Case No. 1:19-cv-1227-GBW on Jun. 16, 2023, 119 pages.
*EIS Inc.* v. *IntiHealth Ger GmbH et al.*, "Exhibit T filed with Declaration of Allan M. Soobert in Support of Plaintiff and Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 325 pages.
*EIS Inc.* v. *IntiHealth Ger GmbH et al.*, "Exhibit U filed with Declaration of Allan M. Soobert in Support of Plaintiff And Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 275 pages.
*EIS Inc.* v. *IntiHealth Ger GmbH et al.*, "Exhibits V-AP filed with Declaration of Allan M. Soobert in Support of Plaintiff And Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 140 pages.
*EIS Inc.* v. *IntiHealth Ger GmbH et al.*, "Exhibits AQ-BX filed with Declaration of Allan M. Soobert in Support of Plaintiff And Counterclaim Defendants' Opposition to Defendants' Motions for Partial Summary Judgment and Daubert Motions," filed with the United States District Court for the District of Delaware in connection with Case No. 1:19-cv-1227-GBW on Jun. 16, 2023, 230 pages.
"Decision Denying Institution of Inter Partes Review," issued by the United States Patent and Trademark Office in connection with Case IPR2019-01302 on Jan. 13, 2020, 21 pages.

(56) References Cited

OTHER PUBLICATIONS

*EIS, Inc.* v. *Wow Tech International GmbH*, "Letter to the Honorable Leonard P. Stark from Jack B. Blumenfeld regarding Discovery Dispute," filed with the United States District Court for the District of Delaware in connection with Case No. 1:19-cv-1277-LPS on Dec. 5, 2019, 176 pages.
*EIS, Inc.* v. *Wow Tech International GmbH*, "Letter to the Honorable Leonard P. Stark from Paul D. Brown regarding Discovery Dispute," filed with the United States District Court for the District of Delaware in connection with Case No. 1:19-cv-1277-LPS on Dec. 6, 2019, 4 pages.
United Stated Patent and Trademark Office, "Notice of Allowance," issued in connection with U.S. Appl. No. 15/719,085, on Oct. 15, 2019, 12 pages.
United States Patent and Trademark Office, "Non-Final Office Action," issued in connection with U.S. Appl. No. 15/965,117, filed Jun. 27, 2019, 15 pages.
"English Translation of Grounds of Appeal," filed in connection with opposition of German Patent No. 102013110501.7 on Dec. 21, 2018, 44 pages (includes English translation of Exhibit B1).
"English Translation of Exhibit B2 of Grounds of Appeal," filed with the German Patent and Trademark in connection with opposition of German Patent No. 102013110501.7 on Dec. 21, 2018, 11 pages.
"Evidence in Support," filed with IP Australia in connection with Australian Patent Application No. 2018203659 on Nov. 8, 2019, 245 pages.
IP Australia, "Opposition—Evidence," issued in connection with Australian Patent Application No. 2018203659 on Nov. 12, 2019, 1 page.
"Decision Denying Institution of Inter Partes Review," issued by the United States Patent and Trademark Office in connection with Case IPR2019-01444 on Feb. 10, 2020, 16 pages.
"Summary of Opponent's Submissions," filed with IP Australia in connection with Australian Patent Application No. 2015386680 on Feb. 5, 2020, 39 pages.
*EIS, Inc.* v. *Wow Tech International GmbH*, "Defendant's Revised Motion to Dismiss EIS, Inc.'s Complaint Pursuant to Federal Rule of Civil Procedure 12(b)(6)," filed with the United States District Court for the District of Delaware in connection with Case No. 1:19-cv-01227-LPS on Feb. 4, 2020, 3 pages.
*EIS, Inc.* v. *Wow Tech International GmbH*, "Defendant's Opening Brief in Support of the Revised Motion to Dismiss Pursuant to Rule 12(b)(6)," filed with the United States District Court for the District of Delaware in connection with Case No. 1:19-cv-01227-LPS on Feb. 4, 2020, 30 pages.
*EIS, Inc.* v. *Wow Tech International GmbH*, "Plaintiff EIS's Answering Brief in Opposition to Defendant's Revised Motion to Dismiss Pursuant to Rule 12(b)(6)," filed with the United States District Court for the District of Delaware in connection with Case No. 1:19-cv-01227-LPS on Feb. 4, 2020, 33 pages.
United Stated Patent and Trademark Office, "Notice of Allowance," issued in connection with U.S. Appl. No. 15/719,085, on Feb. 3, 2020, 12 pages.
European Patent Office, "Extended European Search Report," issued in connection with European Patent Application No. EP 19161328.0, on Jul. 18, 2019, 9 pages (includes English translation of written opinion).
"Petitioner's Request for Rehearing Under 37 C.F.R. 42.71," filed with the United States Patent and Trademark Office in connection with Case IPR2019-01302 on Feb. 7, 2020, 20 pages.
"Petitioner's Amended Mandatory Notices Pursuant to 37 C.F.R. 42.8," filed with the United States Patent and Trademark Office in connection with Case IPR2019-01302 on Feb. 25, 2020, 5 pages.
"Petitioner's Amended Mandatory Notices Pursuant to 37 C.F.R. 42.8," filed with the United States Patent and Trademark Office in connection with Case IPR2019-01444 on Feb. 25, 2020, 5 pages.
"Petitioner's Request for Rehearing Under 37 C.F.R. 42.71," filed with the United States Patent and Trademark Office in connection with Case IPR2019-01444 on Mar. 6, 2020, 19 pages.
United States Patent and Trademark Office, "Notice of Allowance," issued in connection with U.S. Appl. No. 15/719,085, dated Mar. 13, 2020, 12 pages.
*EIS, Inc.* v. *Wow Tech International GmbH*, "Defendant's Reply in Support of Their Revised Motion to Dismiss Pursuant to Rule 12(b)(6)," filed with the United States District Court for the District of Delaware in connection with Case No. 1:19-cv-01227-LPS on Mar. 10, 2020, 16 pages.
Canadian Patent Office, "Notice of Allowance," issued in connection with Canadian Patent Application No. 2978739, dated Jan. 30, 2020, 1 page.
United States Patent and Trademark Office, "Notice of Allowance," issued in connection with U.S. Appl. No. 15/965,117, dated Mar. 17, 2020, 9 pages.
Canadian Patent Office, "Office Action," issued in connection with Canadian Patent Application No. 3051672, dated Mar. 4, 2020, 4 pages.
United States Patent and Trademark Office, "Notice of Allowance," issued in connection with U.S. Appl. No. 15/354,599, dated Mar. 25, 2020, 21 pages.
Korean Patent Office, "Notice of Allowance," issued in connection with Korean Patent Application No. 10-2017-7028845, dated Mar. 30, 2020, 6 pages (includes English translation).
"Order," issued by the United States Patent and Trademark Office in connection with Case IPR2019-01302 on Apr. 6, 2020, 2 pages.
"Order," issued by the United States Patent and Trademark Office in connection with Case IPR2019-01444 on Apr. 6, 2020, 2 pages.
"Decision Denying Institution of Inter Partes Review," filed with the United States Patent and Trademark Office in connection with Case IPR2020-00007 on Apr. 6, 2020, 31 pages.
United States Patent and Trademark Office, "Supplemental Notice of Allowability," issued in connection with U.S. Appl. No. 15/719,085, dated Apr. 3, 2020, 7 pages.
United States Patent and Trademark Office, "Notice of Allowance," issued in connection with U.S. Appl. No. 15/965,208, dated Apr. 8, 2020, 9 pages.
"Petition for Inter Partes Review of U.S. Pat. No. 9,937,097," filed with the United States Patent and Trademark Office on Jul. 3, 2019, 95 pages.
"Petition for Inter Partes Review of U.S. Pat. No. 9,937,097," Exhibit 1001, filed with the United States Patent and Trademark Office on Jul. 3, 2019, 18 pages.
"Petition for Inter Partes Review of U.S. Pat. No. 9,937,097," Exhibit 1002, filed with the United States Patent and Trademark Office on Jul. 3, 2019, 215 pages.
"Petition for Inter Partes Review of U.S. Pat. No. 9,937,097," Exhibit 1003, filed with the United States Patent and Trademark Office on Jul. 3, 2019, 360 pages.
"Petition for Inter Partes Review of U.S. Pat. No. 9,937,097," Exhibit 1004, filed with the United States Patent and Trademark Office on Jul. 3, 2019, 9 pages.
"Petition for Inter Partes Review of U.S. Pat. No. 9,937,097," Exhibit 1005, filed with the United States Patent and Trademark Office on Jul. 3, 2019, 34 pages.
"Petition for Inter Partes Review of U.S. Pat. No. 9,937,097," Exhibit 1006, filed with the United States Patent and Trademark Office on Jul. 3, 2019, 13 pages.
"Petition for Inter Partes Review of U.S. Pat. No. 9,937,097," Exhibit 1007, filed with the United States Patent and Trademark Office on Jul. 3, 2019, 11 pages.
"Petition for Inter Partes Review of U.S. Pat. No. 9,937,097," Exhibit 1008, filed with the United States Patent and Trademark Office on Jul. 3, 2019, 46 pages.
"Petition for Inter Partes Review of U.S. Pat. No. 9,937,097," Exhibit 1009, filed with the United States Patent and Trademark Office on Jul. 3, 2019, 1837 pages. (Uploaded in 4 parts.).
"Petition for Inter Partes Review of U.S. Pat. No. 9,937,097," Exhibit 1010, filed with the United States Patent and Trademark Office on Jul. 3, 2019, 17 pages.
"Petition for Inter Partes Review of U.S. Pat. No. 9,937,097," Exhibit 1011, filed with the United States Patent and Trademark Office on Jul. 3, 2019, 6 pages.

(56) References Cited

OTHER PUBLICATIONS

"Petition for Inter Partes Review of U.S. Pat. No. 9,937,097," Exhibit 1012, filed with the United States Patent and Trademark Office on Jul. 3, 2019, 47 pages.
"Petition for Inter Partes Review of U.S. Pat. No. 9,937,097," Exhibit 1013, filed with the United States Patent and Trademark Office on Jul. 3, 2019, 61 pages.
"Petition for Inter Partes Review of U.S. Pat. No. 9,937,097," Exhibit 1014, filed with the United States Patent and Trademark Office on Jul. 3, 2019, 5 pages.
"Petition for Inter Partes Review of U.S. Pat. No. 9,937,097," Exhibit 1015, filed with the United States Patent and Trademark Office on Jul. 3, 2019, 1049 pages.
United States Patent and Trademark Office, "Notice of Allowance," issued in connection with U.S. Appl. No. 15/719,085, dated on Apr. 21, 2020, 12 pages.
"Petitioner's Amended Mandatory Notices Pursuant to 37 C.F.R. 42.8," filed with the United States Patent and Trademark Office in connection with Case IPR2020-00007 on Feb. 25, 2020, 5 pages.
China National Intellectual Property Administration, "Second Office Action," issued in connection with Chinese Patent Application No. 201710927530.4, dated Apr. 16, 2020, 6 pages (English Translation Included).
United States Patent and Trademark Office, "Notice of Allowance," issued in connection with U.S. Appl. No. 15/719,085, dated May 6, 2020, 12 pages.
United States Patent and Trademark Office, "Notice of Allowance," issued in connection with U.S. Appl. No. 15/354,599, dated on May 6, 2020, 21 pages.
"Petitioner's Request for Rehearing Under 37 C.F.R. 42.71," filed with the United States Patent and Trademark Office in connection with Case IPR2020-00007 on May 6, 2020, 20 pages.
"Petitioner's Amended Mandatory Notices Pursuant to 37 C.F.R. 42.8," filed with the United States Patent and Trademark Office in connection with Case IPR2019-01302 on Apr. 17, 2020, 5 pages.
"Petitioner's Amended Mandatory Notices Pursuant to 37 C.F.R. 42.8," filed with the United States Patent and Trademark Office in connection with Case IPR2019-01444 on Apr. 17, 2020, 5 pages.
United States Patent and Trademark Office, "Notice of Allowance," issued in connection with U.S. Appl. No. 15/965,117, dated May 14, 2020, 9 pages.
United States Patent and Trademark Office, "Notice of Allowance," issued in connection with U.S. Appl. No. 15/965,208, dated May 15, 2020, 9 pages.
United States Patent and Trademark Office, "Supplemental Notice of Allowability," issued in connection with U.S. Appl. No. 15/719,085, dated May 12, 2020, 6 pages.
United States Patent and Trademark Office, "Supplemental Notice of Allowability," issued in connection with U.S. Appl. No. 15/719,085, dated May 27, 2020, 6 pages.
United States Patent and Trademark Office, "Corrected Notice of Allowability," issued in connection with U.S. Appl. No. 15/354,599, dated May 27, 2020, 19 pages.
United States Patent and Trademark Office, "Corrected Notice of Allowability," issued in connection with U.S. Appl. No. 15/965,117, dated Jun. 15, 2020, 3 pages.
United States Patent and Trademark Office, "Corrected Notice of Allowability," issued in connection with U.S. Appl. No. 15/965,208, mailed on Jun. 12, 2020, 11 pages.
"Decision Granting Petitioner's Request on Rehearing of Decision Denying Institution, Granting Institution of Inter Partes Review," issued by the United States Patent and Trademark Office in connection with Case IPR2019-01302 on Jun. 17, 2020, 9 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Jun. 19, 2020, 13 pages.
*EIS, Inc.* v. *Wow Tech International GmbH*, "Defendant's Response to Plaintiff Notice of Supplemental Authority," filed with the United States District Court for the District of Delaware in connection with Case No. 1:19-cv-01227-LPS on Jun. 23, 2020, 8 pages.
*EIS GmbH* v. *USPTO*, "Complaint," filed with the United States District Court for the Eastern District of Virginia in connection with Case No. 1:20-cv-00430-LMB-TCB on Apr. 17, 2020, 636 pages.
*EIS GmbH* v. *USPTO*, "Amended Complaint," filed with the United States District Court for the Eastern District of Virginia in connection with Case No. 1:20-cv-00430-LMB-TCB on Jun. 25, 2020, 577 pages.
United States Patent and Trademark Office, "Corrected Notice of Allowability," issued in connection with U.S. Appl. No. 15/354,599, dated Jul. 13, 2020, 2 pages.
United States Patent and Trademark Office, "Corrected Notice of Allowability," issued in connection with U.S. Appl. No. 15/354,599, dated Aug. 3, 2020, 2 pages.
United States and Trademark Office, "Corrected Notice of Allowability," issued in connection with U.S. Appl. No. 15/965,117, dated Jul. 22, 2020, 3 pages.
United States Patent and Trademark Office, "Supplemental Notice of Allowability," issued in connection with U.S. Appl. No. 15/719,085, dated Jul. 27, 2020, 2 pages.
United States Patent and Trademark Office, "Corrected Notice of Allowability," issued in connection with U.S. Appl. No. 15/965,208, dated Jul. 22, 2020, 3 pages.
"Decision Granting Petitioner's Request on Rehearing of Decision Denying Institution, Granting Institution of Inter Partes Review," issued by the United States Patent and Trademark Office in connection with Case IPR2019-01444 on Aug. 11, 2020, 13 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Aug. 14, 2020, 17 pages.
Canadian Patent Office, "Office Action," issued in connection with Canadian Patent Application No. 2978495, dated Apr. 14, 2020, 4 pages.
"Minutes of the Public Hearing in Opposition Proceedings Before the Patent Division 44 of the German Patent and Trademark Office," issued in connection with opposition of German Patent No. 102013110501.7, Apr. 17, 2018, 6 pages (includes English translation).
*EIS, Inc.* v. *Wow Tech International GmbH, et al.*, "First Amended Complaint," filed with the United States District Court for the District of Delaware, case No. 1:19-cv-01227-LPS, Sep. 9, 2019, 40 pages.
*EIS, Inc.* v. *Wow Tech International GmbH, et al.*, "First Amended Complaint—Exhibits 1-31," filed with the United States District Court for the District of Delaware, case No. 1:19-cv-01227-LPS, Sep. 9, 2019, 527 pages.
"Petition for Inter Partes Review of U.S. Pat. No. 9,849,061," filed with the United States Patent and Trademark Office on Oct. 2, 2019, 97 pages.
"Petition for Inter Partes Review of U.S. Pat. No. 9,849,061," Exhibit 1001, filed with the United States Patent and Trademark Office on Oct. 2, 2019, 18 pages.
"Petition for Inter Partes Review of U.S. Pat. No. 9,849,061," Exhibit 1002, filed with the United States Patent and Trademark Office on Oct. 2, 2019, 137 pages. (Uploaded in 5 parts).
"Petition for Inter Partes Review of U.S. Pat. No. 9,849,061," Exhibit 1003, filed with the United States Patent and Trademark Office on Oct. 2, 2019, 1,367 pages. (Uploaded in 5 parts).
"Petition for Inter Partes Review of U.S. Pat. No. 9,849,061," Exhibit 1004, filed with the United States Patent and Trademark Office on Oct. 2, 2019, 9 pages.
"Petition for Inter Partes Review of U.S. Pat. No. 9,849,061," Exhibit 1006, filed with the United States Patent and Trademark Office on Oct. 2, 2019, 34 pages.
"Petition for Inter Partes Review of U.S. Pat. No. 9,849,061," Exhibit 1007, filed with the United States Patent and Trademark Office on Oct. 2, 2019, 22 pages.
"Petition for Inter Partes Review of U.S. Pat. No. 9,849,061," Exhibit 1008, filed with the United States Patent and Trademark Office on Oct. 2, 2019, 40 pages.

(56) References Cited

OTHER PUBLICATIONS

"Petition for Inter Partes Review of U.S. Pat. No. 9,849,061," Exhibit 1010, filed with the United States Patent and Trademark Office on Oct. 2, 2019, 5 pages.
"Petition for Inter Partes Review of U.S. Pat. No. 9,849,061," Exhibit 1011, filed with the United States Patent and Trademark Office on Oct. 2, 2019, 17 pages.
"Petition for Inter Partes Review of U.S. Pat. No. 9,849,061," Exhibit 1012, filed with the United States Patent and Trademark Office on Oct. 2, 2019, 61 pages.
"Petition for Inter Partes Review of U.S. Pat. No. 9,849,061," Exhibit 1013, filed with the United States Patent and Trademark Office on Oct. 2, 2019, 46 pages.
"Notification of an Opposition," issued by the European Patent Office in connection with European Patent No. EP2976057 on Sep. 12, 2019, opposition filed by EIS GmbH, 132 pages (includes English translation).
"Notification of an Opposition," issued by the European Patent Office in connection with European Patent No. EP2976057 on Sep. 10, 2019, opposition filed by Fun Factory Ltd., 117 pages (includes English translation).
"Notification of an Opposition," issued by the European Patent Office in connection with European Patent No. EP2976057 on Sep. 12, 2019, opposition filed by Hu Xiaorong, 35 pages (includes English translation).
"Opposition to a European Patent," filed with the European Patent Office by EIS GmbH in connection with European Patent No. EP3308762 on Sep. 11, 2019, 95 pages (includes English translation).
"Opposition to a European Patent," filed with the European Patent Office by Fun Factory Ltd. in connection with European Patent No. EP3308762 on Sep. 11, 2019, 124 pages (includes English translation).
IP Australia, "Examination Report," issued in connection with Australian Application No. 2018222907 on Sep. 3, 2019, 4 pages.
IP Australia, "Examination Report," issued in connection with Australian Application No. 2019201070 on Jul. 9, 2019, 4 pages.
Korean Patent Office, "Office Action," issued in connection with Korean Application No. 10-2017-0129112 on Aug. 29, 2019, 9 pages (includes English summary of Office action).
Korean Patent Office, "Office Action," issued in connection with Korean Application No. 10-2017-7028845 on Sep. 18, 2019, 7 pages (includes English summary of Office action).
European Patent Office, "Notice of Submission of Third Party Observation," issued in connection with European Application No. EP17202394.7 on Jul. 9, 2019, 5 pages (copy of submission in English).
"Opposition Document," filed in connection with opposition of German Patent No. 102013110501.7 on Jan. 24, 2018, 69 pages (includes English translation).
*EIS, Inc.* v. *Wow Tech International GmbH, et al.*, "Defendants' Consolidated Motion to Dismiss EIS, Inc.'s Complaint Pursuant to Federal Rules Of Civil Procedure 12(B)(2) and 12(b)(6)," filed with the United States District Court for the District of Delaware in connection with Case No. 1:19-cv-1277-LPS on Oct. 2, 2019, 3 pages.
United States Patent and Trademark Office, "Corrected Notice of Allowability," issued in connection with U.S. Appl. No. 15/354,599 on Nov. 12, 2019, 2 pages.
German Patent and Trademark Office, "English Translation of Invitation to Speak," issued in connection with opposition of German Patent No. 102013110501.7 on Nov. 17, 2016, 20 pages.
"English Translation of Patentee Submission," filed with the German Patent and Trademark Office in connection with opposition of German Patent No. 102013110501.7 on Sep. 18, 2017, 38 pages.
"English Translation of Submission of Opponent," filed with the German Patent and Trademark Office in connection with opposition of German Patent No. 102013110501.7 on Oct. 5, 2017, 6 pages.
"English Translation of Submission of Opponent," filed with the German Patent and Trademark Office in connection with opposition of German Patent No. 102013110501.7 on Nov. 13, 2017, 8 pages.
German Patent and Trademark Office, "English Translation of Summons to Attend Oral Proceedings," issued in connection with opposition of German Patent No. 102013110501.7 on Nov. 28, 2017, 3 pages.
"English Translation of Patentee Submission," filed with the German Patent and Trademark Office in connection with opposition of German Patent No. 102013110501.7 on Jan. 30, 2018, 5 pages.
German Patent and Trademark Office, "English Translation of Additions to Summons," issued in connection with opposition of German Patent No. 102013110501.7 on Nov. 24, 2017, 1 page.
German Patent and Trademark Office, "English Translation of Summons to Attend Oral Proceedings," issued in connection with opposition of German Patent No. 102013110501.7 on Feb. 2, 2018, 3 pages.
"English Translation of Opponent Submission," filed with the German Patent and Trademark Office in connection with opposition of German Patent No. 102013110501.7 on Mar. 14, 2018, 5 pages.
"English Translation of Patentee Submission," filed with the German Patent and Trademark Office in connection with opposition of German Patent No. 102013110501.7 on Apr. 3, 2018, 2 pages.
"English Translation of Patentee Submission," filed with the German Patent and Trademark Office, in connection with opposition of German Patent No. 102013110501.7 on Apr. 12, 2018, 45 pages.
"English Translation of Auxiliary Request 1," filed with the German Patent and Trademark Office in connection with opposition of German Patent No. 2013110501.7 on Apr. 16, 2018, 5 pages.
"English Translation of Auxiliary Request 2," filed with the German Patent and Trademark Office in connection with opposition of German Patent No. 2013110501.7 on Apr. 16, 2018, 6 pages.
"English Translation of Auxiliary Request 3," filed with the German Patent and Trademark Office in connection with opposition of German Patent No. 2013110501.7 on Apr. 16, 2018, 5 pages.
*Novoluto GmbH* v. *EIS GmbH*, "Judgment," issued by the German Court in connection with German litigation proceeding on Dec. 14, 2017, 71 pages (includes English translation).
*Novoluto GmbH* v. *EIS GmbH*, "Transcript," filed with the German Court in connection German litigation proceeding on Jul. 20, 2017, 44 pages (includes English translation).
*Novoluto GmbH* v. *EIS GmbH*, "Complaint," filed the German Court in connection German litigation proceeding on Aug. 5, 2016, 75 pages (includes English translation).
United States Patent and Trademark Office, "Notice of Filing Date Accorded to Petition and Time for Filing Patent Owner Preliminary Response," issued in connection with Case IPR2019-01302 on Jul. 18, 2019, 5 pages.
"Patent Owner's Amended Mandatory Notices Pursuant to 37 C.F.R. 42.8," filed with the United States Patent and Trademark Office in connection with Case IPR2019-01302 on Sep. 3, 2019, 6 pages.
"Patent Owner's Amended Mandatory Notices Pursuant to 37 C.F.R. 42.8," filed with the United States Patent and Trademark Office in connection with Case IPR2019-01302 on Sep. 30, 2019, 6 pages.
"Patent Owner's Amended Mandatory Notices Pursuant to 37 C.F.R. 42.8," filed with the United States Patent and Trademark Office in connection with Case IPR2019-01302 on Oct. 18, 2019, 6 pages.
"Patent Owner's Mandatory Notices," filed with the United States Patent and Trademark Office in connection with Case IPR2019-01302 on Jul. 24, 2019, 4 pages.
"Patent Owner's Updated Mandatory Notices," filed with the United States Patent and Trademark Office in connection with Case IPR2019-01302 on Aug. 21, 2019, 4 pages.
"Petitioner's Amended Mandatory Notices Pursuant To 37 C.F.R. 42.8," filed with the United States Patent and Trademark Office in connection with Case IPR2019-01302 on Oct. 8, 2019, 5 pages.
"Patent Owner's Preliminary Response Pursuant To 37 C.F.R. § 42.107," filed with the United States Patent and Trademark Office in connection with Case IPR2019-01302 on Oct. 18, 2019, 85 pages.

(56) References Cited

OTHER PUBLICATIONS

"Patent Owner's Preliminary Response Pursuant to 37 C.F.R. § 42.107," Exhibit 2001, filed with the United States Patent and Trademark Office in connection with Case IPR2019-01302 on Oct. 18, 2019, 80 pages.
"Patent Owner's Preliminary Response Pursuant to 37 C.F.R. § 42.107," Exhibit 2002, filed with the United States Patent and Trademark Office in connection with Case IPR2019-01302 on Oct. 18, 2019, 30 pages.
"Patent Owner's Preliminary Response Pursuant to 37 C.F.R. § 42.107," Exhibit 2003, filed with the United States Patent and Trademark Office in connection with Case IPR2019-01302 on Oct. 18, 2019, 18 pages.
"Patent Owner's Preliminary Response Pursuant to 37 C.F.R. § 42.107," Exhibit 2004, filed with the United States Patent and Trademark Office in connection with Case IPR2019-01302 on Oct. 18, 2019, 47 pages.
"Patent Owner's Preliminary Response Pursuant to 37 C.F.R. § 42.107," Exhibit 2005, filed with the United States Patent and Trademark Office in connection with Case IPR2019-01302 on Oct. 18, 2019, 60 pages.
"Patent Owner's Preliminary Response Pursuant to 37 C.F.R. § 42.107," Exhibit 2006, filed with the United States Patent and Trademark Office in connection with Case IPR2019-01302 on Oct. 18, 2019, 19 pages.
"Patent Owner's Preliminary Response Pursuant to 37 C.F.R. § 42.107," Exhibit 2007, filed with the United States Patent and Trademark Office in connection with Case IPR2019-01302 on Oct. 18, 2019, 16 pages.
"Patent Owner's Preliminary Response Pursuant to 37 C.F.R. § 42.107," Exhibit 2008, filed with the United States Patent and Trademark Office in connection with Case IPR2019-01302 on Oct. 18, 2019, 10 pages.
"Patent Owner's Preliminary Response Pursuant to 37 C.F.R. § 42.107," Exhibit 2009, filed with the United States Patent and Trademark Office in connection with Case IPR2019-01302 on Oct. 18, 2019, 12 pages.
"Patent Owner's Preliminary Response Pursuant to 37 C.F.R. § 42.107," Exhibit 2010, filed with the United States Patent and Trademark Office in connection with Case IPR2019-01302 on Oct. 18, 2019, 9 pages.
"Patent Owner's Preliminary Response Pursuant to 37 C.F.R. § 42.107," Exhibit 2011, filed with the United States Patent and Trademark Office in connection with Case IPR2019-01302 on Oct. 18, 2019, 2 pages.
"Patent Owner's Preliminary Response Pursuant to 37 C.F.R. § 42.107," Exhibit 2012, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2013, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2014, filed with the United States Patent and Trademark Office in connection with Case IPR2019-01302 on Oct. 18, 2019, 77 pages.
"Patent Owner's Preliminary Response Pursuant to 37 C.F.R. § 42.107," Exhibit 2015, filed with the United States Patent and Trademark Office in connection with Case IPR2019-01302 on Oct. 18, 2019, 76 pages.
"Patent Owner's Preliminary Response Pursuant to 37 C.F.R. § 42.107," Exhibit 2016, filed with the United States Patent and Trademark Office in connection with Case IPR2019-01302 on Oct. 18, 2019, 169 pages.
"Patent Owner's Preliminary Response Pursuant to 37 C.F.R. § 42.107," Exhibit 2017, filed with the United States Patent and Trademark Office in connection with Case IPR2019-01302 on Oct. 18, 2019, 40 pages.
"Patent Owner's Preliminary Response Pursuant to 37 C.F.R. § 42.107," Exhibit 2018, filed with the United States Patent and Trademark Office in connection with Case IPR2019-01302 on Oct. 18, 2019, 15 pages.
"Patent Owner's Preliminary Response Pursuant to 37 C.F.R. § 42.107," Exhibit 2019, filed with the United States Patent and Trademark Office in connection with Case IPR2019-01302 on Oct. 18, 2019, 8 pages.
"Patent Owner's Preliminary Response Pursuant to 37 C.F.R. § 42.107," Exhibit 2020, filed with the United States Patent and Trademark Office in connection with Case IPR2019-01302 on Oct. 18, 2019, 11 pages.
"Patent Owner's Preliminary Response Pursuant to 37 C.F.R. § 42.107," Exhibit 2021, filed with the United States Patent and Trademark Office in connection with Case IPR2019-01302 on Oct. 18, 2019, 25 pages.
"Patent Owner's Preliminary Response Pursuant to 37 C.F.R. § 42.107," Exhibit 2022, filed with the United States Patent and Trademark Office in connection with Case IPR2019-01302 on Oct. 18, 2019, 97 pages.
"Patent Owner's Preliminary Response Pursuant to 37 C.F.R. § 42.107," Exhibit 2023, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2024, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2025, filed with the United States Patent and Trademark Office in connection with Case IPR2019-01302 on Oct. 18, 2019, 1 page.
*EIS Inc.* v. *IntiHealth Ger GmbH et al.*, "Plaintiff EIS, Inc.'s Notice of Subsequent Authority in Support of Its Opposition to Defendants' Motion to Strike EIS's Election of Prior-Art Based Invalidity Arguments (Redacted Public Version)," filed with the United States District Court for the District of Delaware in connection with Case No. 1:19-cv-1227-GBW on May 11, 2023, 1,179 pages (uploaded in 6 parts).
*EIS Inc.* v. *IntiHealth Ger GmbH et al.*, "Letter to the Honorable Gregory B. Williams Regarding Counterclaim-Defendants' Motion to Strike Untimely Discovery and Expert Disclosures (Redacted Public Version)," filed with the United States District Court for the District of Delaware in connection with Case No. 1:19-cv-1227-GBW on May 16, 2023, 173 pages.
*EIS Inc.* v. *IntiHealth Ger GmbH et al.*, "Plaintiff's and Counter-claim Defendants' Opening Brief in Support of Their Daubert Motion to Exclude Opinions of Robert L. Stoll (Redacted Public Version)," filed with the United States District Court for the District of Delaware in connection with Case No. 1:19-cv-1227-GBW on May 17, 2023, 16 pages.
*EIS Inc.* v. *IntiHealth Ger GmbH et al.*, "Declaration of Allan M. Soobert in Support of Plaintiff's and Counterclaim Defendants' Daubert Motion to Exclude Opinions of Robert L. Stoll (Redacted Public Version)," filed with the United States District Court for the District of Delaware in connection with Case No. 1:19-cv-1227-GBW on May 17, 2023, 111 pages.
*EIS Inc.* v. *IntiHealth Ger GmbH et al.*, "Plaintiff's and Counter-claim Defendants' Opening Brief in Support of Their Daubert Motion to Exclude Certain "Stimulation Device" Opinions (Public Version)," filed with the United States District Court for the District of Delaware in connection with Case No. 1:19-cv-1227-GBW on May 19, 2023, 9 pages.
*EIS Inc.* v. *IntiHealth Ger GmbH et al.*, "Declaration of Allan M. Soobert in Support of Plaintiff's and Counterclaim Defendants' Opening Brief in Support of Their Daubert Motion to Exclude Certain "Stimulation Device" Opinions (Public Version)," filed with the United States District Court for the District of Delaware in connection with Case No. 1:19-cv-1227-GBW on May 19, 2023, 498 pages (uploaded in 2 parts).
*EIS Inc.* v. *IntiHealth Ger GmbH et al.*, "Plaintiff's and Counter-claim Defendants' Opening Brief in Support of Their Daubert Motion to Exclude Certain Opinions of Drs. Cameron and Herbenick

(56) References Cited

OTHER PUBLICATIONS (Public Version)," filed with the United States District Court for the District of Delaware in connection with Case No. 1:19-cv-1227-GBW on May 19, 2023, 9 pages.
*EIS Inc.* v. *IntiHealth Ger GmbH et al.*, "Declaration of Allan M. Soobert in Support of Plaintiff's and Counterclaim Defendants' Daubert Motion to Exclude Certain Opinions of Drs. Cameron and Herbenick (Public Version)," filed with the United States District Court for the District of Delaware in connection with Case No. 1:19-cv-1227-GBW on May 19, 2023, 125 pages (uploaded in 2 parts).
*EIS Inc.* v. *IntiHealth Ger GmbH et al.*, "Plaintiff's and Counterclaim Defendants' Opening Brief in Support of Their Daubert Motion to Exclude The Opinions of Dr. Debra Herbenick (Public Version)," filed with the United States District Court for the District of Delaware in connection with Case No. 1:19-cv-1227-GBW on May 19, 2023, 8 pages.
*EIS Inc.* v. *IntiHealth Ger GmbH et al.*, "Declaration of Allan M. Soobert in Support of Plaintiff's and Counterclaim Defendants' Daubert Motion to Exclude the Opinions of Dr. Debra Herbenick (Public Version)," filed with the United States District Court for the District of Delaware in connection with Case No. 1:19-cv-1227-GBW on May 19, 2023, 697 pages (uploaded in 3 parts).
*EIS Inc.* v. *IntiHealth Ger GmbH et al.*, "Plaintiff's and Counterclaim Defendants' Brief in Support of Motion No. 2 for Partial Summary Judgment That the Asserted Claims of U.S. Patent Nos. 11,090,220, 11,103,418, 9,937,097 Are Not Entitled to an Effective Filing Date of Their Respective Earliest U.S. Parent Patents (Public Version)," filed with the United States District Court for the District of Delaware in connection with Case No. 1:19-cv-1227-GBW on May 19, 2023, 10 pages.
*EIS Inc.* v. *IntiHealth Ger GmbH et al.*, "Declaration of Allan M. Soobert in Support of Plaintiff's and Counterclaim Defendants' Motion No. 2 for Partial Summary Judgment That the Asserted Claims of U.S. Patent Nos. 11,090,220, 11,103,418, 9,937,097 Are Not Entitled to an Effective Filing Date of Their Respective Earliest U.S. Parent Patents (Public Version)," filed with the United States District Court for the District of Delaware in connection with Case No. 1:19-cv-1227-GBW on May 19, 2023, 274 pages (uploaded in 2 parts).
*EIS Inc.* v. *IntiHealth Ger GmbH et al.*, "Plaintiff's and Counterclaim Defendants' Concise Statement of Facts in Support of Motion No. 2 for Partial Summary Judgment That the Asserted Claims of U.S. Patent Nos. 11,090,220, 11,103,418, 9,937,097 Are Not Entitled to an Effective Filing Date of Their Respective Earliest U.S. Parent Patents (Public Version)," filed with the United States District Court for the District of Delaware in connection with Case No. 1:19-cv-1227-GBW on May 19, 2023, 8 pages.
*EIS Inc.* v. *IntiHealth Ger GmbH et al.*, "Plaintiff's and Counterclaim Defendants' Brief in Support of Motion No. 4 for Partial Summary Judgment of Noninfringement of All Asserted Claims of U.S. Pat. No. 9,763,851 (Public Version)," filed with the United States District Court for the District of Delaware in connection with Case No. 1:19-cv-1227-GBW on May 19, 2023, 10 pages.
*EIS Inc.* v. *IntiHealth Ger GmbH et al.*, "Declaration of Allan M. Soobert in Support of Plaintiff's and Counterclaim Defendants' Motion No. 4 for Partial Summary Judgment of Noninfringement of All Asserted Claims of U.S. Pat. No. 9,763,851 (Public Version)," filed with the United States District Court for the District of Delaware in connection with Case No. 1:19-cv-1227-GBW on May 19, 2023, 182 pages (uploaded in 3 parts).
*EIS Inc.* v. *IntiHealth Ger GmbH et al.*, "Plaintiff's Concise Statement of Facts in Support of Motion No. 4 for Partial Summary Judgment of Noninfringement of All Asserted Claims of U.S. Pat. No. 9,763,851 (Public Version)," filed with the United States District Court for the District of Delaware in connection with Case No. 1:19-cv-1227-GBW on May 19, 2023, 8 pages.
*EIS Inc.* v. *IntiHealth Ger GmbH et al.*, "Plaintiff's and Counterclaim Defendants' Brief in Support of Their Motion No. 5 for Partial Summary Judgment of Invalidity of The Asserted Claims of U.S. Pat. Nos. 11,090,220 and 11,103,418 (Public Version)," filed with the United States District Court for the District of Delaware in connection with Case No. 1:19-cv-1227-GBW on May 19, 2023, 6 pages.
*EIS Inc.* v. *IntiHealth Ger GmbH et al.*, "Declaration of Allan M. Soobert in Support of Plaintiff's and Counterclaim Defendants' Motion No. 5 for Partial Summary of Invalidity of the Asserted Claims of U.S. Pat. Nos. 11,090,220 And 11,103,418 (Public Version)," filed with the United States District Court for the District of Delaware in connection with Case No. 1:19-cv-1227-GBW on May 19, 2023, 168 pages (uploaded in 2 parts).
*EIS Inc.* v. *IntiHealth Ger GmbH et al.*, "Plaintiff's And Counterclaim Defendants' Concise Statement of Facts in Support of Their Motion No. 5 for Partial Summary Judgment of Invalidity of the Asserted Claims of U.S. Pat. Nos. 11,090,220 And 11,103,418 (Public Version)," filed with the United States District Court for the District of Delaware in connection with Case No. 1:19-cv-1227-GBW on May 19, 2023, 4 pages.
*EIS Inc.* v. *IntiHealth Ger GmbH et al.*, "Reply Letter to the Honorable Gregory B. Williams in Support of Counterclaim-Defendants' Motion to Strike Untimely Discovery and Expert Disclosures," filed with the United States District Court for the District of Delaware in connection with Case No. 1:19-cv-1227-GBW on May 19, 2023, 28 pages.
IP Australia, "Opposition—Decision Issued," issued in connection with Australian Patent Application No. 2018203659 on Jan. 5, 2021, 35 pages.
United States Patent and Trademark Office, "Final Office action," issued in connection with U.S. Appl. No. 15/354,599, on Jun. 28, 2018, 39 pages.
United States Patent and Trademark Office, "Non-Final Office action," issued in connection with U.S. Appl. No. 15/965,117, on Jun. 29, 2018, 32 pages.
International Searching Authority, "International Search Report," issued in connection with International Application No. PCT/DE2019/100308, on Oct. 10, 2019, 10 pages (includes English translation).
International Searching Authority, "Written Opinion," issued in connection with International Application No. PCT/DE2019/100308, on Oct. 10, 2019, 21 pages (includes English translation).
*EIS, Inc.* v. *Wow Tech International GmbH*, "Defendants' Response to Plaintiff's Second Notice of Supplemental Authority," filed with the United States District Court for the District of Delaware in connection with Case No. 1:19-cv-01227-LPS on Aug. 21, 2020, 191 pages.
European Patent Office, "Search Report," issued in connection with European Application No. 20174260, on Sep. 22, 2020, 18 pages (includes English translation).
United States Patent and Trademark Office, "Non-Final Office action," issued connection with U.S. Appl. No. 15/965,208, on Jun. 29, 2018, 31 pages.
International Searching Authority, "Written Opinion," issued in connection with International Application No. PCT/DE2019/100860, on Dec. 18, 2019, 11 pages (includes English translation).
"Decision Granting Petitioner's Request on Rehearing of Decision Denying Institution, Granting Institution of Inter Partes Review," issued by the United States Patent and Trademark Office in connection with Case IPR 2020-00007 on Sep. 25, 2020, 22 pages.
IP Australia, "Notice of Opposition," issued in connection with Australian Patent Application No. 2018222907 on Dec. 4, 2020, 110 pages.
Canadian Patent Office, "Office Action," issued in connection with Canadian Application No. 2,978,739, on Jun. 12, 2018, 4 pages.
"Petitioner's Reply to Patent Owner's Response," filed with the United States Patent and Trademark Office in connection with Case IPR2019-01302 on Dec. 4, 2020, 41 pages.
"Petitioner's Reply to Patent Owner's Response," Exhibit 1018, filed with the United States Patent and Trademark Office in connection with Case IPR2019-01302 on Dec. 4, 2020, 79 pages.
"Petitioner's Reply to Patent Owner's Response," Exhibit 1019, filed with the United States Patent and Trademark Office in connection with Case IPR2019-01302 on Dec. 4, 2020, 4 pages.

(56) References Cited

OTHER PUBLICATIONS

"Petitioner's Reply to Patent Owner's Response," Exhibit 1020, filed with the United States Patent and Trademark Office in connection with Case IPR2019-01302 on Dec. 4, 2020, 55 pages.
"Petitioner's Reply to Patent Owner's Response," Exhibit 1021, filed with the United States Patent and Trademark Office in connection with Case IPR2019-01302 on Dec. 4, 2020, 16 pages.
"Petitioner's Reply to Patent Owner's Response," Exhibit 1022, filed with the United States Patent and Trademark Office in connection with Case IPR2019-01302 on Dec. 4, 2020, 258 pages.
"Petitioner's Reply to Patent Owner's Response," Exhibit 1023, filed with the United States Patent and Trademark Office in connection with Case IPR2019-01302 on Dec. 4, 2020, 234 pages.
"Petitioner's Reply to Patent Owner's Response," Exhibit 1024, filed with the United States Patent and Trademark Office in connection with Case IPR2019-01302 on Dec. 4, 2020, 19 pages.
"Petitioner's Reply to Patent Owner's Response," Exhibit 1025, filed with the United States Patent and Trademark Office in connection with Case IPR2019-01302 on Dec. 4, 2020, 22 pages.
"Petitioner's Reply to Patent Owner's Response," Exhibit 1026, filed with the United States Patent and Trademark Office in connection with Case IPR2019-01302 on Dec. 4, 2020, 3 pages.
"Petitioner's Reply to Patent Owner's Response," Exhibit 1027, filed with the United States Patent and Trademark Office in connection with Case IPR2019-01302 on Dec. 4, 2020, 4 pages.
"Petitioner's Reply to Patent Owner's Response," Exhibit 1028, filed with the United States Patent and Trademark Office in connection with Case IPR2019-01302 on Dec. 4, 2020, 4 pages.
"Petitioner's Reply to Patent Owner's Response," Exhibit 1029, filed with the United States Patent and Trademark Office in connection with Case IPR2019-01302 on Dec. 4, 2020, 9 pages.
"Petitioner's Reply to Patent Owner's Response," Exhibit 1030, filed with the United States Patent and Trademark Office in connection with Case IPR2019-01302 on Dec. 4, 2020, 9 pages.
"Petitioner's Reply to Patent Owner's Response," Exhibit 1031, filed with the United States Patent and Trademark Office in connection with Case IPR2019-01302 on Dec. 4, 2020, 18 pages.
"Petitioner's Reply to Patent Owner's Response," Exhibit 1032, filed with the United States Patent and Trademark Office in connection with Case IPR2019-01302 on Dec. 4, 2020, 15 pages.
"Petitioner's Reply to Patent Owner's Response," Exhibit 1033, filed with the United States Patent and Trademark Office in connection with Case IPR2019-01302 on Dec. 4, 2020, 17 pages.
"Petitioner's Reply to Patent Owner's Response," Exhibit 1034, filed with the United States Patent and Trademark Office in connection with Case IPR2019-01302 on Dec. 4, 2020, 2 pages.
"Petitioner's Reply to Patent Owner's Response," Exhibit 1035, filed with the United States Patent and Trademark Office in connection with Case IPR2019-01302 on Dec. 4, 2020, 11 pages.
"Petitioner's Reply to Patent Owner's Response," Exhibit 1036, filed with the United States Patent and Trademark Office in connection with Case IPR2019-01302 on Dec. 4, 2020, 7 pages.
"Petitioner's Reply to Patent Owner's Response," Exhibit 1037, filed with the United States Patent and Trademark Office in connection with Case IPR2019-01302 on Dec. 4, 2020, 17 pages.
"Petitioner's Reply to Patent Owner's Response," Exhibit 1038, filed with the United States Patent and Trademark Office in connection with Case IPR2019-01302 on Dec. 4, 2020, 16 pages.
"Petitioner's Reply to Patent Owner's Response," Exhibit 1039, filed with the United States Patent and Trademark Office in connection with Case IPR2019-01302 on Dec. 4, 2020, 29 pages.
"Petitioner's Reply to Patent Owner's Response," Exhibit 1040, filed with the United States Patent and Trademark Office in connection with Case IPR2019-01302 on Dec. 4, 2020, 74 pages.
"Petitioner's Reply to Patent Owner's Response," Exhibit 1041, filed with the United States Patent and Trademark Office in connection with Case IPR2019-01302 on Dec. 4, 2020, 1 page.
"Petitioner's Reply to Patent Owner's Response," Exhibit 1042, filed with the United States Patent and Trademark Office in connection with Case IPR2019-01302 on Dec. 4, 2020, 1 page.
"Petitioner's Reply to Patent Owner's Response," Exhibit 1043, filed with the United States Patent and Trademark Office in connection with Case IPR2019-01302 on Dec. 4, 2020, 6 pages.
"Petitioner's Reply to Patent Owner's Response," Exhibit 1044, filed with the United States Patent and Trademark Office in connection with Case IPR2019-01302 on Dec. 4, 2020, 136 pages.
"Petitioner's Reply to Patent Owner's Response," Exhibit 1045, filed with the United States Patent and Trademark Office in connection with Case IPR2019-01302 on Dec. 4, 2020, 1 page.
"Petitioner's Reply to Patent Owner's Response," Exhibit 1046, filed with the United States Patent and Trademark Office in connection with Case IPR2019-01302 on Dec. 4, 2020, 1 page.
"Petitioner's Reply to Patent Owner's Response," Exhibit 1047, filed with the United States Patent and Trademark Office in connection with Case IPR2019-01302 on Dec. 4, 2020, 4 pages.
"Petitioner's Reply to Patent Owner's Response," Exhibit 1048, filed with the United States Patent and Trademark Office in connection with Case IPR2019-01302 on Dec. 4, 2020, 5 pages.
"Petitioner's Reply to Patent Owner's Response," Exhibit 1049, filed with the United States Patent and Trademark Office in connection with Case IPR2019-01302 on Dec. 4, 2020, 4 pages.
"Petitioner's Reply to Patent Owner's Response," Exhibit 1050, filed with the United States Patent and Trademark Office in connection with Case IPR2019-01302 on Dec. 4, 2020, 9 pages.
"Patent Owner's Amended Mandatory Notices Pursuant to 37 C.F.R. 42.8," filed with the United States Patent and Trademark Office in connection with Case IPR2019-01302 on Jan. 12, 2021, 9 pages.
"Patent Owner's Sur-Reply Pursuant to 37 C.F.R. 42.23," filed with the United States Patent and Trademark Office in connection with Case IPR2019-01302 on Jan. 15, 2021, 38 pages.
"Patent Owner's Sur-Reply Pursuant to 37 C.F.R. 42.23," Exhibit 2048, filed with the United States Patent and Trademark Office in connection with Case IPR2019-01302 on Jan. 15, 2021, 39 pages.
"Patent Owner's Sur-Reply Pursuant to 37 C.F.R. 42.23," Exhibit 2049, filed with the United States Patent and Trademark Office in connection with Case IPR2019-01302 on Jan. 15, 2021, 13 pages.
"Patent Owner's Sur-Reply Pursuant to 37 C.F.R. 42.23," Exhibit 2050, filed with the United States Patent and Trademark Office in connection with Case IPR2019-01302 on Jan. 15, 2021, 14 pages.
"Patent Owner's Sur-Reply Pursuant to 37 C.F.R. 42.23," Exhibit 2051, filed with the United States Patent and Trademark Office in connection with Case IPR2019-01302 on Jan. 15, 2021, 3 pages.
"Petitioner's Reply to Patent Owner's Response," filed with the United States Patent and Trademark Office in connection with Case IPR2019-01444 on Jan. 26, 2021, 41 pages.
"Petitioner's Reply to Patent Owner's Response," Exhibit 1013, filed with the United States Patent and Trademark Office in connection with Case IPR2019-01444 on Jan. 26, 2021, 32 pages.
"Petitioner's Reply to Patent Owner's Response," Exhibit 1014, filed with the United States Patent and Trademark Office in connection with Case IPR2019-01444 on Jan. 26, 2021, 29 pages.
"Petitioner's Reply to Patent Owner's Response," Exhibit 1015, filed with the United States Patent and Trademark Office in connection with Case IPR2019-01444 on Jan. 26, 2021, 196 pages.
"Petitioner's Reply to Patent Owner's Response," Exhibit 1016, filed with the United States Patent and Trademark Office in connection with Case IPR2019-01444 on Jan. 26, 2021, 253 pages.
"Petitioner's Reply to Patent Owner's Response," Exhibit 1017, filed with the United States Patent and Trademark Office in connection with Case IPR2019-01444 on Jan. 26, 2021, 88 pages.
"Petitioner's Reply to Patent Owner's Response," Exhibit 1018, filed with the United States Patent and Trademark Office in connection with Case IPR2019-01444 on Jan. 26, 2021, 93 pages.
"Petitioner's Reply to Patent Owner's Response," Exhibit 1019, filed with the United States Patent and Trademark Office in connection with Case IPR2019-01444 on Jan. 26, 2021, 4 pages.
"Petitioner's Reply to Patent Owner's Response," Exhibit 1020, filed with the United States Patent and Trademark Office in connection with Case IPR2019-01444 on Jan. 26, 2021, 41 pages.
"Petitioner's Reply to Patent Owner's Response," Exhibit 1021, filed with the United States Patent and Trademark Office in connection with Case IPR2019-01444 on Jan. 26, 2021, 16 pages.

(56) References Cited

OTHER PUBLICATIONS

"Petitioner's Reply to Patent Owner's Response," Exhibit 1022, filed with the United States Patent and Trademark Office in connection with Case IPR2019-01444 on Jan. 26, 2021, 258 pages.
"Petitioner's Reply to Patent Owner's Response," Exhibit 1023, filed with the United States Patent and Trademark Office in connection with Case IPR2019-01444 on Jan. 26, 2021, 234 pages.
"Petitioner's Reply to Patent Owner's Response," Exhibit 1024, filed with the United States Patent and Trademark Office in connection with Case IPR2019-01444 on Jan. 26, 2021, 11 pages.
"Petitioner's Reply to Patent Owner's Response," Exhibit 1025, filed with the United States Patent and Trademark Office in connection with Case IPR2019-01444 on Jan. 26, 2021, 6 pages.
"Petitioner's Reply to Patent Owner's Response," Exhibit 1026, filed with the United States Patent and Trademark Office in connection with Case IPR2019-01444 on Jan. 26, 2021, 3 pages.
"Petitioner's Reply to Patent Owner's Response," Exhibit 1027, filed with the United States Patent and Trademark Office in connection with Case IPR2019-01444 on Jan. 26, 2021, 4 pages.
"Petitioner's Reply to Patent Owner's Response," Exhibit 1028, filed with the United States Patent and Trademark Office in connection with Case IPR2019-01444 on Jan. 26, 2021, 4 pages.
"Petitioner's Reply to Patent Owner's Response," Exhibit 1029, filed with the United States Patent and Trademark Office in connection with Case IPR2019-01444 on Jan. 26, 2021, 9 pages.
"Petitioner's Reply to Patent Owner's Response," Exhibit 1030, filed with the United States Patent and Trademark Office in connection with Case IPR2019-01444 on Jan. 26, 2021, 9 pages.
"Petitioner's Reply to Patent Owner's Response," Exhibit 1031, filed with the United States Patent and Trademark Office in connection with Case IPR2019-01444 on Jan. 26, 2021, 18 pages.
"Petitioner's Reply to Patent Owner's Response," Exhibit 1032, filed with the United States Patent and Trademark Office in connection with Case IPR2019-01444 on Jan. 26, 2021, 15 pages.
"Petitioner's Reply to Patent Owner's Response," Exhibit 1033, filed with the United States Patent and Trademark Office in connection with Case IPR2019-01444 on Jan. 26, 2021, 17 pages.
"Petitioner's Reply to Patent Owner's Response," Exhibit 1034, filed with the United States Patent and Trademark Office in connection with Case IPR2019-01444 on Jan. 26, 2021, 2 pages.
"Petitioner's Reply to Patent Owner's Response," Exhibit 1035, filed with the United States Patent and Trademark Office in connection with Case IPR2019-01444 on Jan. 26, 2021, 11 pages.
"Petitioner's Reply to Patent Owner's Response," Exhibit 1036, filed with the United States Patent and Trademark Office in connection with Case IPR2019-01444 on Jan. 26, 2021, 18 pages.
"Petitioner's Reply to Patent Owner's Response," Exhibit 1037, filed with the United States Patent and Trademark Office in connection with Case IPR2019-01444 on Jan. 26, 2021, 17 pages.
"Petitioner's Reply to Patent Owner's Response," Exhibit 1038, filed with the United States Patent and Trademark Office in connection with Case IPR2019-01444 on Jan. 26, 2021, 16 pages.
"Petitioner's Reply to Patent Owner's Response," Exhibit 1039, filed with the United States Patent and Trademark Office in connection with Case IPR2019-01444 on Jan. 26, 2021, 5 pages.
"Petitioner's Reply to Patent Owner's Response," Exhibit 1040, filed with the United States Patent and Trademark Office in connection with Case IPR2019-01444 on Jan. 26, 2021, 74 pages.
"Petitioner's Reply to Patent Owner's Response," Exhibit 1041, filed with the United States Patent and Trademark Office in connection with Case IPR2019-01444 on Jan. 26, 2021, 5 pages.
"Petitioner's Reply to Patent Owner's Response," Exhibit 1043, filed with the United States Patent and Trademark Office in connection with Case IPR2019-01444 on Jan. 26, 2021, 6 pages.
"Petitioner's Reply to Patent Owner's Response," Exhibit 1044, filed with the United States Patent and Trademark Office in connection with Case IPR2019-01444 on Jan. 26, 2021, 136 pages.
"Petitioner's Reply to Patent Owner's Response," Exhibit 1045, filed with the United States Patent and Trademark Office in connection with Case IPR2019-01444 on Jan. 26, 2021, 1 page.
"Petitioner's Reply to Patent Owner's Response," Exhibit 1046, filed with the United States Patent and Trademark Office in connection with Case IPR2019-01444 on Jan. 26, 2021, 1 page.
"Petitioner's Reply to Patent Owner's Response," Exhibit 1047, filed with the United States Patent and Trademark Office in connection with Case IPR2019-01444 on Jan. 26, 2021, 4 pages.
"Petitioner's Reply to Patent Owner's Response," Exhibit 1048, filed with the United States Patent and Trademark Office in connection with Case IPR2019-01444 on Jan. 26, 2021, 5 pages.
"Petitioner's Reply to Patent Owner's Response," Exhibit 1049, filed with the United States Patent and Trademark Office in connection with Case IPR2019-01444 on Jan. 26, 2021, 4 pages.
"Petitioner's Reply to Patent Owner's Response," Exhibit 1050, filed with the United States Patent and Trademark Office in connection with Case IPR2019-01444 on Jan. 26, 2021, 12 pages.
"Written Request for Invalidation and Exhibits," filed by third party with the Chinese National Intellectual Property Administration in connection with Chinese Patent Application No. 201480052194.8 on Aug. 16, 2023, 74 pages (includes English translation of written request for invalidation).
"Supplemental Opinion," filed by third party with the Chinese National Intellectual Property Administration in connection with Chinese Patent Application No. 201480052194.8 on Sep. 11, 2023, 64 pages (includes English translation).
"Written Request for Invalidation and Exhibits," filed by third party with the Chinese National Intellectual Property Administration in connection with Chinese Patent Application No. 201480052194.8 on Sep. 25, 2023, 85 pages (includes English translation of written request for invalidation).
China National Intellectual Property Administration, "Fourth Office Action," issued in connection with Chinese Application No. CN201710709587.7, on Feb. 28, 2024, 10 pages (includes English translation).
European Patent Office, "Information About the Result of Oral Proceedings," issued in connection with opposition of European Patent No. 3705106 on Feb. 8, 2024, 34 pages (includes English translation).
European Patent Office, "Decision Revoking the European Patent," issued in connection with opposition of European Patent No. 3705106 on Mar. 19, 2024, 192 pages (includes English translation).
European Patent Office, "Decision Revoking the European Patent," issued in connection with opposition of European Patent No. 3305266 on Mar. 28, 2024, 303 pages (includes English translation).
IP Australia, "Examination Report," issued in connection with Australian Application No. 2020201615 on Feb. 9, 2024, 8 pages.
Canadian Patent Office, "Office Action," issued in connection with Canadian Patent Application No. 3,095,965 on Apr. 10, 2024, 5 pages.
United States Patent and Trademark Office, "Notice of Allowance," issued in connection with U.S. Appl. No. 16/811,907, dated Feb. 16, 2024, 16 pages.
United States Patent and Trademark Office, "Notice of Allowance," issued in connection with U.S. Appl. No. 16/752,283, dated Apr. 15, 2024, 9 pages.
Kirschke, "Development of a Loudspeaker Chassis," Technische Universitat Dresden, Nov. 3, 2007, 50 pages (includes English translation).
"Voice Coil," Wikipedia, https://en.wikipedia.org/wiki/Voice_coil, last accessed May 29, 2024, 4 pages.
"Opposition to a European Patent," filed with the European Patent Office action in connection with opposition of European Patent No. 3773954 on Sep. 27, 2024, 116 pages (includes English translation).
"Opposition to a European Patent, Exhibit D1," filed with the European Patent Office action in connection with opposition of European Patent No. 3773954 on Sep. 27, 2024, 4 pages (includes English translation).
United States Patent and Trademark Office, "Office Action," issued in connection with U.S. Appl. No. 17/044,503, dated Jul. 5, 2024, 8 pages.
United States Patent and Trademark Office, "Office Action," issued in connection with U.S. Appl. No. 17/044,501, dated Jul. 5, 2024, 15 pages.

(56) References Cited

OTHER PUBLICATIONS

United States Patent and Trademark Office, "Office Action," issued in connection with U.S. Appl. No. 17/461,470, dated Jul. 9, 2024, 44 pages.
United States Patent and Trademark Office, "Office Action," issued in connection with U.S. Appl. No. 17/403,609, dated Aug. 6, 2024, 45 pages.
"Opposition to a European Patent," filed with the European Patent Office by EIS GmbH in connection with European Patent No. 3267960 on Mar. 7, 2024, 236 pages (includes English translation).
"Opposition to a European Patent, Exhibit D3" filed with the European Patent Office by EIS GmbH in connection with European Patent No. 3267960 on Mar. 7, 2024, 6 pages (includes English translation).
"Opposition to a European Patent, Exhibit D4" filed with the European Patent Office by EIS GmbH in connection with European Patent No. 3267960 on Mar. 7, 2024, 4 pages (includes English translation).
"Opposition to a European Patent, Exhibit D5" filed with the European Patent Office by EIS GmbH in connection with European Patent No. 3267960 on Mar. 7, 2024, 46 pages (includes English translation).
"Opposition to a European Patent, Exhibit D6" filed with the European Patent Office by EIS GmbH in connection with European Patent No. 3267960 on Mar. 7, 2024, 25 pages (includes English translation).
"Opposition to a European Patent, Exhibit D7" filed with the European Patent Office by EIS GmbH in connection with European Patent No. 3267960 on Mar. 7, 2024, 43 pages (includes English translation).
"Opposition to a European Patent, Exhibit D9" filed with the European Patent Office by EIS GmbH in connection with European Patent No. 3267960 on Mar. 7, 2024, 4 pages (includes English translation).
"Opposition to a European Patent, Exhibit D13" filed with the European Patent Office by EIS GmbH in connection with European Patent No. 3267960 on Mar. 7, 2024, 4 pages (includes English translation).
European Patent Office, "Brief Communication - Opposition Proceedings," issued in connection with opposition of European Patent No. 3267960 on Mar. 22, 2024, 6 pages (includes English translation).
"Opposition to a European Patent," filed with the European Patent Office by EIS GmbH in connection with European Patent No. 3400926 on Mar. 7, 2024, 236 pages (includes English translation).
"Opposition to a European Patent, Exhibit D18" filed with the European Patent Office by EIS GmbH in connection with European Patent No. 3400926 on Mar. 7, 2024, 2 pages (includes English translation).
"Opposition to a European Patent, Exhibit D19" filed with the European Patent Office by EIS GmbH in connection with European Patent No. 3400926 on Mar. 7, 2024, 18 pages (includes English translation).
"Opposition to a European Patent, Exhibit D20" filed with the European Patent Office by EIS GmbH in connection with European Patent No. 3400926 on Mar. 7, 2024, 12 pages (includes English translation).
"Opposition to a European Patent, Exhibit D21" filed with the European Patent Office by EIS GmbH in connection with European Patent No. 3400926 on Mar. 7, 2024, 10 pages (includes English translation).
"Opposition to a European Patent, Exhibit D22" filed with the European Patent Office by EIS GmbH in connection with European Patent No. 3400926 on Mar. 7, 2024, 44 pages (includes English translation).
European Patent Office, "Brief Communication - Opposition Proceedings," issued in connection with opposition of European Patent No. 3400926 on Mar. 22, 2024, 6 pages (includes English translation).
European Patent Office, "Notification under Article 94 (3) EPC," issued in connection with European Patent Application No. 18206800.7 on May 10, 2022, 8 pages (includes English translation).
European Patent Office, "Notice of Submission of Third Party Observation," issued in connection with European Patent Application No. 18206800.7 on Feb. 7, 2024, 6 pages (includes English translation).
European Patent Office, "Notification under Article 94 (3) EPC," issued in connection with European Patent Application No. 18206800.7 on Feb. 27, 2024, 10 pages (includes English translation).
European Patent Office, "Notification under Article 94 (3) EPC," issued in connection with European Application No. 21175706.7 on May 28, 2024, 8 pages (includes English translation).
IP Australia, "Opposition—Decision Issued," issued in connection with Australian Patent Application No. 2015386680 on Oct. 2, 2020, 53 pages.
IP Australia, "Opposition—Section 104 Amendments," issued in connection with Australian Patent Application No. 2018203659 on Jun. 30, 2021, 14 pages.
"Opponent Comments Regarding Final Determination," filed with the Australian in connection with opposition of Australian Patent Application No. 2018203659 on Feb. 18, 2022, 11 pages.
IP Australia, "Opposition—Decision Issued," issued in connection with Australian Patent Application No. 2018203659 on Apr. 28, 2022, 7 pages.
IP Australia, "Examination Report No. 1 for Standard Patent Application," issued in connection with Australian Application No. 2022203319, on Aug. 1, 2023, 6 pages.
European Patent Office, "Extended European Search Report," issued in connection with European Application No. 17190856.9, on May 14, 2018, 30 pages. (English translation included.).
European Patent Office, "European Search Report," issued in connection with European Application No. 17190856.9, on Feb. 2, 2018, 34 pages. (English translation included.).
The International Bureau of WIPO, "International Report on Patentability," issued in connection with International Application No. PCT/EP2017/075399, on Apr. 9, 2019, 15 pages.
International Searching Authority, "Written Opinion," issued in connection with International Application No. PCT/EP2017/075399, on Apr. 25, 2018, 14 pages.
International Searching Authority, "International Search Report," issued in connection with International Application No. PCT/EP2017/075399, on Apr. 25, 2018, 9 pages. (English Translation Included.).
IP Australia, "Examination Report No. 1 for Standard Patent Application," issued in connection with Australian Application No. 2015386680, on Nov. 15, 2017, 3 pages.
IP Australia, "Examination Report No. 1 for Standard Patent Application," issued in connection with Australian Application No. 2018203659, on Dec. 14, 2018, 2 pages.
Canadian Patent Office, "Office Action," issued in connection with Canadian Application No. 2,978,495, on Nov. 20, 2017, 4 pages.
Canadian Patent Office, "Office Action," issued in connection with Canadian Application No. 2,978,495, on Apr. 11, 2018, 4 pages.
China National Intellectual Property Administration, "First Office Action," issued in connection with Chinese Application No. 201580077725.3, on Feb. 3, 2019, 5 pages (English translation included).
German Patent and Trademark Office, "Examination Report," issued in connection with German Application No. 10 2015 103 694.0, on Mar. 24, 2015, 8 pages. (English translation included.).
German Patent and Trademark Office, "Examination Report," issued in connection with German Application No. 10 2015 103 694.0, on Dec. 7, 2016, 12 pages. (English translation included.).
European Patent Office, "Extended European Search Report," issued in connection with European Patent Application No. 18175171.0, on Sep. 14, 2018, 28 pages. (English translation included.).
European Patent Office, "Communication Pursuant to Article 94 (3) EPC," issued in connection with European Application No. 18175171.0, on Jun. 14, 2019, 8 pages. (English translation included.).
New Zealand Intellectual Property Office, "First Examination Report," issued in connection with NZ Application No. 735229, on May 2, 2018, 4 pages.

(56) References Cited

OTHER PUBLICATIONS

New Zealand Intellectual Property Office, "Further Examination Report," issued in connection with NZ Application No. 735229, on Dec. 17, 2018, 3 pages.
The International Bureau of WIPO, "International Preliminary Report on Patentability," issued in connection with International Application No. PCT/EP2015/067017, on Sep. 19, 2017, 13 pages. (corresponds to English translation of Written Opinion for International Application No. PCT/EP2015/067017 dated Jul. 22, 2016, cited as NPL 6 in IDS filed on Mar. 13, 2023).
IP Australia, "Examination Report No. 1 for Standard Patent Application," issued in connection with Australian Patent Application No. 2014323661, on Mar. 2, 2017, 4 pages.
IP Australia, "Examination Report No. 1 for Standard Patent Application," issued in connection with Australian Application No. 2018200852, on Feb. 15, 2018, 5 pages.
Canadian Patent Office, "Office Action," issued in connection with Canadian Patent Application No. 2,923,526, on May 24, 2018, 5 pages.
Canadian Patent Office, "Office Action," issued in connection with Canadian Patent Application No. 2,923,526, on Oct. 16, 2018, 3 pages.
China National Intellectual Property Administration, "First Office Action," issued in connection with Chinese Patent Application No. 201480052194.8, on Sep. 28, 2016, 7 pages. (English Translation Included.).
China National Intellectual Property Administration, "Second Office Action," issued in connection with Chinese Patent Application No. 201480052194.8, on Jan. 3, 2017, 10 pages. (English Translation Included.).
China National Intellectual Property Administration, "Third Office Action," issued in connection with Chinese Patent Application No. 201480052194.8, on Jul. 4, 2017, 11 pages. (English Translation Included.).
China National Intellectual Property Administration, "First Office Action," issued in connection with Chinese Patent Application No. 201710709587.7, on Feb. 28, 2019, 5 pages. (English Translation Included.).
German Patent and Trademark Office, "Office Action," issued in connection with German Patent Application No. 10 2013 110 501.7, on Oct. 1, 2013, 8 pages. (English translation included.).
German Patent and Trademark Office, "Office Action," issued in connection with German Patent Application No. 10 2013 110 501.7, on Apr. 15, 2014, 8 pages. (English translation included.).
German Patent and Trademark Office, "Office Action," issued in connection with German Patent Application No. 10 2013 110 501.7, on Feb. 6, 2015, 10 pages. (English translation included.).
German Patent and Trademark Office, "Office Action," issued in connection with German Patent Application No. 10 2013 110 501.7, on Nov. 18, 2015, 8 pages. (English translation included.).
German Patent and Trademark Office, "Office Action," issued in connection with German Patent Application No. 10 2013 022 511.6, on May 9, 2019, 16 pages. (English translation included.).
German Patent and Trademark Office, "Office Action," issued in connection with German Patent Application No. 10 2013 022 512.4, on May 3, 2019, 14 pages. (English translation included.).
German Patent and Trademark Office, "Office Action," issued in connection with German Patent Application No. 10 2013 022 520.5, on May 9, 2019, 14 pages. (English translation included.).
European Patent Office, "Communication Pursuant to Article 94 (3) EPC," issued in connection with European Application No. 14741640.8, on Aug. 23, 2016, 8 pages. (English translation included.).
European Patent Office, "Communication Pursuant to Article 94 (3) EPC," issued in connection with European Application No. 14741640.8, on Mar. 8, 2018, 12 pages. (English translation included.).
European Patent Office, "Communication Pursuant to Article 94 (3) EPC," issued in connection with European Application No. 17202385.5, on May 18, 2018, 12 pages. (English translation included.).
European Patent Office, "Result of the Consultation" issued in connection with European Application No. 17202385.5, on Jul. 18, 2018, 6 pages. (English translation included.).
European Patent Office, "Search Report," issued in connection with European Application No. 17202385.5, on Mar. 8, 2018, 6 pages. (English translation included.).
European Patent Office, "Communication Pursuant to Article 94 (3) EPC," issued in connection with European Application No. 17202394.7, on May 18, 2018, 12 pages. (English translation included.).
European Patent Office, "Result of the Consultation" issued in connection with European Application No. 17202394.7, on Jul. 18, 2018, 6 pages. (English translation included.).
European Patent Office, "Search Report," issued in connection with European Application No. 17202394.7, on Mar. 8, 2018, 8 pages. (English translation included.).
European Patent Office, "Communication Pursuant to Article 94 (3) EPC," issued in connection with European Application No. 18206800.7, on Apr. 8, 2019, 10 pages. (English translation included.).
European Patent Office, "Search Report," issued in connection with European Application No. 18206800.7, on Feb. 27, 2019, 8 pages. (English translation included.).
International Searching Authority, "Written Opinion of the International Searching Authority," issued in connection with International Application No. PCT/EP2014/065734, on Sep. 25, 2014, 19 pages. (English Translation Included.).
The International Bureau of WIPO, "International Preliminary Report on Patentability," issued in connection with International Application No. PCT/EP2014/065734, on Mar. 29, 2016, 7 pages. (corresponds to English translation of Written Opinion for International Application No. PCT/EP2014/065734 dated Sep. 25, 2014, cited herein as NPL43).
United States Patent and Trademark Office, "Notice of Allowance and Fee(s) Due," issued in connection with U.S. Appl. No. 29/590,450, on May 8, 2018, 7 pages.
United States Patent and Trademark Office, "Notice of Allowance and Fee(s) Due," issued in connection with U.S. Appl. No. 35/502,986, on May 1, 2018, 9 pages.
United Stated Patent and Trademark Office, "Notice of Allowance and Fee(s) Due," issued in connection with U.S. Appl. No. 15/719,085, on Jul. 3, 2019, 12 pages.
European Patent Office, "Examination Report," issued in connection with application No. 15748202.7 on Jun. 24, 2019, 8 pages (English translation included).
"Petition for Inter Partes Review of U.S. Pat. No. 9,763,851," filed with the United States Patent and Trademark Office on Jul. 31, 2019, 87 pages.
"Petition for Inter Partes Review of U.S. Pat. No. 9,763,851," Exhibit 1001, filed with the United States Patent and Trademark Office on Jul. 31, 2019, 17 pages.
"Petition for Inter Partes Review of U.S. Pat. No. 9,763,851," Exhibit 1002, filed with the United States Patent and Trademark Office on Jul. 31, 2019, 109 pages.
"Petition for Inter Partes Review of U.S. Pat. No. 9,763,851," Exhibit 1003 Part 1, filed with the United States Patent and Trademark Office on Jul. 31, 2019, 649 pages.
"Petition for Inter Partes Review of U.S. Pat. No. 9,763,851," Exhibit 1003 Part 2, filed with the United States Patent and Trademark Office on Jul. 31, 2019, 663 pages.
"Petition for Inter Partes Review of U.S. Pat. No. 9,763,851," Exhibit 1004, filed with the United States Patent and Trademark Office on Jul. 31, 2019, 11 pages.
"Petition for Inter Partes Review of U.S. Pat. No. 9,763,851," Exhibit 1005, filed with the United States Patent and Trademark Office on Jul. 31, 2019, 34 pages.
"Petition for Inter Partes Review of U.S. Pat. No. 9,763,851," Exhibit 1006, filed with the United States Patent and Trademark Office on Jul. 31, 2019, 46 pages.
"Petition for Inter Partes Review of U.S. Pat. No. 9,763,851," Exhibit 1007, filed with the United States Patent and Trademark Office on Jul. 31, 2019, 36 pages.
"Petition for Inter Partes Review of U.S. Pat. No. 9,763,851," Exhibit 1008, filed with the United States Patent and Trademark Office on Jul. 31, 2019, 46 pages.

(56) References Cited

OTHER PUBLICATIONS

"Petition for Inter Partes Review of U.S. Pat. No. 9,763,851," Exhibit 1009, filed with the United States Patent and Trademark Office on Jul. 31, 2019, 5 pages.
"Petition for Inter Partes Review of U.S. Pat. No. 9,763,851," Exhibit 1010, filed with the United States Patent and Trademark Office on Jul. 31, 2019, 61 pages.
"Petition for Inter Partes Review of U.S. Pat. No. 9,763,851," Exhibit 1011, filed with the United States Patent and Trademark Office on Jul. 31, 2019, 6 pages.
"Petition for Inter Partes Review of U.S. Pat. No. 9,763,851," Exhibit 1012, filed with the United States Patent and Trademark Office on Jul. 31, 2019, 1049 pages. (Uploaded in 3 parts.).
United States Patent and Trademark Office, "Non-Final Office Action," issued in connection with U.S. Appl. No. 15/965,208, on Aug. 22, 2019, 17 pages.
United States Patent and Trademark Office, "Notice of Allowance and Fee(s) Due," issued in connection with U.S. Appl. No. 15/354,599, on Aug. 29, 2019, 19 pages.
IP Australia, "Notice of Opposition," issued in connection with Australian Patent Application No. 2015386680 on Jun. 21, 2018, 4 pages.
"Opponent's Letter," filed with IP Australia in connection with Australian Patent Application No. 2015386680 on Jun. 28, 2019, 10 pages.
IP Australia, "General Correspondence," issued in connection with Australian Patent Application No. 2015386680 on Jul. 24, 2019, 2 pages.
"Opponent's Letter," filed with IP Australia in connection with Australian Patent Application No. 2015386680 on Aug. 7, 2019, 2 pages.
IP Australia, "Reg, 5.23," issued in connection with Australian Patent Application No. 2015386680 on Aug. 16, 2019, 4 pages.
"Statement of Grounds and Particulars of Opposition," filed with IP Australia in connection with Australian Patent Application No. 201803659 on Aug. 14, 2019, 15 pages.
"Exhibit D1," filed with IP Australia in connection with Australian Patent Application No. 2018203659 on Aug. 14, 2019, 9 pages.
"Exhibit D2," filed with IP Australia in connection with Australian Patent Application No. 2018203659 on Aug. 14, 2019, 9 pages.
"Exhibit D3," filed with IP Australia in connection with Australian Patent Application No. 2018203659 on Aug. 14, 2019, 51 pages.
"Exhibit D4," filed with IP Australia in connection with Australian Patent Application No. 2018203659 on Aug. 14, 2019, 6 pages.
"Exhibit D5," filed with IP Australia in connection with Australian Patent Application No. 2018203659 on Aug. 14, 2019, 5 pages.
"Exhibit D6," filed with IP Australia in connection with Australian Patent Application No. 2018203659 on Aug. 14, 2019, 3 pages.
"Exhibit D7," filed with IP Australia in connection with Australian Patent Application No. 2018203659 on Aug. 14, 2019, 28 pages.
"Exhibit D8," filed with IP Australia in connection with Australian Patent Application No. 2018203659 on Aug. 14, 2019, 8 pages.
"Exhibit D9," filed with IP Australia in connection with Australian Patent Application No. 2018203659 on Aug. 14, 2019, 11 pages.
"Exhibit D10," filed with IP Australia in connection with Australian Patent Application No. 2018203659 on Aug. 14, 2019, 33 pages.
"Exhibit D11," filed with IP Australia in connection with Australian Patent Application No. 2018203659 on Aug. 14, 2019, 2 pages.
"Exhibit D12," filed with IP Australia in connection with Australian Patent Application No. 2018203659 on Aug. 14, 2019, 9 pages.
Ip Australia, "Opposition—Statement or Grounds and Particulars," issued in connection with Australian Patent Application No. 2018203659 on Aug. 15, 2019, 1 page.
New Zealand Intellectual Property Office, "Office Action," issued in connection with NZ Application No. 735370, on Mar. 1, 2018, 5 pages.
European Patent Office, "Search Report," issued in connection with European Application No. 17202394.7, on Mar. 8, 2018, 4 pages.
European Patent Office, " Announcement According to Article 94 ( 3 ) EPU," issued in connection with European Application No. 14741640.8, on Mar. 8, 2018, 12 pages (includes English translation).
IP Australia, "Examination Report," issued in connection with Australian Application No. 2017228536, on Dec. 20, 2017, 5 pages.
United States Patent and Trademark Office, "Notice of Allowance," issued in connection with U.S. Appl. No. 15/888,568, dated May 11, 2022, 8 pages.
International Searching Authority, "Partial International Search Report," issued in connection with International Application No. PCT/EP2017/075400, on Mar. 6, 2018, 46 pages (includes English translation).
International Searching Authority, "Partial International Search Report," issued in connection with International Application No. PCT/EP2017/075399, on Mar. 1, 2018, 34 pages (includes English translation).
United States Patent and Trademark Office, "Non-Final Office action," issued in connection with U.S. Appl. No. 15/023,471, on Aug. 26, 2016, 26 pages.
United States Patent and Trademark Office, "Final Office action," issued in connection with U.S. Appl. No. 15/023,471, on Jan. 6, 2017, 28 pages.
United States Patent and Trademark Office, "Non-final Office action," issued in connection with U.S. Appl. No. 15/354,599, on Feb. 24, 2017, 38 pages.
Maria M. Kettenring, "Erotische Partnermassage", Grafe und User Publishers, 2004, 5 pages (includes English summary).
"Gesundheitsminister. Mehr Sex gegen Bluthochdruck," http://www.heilpraxisnet.delnaturheilpraxis/sex-gegen-bluthochdruck-665.php, Apr. 2010, 2 pages (English translation included).
Beate Lakotta, "Schmerz und Gluckseligkeit, Der Spiegel", pp. 136-138, Jun. 2006, 7 pages (English translation included).
"Sex hilflt gegen Erkaltung," Focus Online, Dec. 5, 2004; 2 pages (English translation included).
United States Patent and Trademark Office, "Non-Final Office action," issued in connection with U.S. Appl. No. 15/888,568, on Jan. 10, 2019, 15 pages.
United States Patent and Trademark Office, "Final Office Action," issued in connection with U.S. Appl. No. 15/888,568 on Oct. 29, 2019, 7 pages.
United States Patent and Trademark Office, "Final Office Action," issued in connection with U.S. Appl. No. 15/888,568, dated Apr. 16, 2020, 7 pages.
United States Patent and Trademark Office, "Final Office Action," issued in connection with U.S. Appl. No. 15/888,568, dated on Oct. 28, 2020, 7 pages.
United States Patent and Trademark Office, "Notice of Allowance," issued in connection with U.S. Appl. No. 15/888,568, dated Feb. 8, 2021, 8 pages.
United States Patent and Trademark Office, "Supplemental Notice of Allowability," issued in connection with U.S. Appl. No. 15/888,568, dated Apr. 5, 2021, 3 pages.
United States Patent and Trademark Office, "Supplemental Notice of Allowability, " issued in connection with U.S. Appl. No. 15/888,568, dated on Apr. 26, 2021, 3 pages.
United States Patent and Trademark Office, "Corrected Notice of Allowability," issued in connection with U.S. Appl. No. 15/888,568, dated May 26, 2021, 3 pages.
United States Patent and Trademark Office, "Corrected Notice of Allowability," issued in connection with U.S. Appl. No. 15/888,568, dated Jul. 2, 2021, 3 pages.
United States Patent and Trademark Office, "Notice of Allowance," issued in connection with U.S. Appl. No. 15/888,568, dated Aug. 10, 2021, 8 pages.
United States Patent and Trademark Office, "Corrected Notice of Allowability," issued in connection with U.S. Appl. No. 15/888,568, dated Oct. 12, 2021, 3 pages.
United States Patent and Trademark Office, "Notice of Allowance," issued in connection with U.S. Appl. No. 15/888,568, dated Dec. 1, 2021, 8 pages.

(56) References Cited

OTHER PUBLICATIONS

United States Patent and Trademark Office, "Corrected Notice of Allowability," issued in connection with U.S. Appl. No. 15/888,568, dated Dec. 30, 2021, 3 pages.
United States Patent and Trademark Office, "Corrected Notice of Allowability," issued in connection with U.S. Appl. No. 15/888,568, dated Mar. 24, 2022, 3 pages.
"Accompanying Letter for Later Submitted Documents" filed with the European Patent Office by Fun Factory GmbH in connection with European Patent No. EP2976057 on Mar. 2, 2022, 24 pages (includes English translation).
"Accompanying Letter for Later Submitted Documents, Exhibits 50 and 50a" filed with the European Patent Office by Fun Factory GmbH in connection with European Patent No. EP2976057 on Mar. 2, 2022, 48 pages.
"Accompanying Letter for Later Submitted Documents" filed with the European Patent Office by Fun Factory GmbH in connection with European Patent No. EP3308762 on Mar. 2, 2022, 24 pages (includes English translation).
"Accompanying Letter for Later Submitted Documents, Exhibits 43 and 43a" filed with the European Patent Office by Fun Factory GmbH in connection with European Patent No. EP3308762 on Mar. 2, 2022, 48 pages.
*EIS Inc.* v. *IntiHealth Ger GmbH et al.*, "Joint Claim Construction Chart," filed with the United States District Court for the District of Delaware, case No. 1:19-cv-01227-VAC-MPT, Mar. 23, 2022, 13 pages.
*EIS Inc.* v. *IntiHealth Ger GmbH et al.*, "Appendix to Joint Claim Construction Chart," filed with the United States District Court for the District of Delaware, case No. 1:19-cv-01227- VAC-MPT, Mar. 23, 2022, 267 pages (uploaded in two parts).
"Grounds of Appeal," filed with the European Patent Office by Fun Factory GmBH in connection with European Patent No. EP2976057 on Jan. 3, 2022, 203 pages (includes English translation).
"Grounds of Appeal," filed with the European Patent Office by EIS GmBH in connection with European Patent No. EP2976057 on Jan. 3, 2022, 279 pages (includes English translation).
"Grounds of Appeal, Exhibit Bla" filed with the European Patent Office by EIS GmBH in connection with European Patent No. EP2976057 on Jan. 3, 2022, 2 pages (includes English translation).
"Grounds of Appeal, Exhibit D41" filed with the European Patent Office by EIS GmBH in connection with European Patent No. EP2976057 on Jan. 3, 2022, 2 pages (includes English translation).
"Grounds of Appeal, Exhibit D42" filed with the European Patent Office by EIS GmBH in connection with European Patent No. EP2976057 on Jan. 3, 2022, 18 pages (includes English translation).
"Grounds of Appeal, Exhibit D43" filed with the European Patent Office by EIS GmBH in connection with European Patent No. EP2976057 on Jan. 3, 2022, 12 pages (includes English translation).
"Grounds of Appeal, Exhibit D44" filed with the European Patent Office by EIS GmBH in connection with European Patent No. EP2976057 on Jan. 3, 2022, 11 pages (includes English translation).
"Grounds of Appeal, Exhibit D45" filed with the European Patent Office by EIS GmBH in connection with European Patent No. EP2976057 on Jan. 3, 2022, 4 pages (includes English translation).
"Grounds of Appeal, Exhibit D46" filed with the European Patent Office by EIS GmBH in connection with European Patent No. EP2976057 on Jan. 3, 2022, 13 pages.
"Grounds of Appeal, Exhibit D47" filed with the European Patent Office by EIS GmBH in connection with European Patent No. EP2976057 on Jan. 3, 2022, 3 pages.
"Grounds of Appeal, Exhibit D48" filed with the European Patent Office by EIS GmBH in connection with European Patent No. EP2976057 on Jan. 3, 2022, 4 pages (includes English translation).
"Grounds of Appeal, Exhibit D49" filed with the European Patent Office by EIS GmBH in connection with European Patent No. EP2976057 on Jan. 3, 2022, 4 pages (includes English translation).
"Grounds of Appeal," filed with the European Patent Office by Fun Factory GmBH in connection with European Patent No. EP3308762 on Jan. 3, 2022, 198 pages (includes English translation).
"Grounds of Appeal," filed with the European Patent Office by EIS GmBH in connection with European Patent No. EP3308762 on Jan. 3, 2022, 270 pages (includes English translation).
"Grounds of Appeal, Exhibit Bla" filed with the European Patent Office by EIS GmBH in connection with European Patent No. EP3308762 on Jan. 3, 2022, 2 pages (includes English translation).
"Grounds of Appeal, Exhibit D40" filed with the European Patent Office by EIS GmBH in connection with European Patent No. EP3308762 on Jan. 3, 2022, 4 pages (includes English translation).
"Grounds of Appeal, Exhibit D41" filed with the European Patent Office by EIS GmBH in connection with European Patent No. EP3308762 on Jan. 3, 2022, 4 pages (includes English translation).
"Grounds of Appeal, Exhibit D42" filed with the European Patent Office by EIS GmBH in connection with European Patent No. EP3308762 on Jan. 3, 2022, 4 pages (includes English translation).
"Follow-up to Statement of Complaint," filed with the European Patent Office by EIS GmBH in connection with European Patent No. EP2976057 on Apr. 26, 2022, 47 pages (includes English translation).
"Follow-up to Statement of Complaint, Exhibit D51," filed with the European Patent Office by EIS GmbH in connection with European Patent No. EP2976057 on Apr. 26, 2022, 17 pages (includes English translation).
"Follow-up to Statement of Complaint, Exhibit B4," filed with the European Patent Office by EIS GmbH in connection with European Patent No. EP2976057 on Apr. 26, 2022, 14 pages (includes English translation).
"Follow-up to Statement of Complaint," filed with the European Patent Office by EIS GmbH in connection with European Patent No. EP3308762 on Apr. 26, 2022, 46 pages (includes English translation).
"Follow-up to Statement of Complaint, Exhibit D44," filed with the European Patent Office by EIS GmbH in connection with European Patent No. EP3308762 on Apr. 26, 2022, 17 pages (includes English translation).
"Follow-up to Statement of Complaint, Exhibit B4," filed with the European Patent Office by EIS GmbH in connection with European Patent No. EP3308762 on Apr. 26, 2022, 18 pages (includes English translation).
United States Patent and Trademark Office, "Final Office Action," issued in connection with U.S. Appl. No. 16/752,283, dated Oct. 11, 2023, 17 pages.
United States Patent and Trademark Office, "Notice of Allowance," issued in connection with U.S. Appl. No. 15/888,568, dated Oct. 19, 2023, 9 pages.
United States Patent and Trademark Office, "Notice of Allowance," issued in connection with U.S. Appl. No. 16/811,907 dated Oct. 30, 2023, 15 pages.
United States Patent and Trademark Office, "Final Office Action," issued in connection with U.S. Appl. No. 17/029,974, dated Nov. 24, 2023, 98 pages.
United States Patent and Trademark Office, "Final Office Action," issued in connection with U.S. Appl. No. 17/403,609, dated Dec. 21, 2023, 22 pages.
United States Patent and Trademark Office, "Final Office Action," issued in connection with U.S. Appl. No. 17/461,470, dated Dec. 20, 2023, 37 pages.
United States Patent and Trademark Office, "Non-Final Office Action," issued in connection with U.S. Appl. No. 17/044,501, dated Dec. 21, 2023, 16 pages.
United States Patent and Trademark Office, "Non-Final Office Action," issued in connection with U.S. Appl. No. 17/044,503, dated Dec. 21, 2023, 11 pages.
United States Patent and Trademark Office, "Final Office Action," issued in connection with U.S. Appl. No. 16/339,969, dated Jan. 24, 2024, 9 pages.
United States Patent and Trademark Office, "Advisory Action," issued in connection with U.S. Appl. No. 16/752,283, dated Jan. 31, 2024, 5 pages.
"Written Request for Invalidation and Exhibits," filed by third party with the Chinese National Intellectual Property Administration in

(56) References Cited

OTHER PUBLICATIONS connection with Chinese Patent Application No. 201480052194.8 on Oct. 18, 2023, 79 pages (includes English translation of written request for invalidation).
Chinese National Intellectual Property Administration, "Reexamination Decision," issued in connection with Chinese Patent Application No. 201580077725.3, dated Dec. 21, 2023, 19 pages (includes English translation).
*EIS, Inc.* v. *Wow Tech International GmbH*, "Memorandum Opinion," issued by the United States District Court for the District of Delaware in connection with Case No. 1:19-cv-01227-LPS on Nov. 30, 2020, 26 pages.
*EIS, Inc.* v. *Wow Tech International GmbH*, "Second Amended Complaint," filed with the United States District Court for the District of Delaware in connection with Case No. 1:19-cv-01227-LPS on Dec. 22, 2020, 748 pages. (Uploaded in two parts.).
European Patent Office, "Notification under Article 94 (3) EPC," issued in connection with European Application No. 18206800.7, on Nov. 12, 2020, 10 pages. (English translation included.).
"Notification of an Opposition," issued by the European Patent Office in connection with European Patent No. EP3405158 on Oct. 5, 2020, opposition filed by EIS GmbH, 88 pages (includes English translation).
Mexican Institute of IP, "First Office Action," issued in connection with Mexican Patent Application No. MX/a/2017/012780, dated Jan. 8, 2021, 5 pages (includes English translation).
"Patent Owner's Sur-Reply Pursuant to 37 C.F.R. 42.23," filed with the United States Patent and Trademark Office in connection with Case IPR2019-01444 on Mar. 9, 2021, 38 pages.
"Patent Owner's Sur-Reply Pursuant to 37 C.F.R. 42.23, Exhibit 2061," filed with the United States Patent and Trademark Office in connection with Case IPR2019-01444 on Mar. 9, 2021, 39 pages.
"Petitioner's Reply to Patent Owner's Response," filed with the United States Patent and Trademark Office in connection with Case IPR2020-00007 on Mar. 12, 2021, 39 pages.
"Petitioner's Reply to Patent Owner's Response, Exhibit 1014" filed with the United States Patent and Trademark Office in connection with Case IPR2020-00007 on Mar. 12, 2021, 177 pages.
"Petitioner's Reply to Patent Owner's Response, Exhibit 1017" filed with the United States Patent and Trademark Office in connection with Case IPR2020-00007 on Mar. 12, 2021, 192 pages.
"Petitioner's Reply to Patent Owner's Response, Exhibit 1018" filed with the United States Patent and Trademark Office in connection with Case IPR2020-00007 on Mar. 12, 2021, 74 pages.
"Petitioner's Reply to Patent Owner's Response, Exhibit 1020" filed with the United States Patent and Trademark Office in connection with Case IPR2020-00007 on Mar. 12, 2021, 42 pages.
"Petitioner's Reply to Patent Owner's Response, Exhibit 1036" filed with the United States Patent and Trademark Office in connection with Case IPR2020-00007 on Mar. 12, 2021, 7 pages.
"Petitioner's Reply to Patent Owner's Response, Exhibit 1037" filed with the United States Patent and Trademark Office in connection with Case IPR2020-00007 on Mar. 12, 2021, 3 pages.
"Petitioner's Reply to Patent Owner's Response, Exhibit 1043" filed with the United States Patent and Trademark Office in connection with Case IPR2020-00007 on Mar. 12, 2021, 8 pages.
IP Australia, "Opposition- Section 104 Amendments," issued in connection with Australian Patent Application No. 2018203659 on Mar. 23, 2021, 6 pages.
"Opponent's Reply," filed with the European Patent Office by Fun Factory GmbH in connection with European Patent No. EP2976057 on Apr. 9, 2021, 233 pages (includes English translation).
"Opponent's Reply, Exhibit A2," filed with the European Patent Office by Fun Factory GmbH in connection with European Patent No. EP2976057 on Apr. 9, 2021, 24 pages (includes English translation).
"Opponent's Reply, Exhibit D34," filed with the European Patent Office by Fun Factory GmbH in connection with European Patent No. EP2976057 on Apr. 9, 2021, 1 page.
"Opponent's Reply, Exhibit D35," filed with the European Patent Office by Fun Factory GmbH in connection with European Patent No. EP2976057 on Apr. 9, 2021, 10 pages (includes English translation).
"Opponent's Reply, Exhibit E4," filed with the European Patent Office by Fun Factory GmbH in connection with European Patent No. EP2976057 on Apr. 9, 2021, 7 pages (includes English translation).
"Opponent's Reply," filed with the European Patent Office by Fun Factory GmbH in connection with European Patent No. EP3308762 on Apr. 9, 2021, 119 pages (includes English translation).
"Opponent's Reply," filed with the European Patent Office by EIS GmbH in connection with European Patent No. EP3308762 on Apr. 9, 2021, 111 pages (includes English translation).
Patent Owner's Sur-Reply Pursuant to 37 C.F.R. 42.23, filed with the United States Patent and Trademark Office in connection with Case IPR2020-00007 on Apr. 23, 2021, 40 pages.
"Opposition to a European Patent," filed with the European Patent Office by Fun Factory GmbH in connection with European Patent No. EP3305266 on Feb. 11, 2021, 138 pages (includes English translation).
"Opposition to a European Patent, Exhibit D15" filed with the European Patent Office by Fun Factory GmbH in connection with European Patent No. EP3305266 on Feb. 11, 2021, 62 pages (includes English translation).
"Opposition to a European Patent," filed with the European Patent Office by EIS GmbH in connection with European Patent No. EP3305266 on Feb. 15, 2021, 199 pages (includes English translation).
"Opposition to a European Patent, Exhibit E36" filed with the European Patent Office by EIS GmbH in connection with European Patent No. EP3305266 on Feb. 15, 2021, 2 pages.
"Statement of Grounds and Particulars of Opposition," filed with IP Australia in connection with Australian Patent Application No. 2018222907 on Feb. 24, 2021, 15 pages.
"Evidence in Support," filed with IP Australia by EIS GmbH in connection with Australian Patent Application No. 2018222907 on May 18, 2021, 53 pages.
Canadian Patent Office, "Office Action," issued in connection with Canadian Application No. 2,978,739, on Jan. 25, 2018, 5 pages.
European Patent Office, "Message," issued in connection with opposition of European Patent No. EP3308762 on Jun. 4, 2021, 40 pages (includes English translation).
European Patent Office, "Message," issued in connection with opposition of European Patent No. EP2976057 on Jun. 1, 2021, 35 pages (includes English translation).
United States Patent and Trademark Office, "Judgment, Final Written Decision," issued in connection with Case IPR2019-01302 on Jun. 14, 2021, 75 pages.
German Patent and Trademark Office, "Examination Report," issued in connection with German Application No. 10 2015 017 096.1, on Aug. 13, 2021, 23 pages (includes English translation).
United States Patent and Trademark Office, "Judgment, Final Written Decision," issued in connection with Case IPR2020-00007 on Sep. 23, 2021, 78 pages.
"Petitioner's Notice of Appeal," filed with the United States Patent and Trademark Office in connection with Case IPR2019-01302 on Aug. 13, 2021, 80 pages.
"Opposition to a German Patent," filed with the German Patent and Trademark Office by Fun Factory GmbH in connection with German Patent No. 10 2013 022 393.8 on Sep. 9, 2021, 175 pages (includes English translation).
"Opposition to a German Patent, Exhibit 5A," filed with the German Patent and Trademark Office by Fun Factory GmbH in connection with German Patent No. 10 2013 022 393.8 on Sep. 9, 2021, 10 pages.
*EIS Inc.* v. *IntiHealth Ger GmbH et al.*, "Plaintiff EIS Inc"s Answer and Affirmative Defenses to Defendant Novoluto"s Counterclaims," filed with the United States District Court for the District of Delaware, case No. 1:19-cv-01227-LPS, Nov. 12, 2021, 53 pages.
*EIS Inc.* v. *IntiHealth Ger GmbH et al.*, "Plaintiff EIS Inc"s Answer and Affirmative Defenses to Defendant Novoluto"s Counterclaims,

(56) References Cited

OTHER PUBLICATIONS

Exhibit A," filed with the United States District Court for the District of Delaware, case No. 1:19-cv-01227-LPS, Nov. 12, 2021, 95 pages.
*EIS Inc.* v. *IntiHealth Ger GmbH et al.*, "Plaintiff EIS Inc"s Answer and Affirmative Defenses to Defendant Novoluto"s Counterclaims, Exhibit B," filed with the United States District Court for the District of Delaware, case No. 1:19-cv-01227-LPS, Nov. 12, 2021, 91 pages.
*EIS Inc.* v. *IntiHealth Ger GmbH et al.*, "Plaintiff EIS Inc"s Answer and Affirmative Defenses to Defendant Novoluto"s Counterclaims, Exhibit C," filed with the United States District Court for the District of Delaware, case No. 1:19-cv-01227-LPS, Nov. 12, 2021, 88 pages.
*EIS Inc.* v. *IntiHealth Ger GmbH et al.*, "Plaintiff EIS Inc"s Answer and Affirmative Defenses to Defendant Novoluto"s Counterclaims, Exhibit D," filed with the United States District Court for the District of Delaware, case No. 1:19-cv-01227-LPS, Nov. 12, 2021, 5 pages.
*EIS Inc.* v. *IntiHealth Ger GmbH et al.*, "Plaintiff EIS Inc"s Answer and Affirmative Defenses to Defendant Novoluto"s Counterclaims, Exhibit E," filed with the United States District Court for the District of Delaware, case No. 1:19-cv-01227-LPS, Nov. 12, 2021, 7 pages.
*EIS Inc.* v. *IntiHealth Ger GmbH et al.*, "Plaintiff EIS Inc"s Answer and Affirmative Defenses to Defendant Novoluto"s Counterclaims, Exhibit F," filed with the United States District Court for the District of Delaware, case No. 1:19-cv-01227-LPS, Nov. 12, 2021, 6 pages.
*EIS Inc.* v. *IntiHealth Ger GmbH et al.*, "Plaintiff EIS Inc"s Answer and Affirmative Defenses to Defendant Novoluto"s Counterclaims, Exhibit G," filed with the United States District Court for the District of Delaware, case No. 1:19-cv-01227-LPS, Nov. 12, 2021, 9 pages.
*EIS Inc.* v. *IntiHealth Ger GmbH et al.*, "Plaintiff EIS Inc"s Answer and Affirmative Defenses to Defendant Novoluto"s Counterclaims, Exhibit H," filed with the United States District Court for the District of Delaware, case No. 1:19-cv-01227-LPS, Nov. 12, 2021, 54 pages.
*EIS Inc.* v. *IntiHealth Ger GmbH et al.*, "Plaintiff EIS Inc"s Answer and Affirmative Defenses to Defendant Novoluto"s Counterclaims, Exhibit I," filed with the United States District Court for the District of Delaware, case No. 1:19-cv-01227-LPS, Nov. 12, 2021, 17 pages.
*EIS Inc.* v. *IntiHealth Ger GmbH et al.*, "Plaintiff EIS Inc"s Answer and Affirmative Defenses to Defendant Novoluto"s Counterclaims, Exhibit J," filed with the United States District Court for the District of Delaware, case No. 1:19-cv-01227-LPS, Nov. 12, 2021, 30 pages.
*EIS Inc.* v. *IntiHealth Ger GmbH et al.*, "Letter to The Honorable Leonard P. Stark from Paul D. Brown regarding Motion to Strike Invalidity Contentions," filed with the United States District Court for the District of Delaware in connection with Case No. 1:19-cv-1227-LPS on Nov. 17, 2021, 3 pages.
*EIS Inc.* v. *IntiHealth Ger GmbH et al.*, "Letter to The Honorable Leonard P. Stark from Paul D. Brown regarding Motion to Strike Invalidity Contentions, Exhibit 1," filed with the United States District Court for the District of Delaware in connection with Case No. 1:19-cv-1227-LPS on Nov. 17, 2021, 382 pages.
Josefson, D., FDA Approves Device for Female Sexual Dysfunction, 320 BMJ 7247 at 1427 (2000).
*EIS Inc.* v. *IntiHealth Ger GmbH et al.*, "Letter to the Honorable Leonard P. Stark in Opposition to Defendants' Motion to Strike EIS's Initial Invalidity Contentions," filed with the United States District Court for the District of Delaware in connection with Case No. 1:19-cv-1227-LPS on Nov. 30, 2021, 7 pages.
*EIS Inc.* v. *IntiHealth Ger GmbH et al.*,"Letter to the Honorable Leonard P. Stark from Gregory E. Stuhlman, Esquire Regarding Motion to Strike Invalidity Contentions," filed with the United States District Court for the District of Delaware in connection with Case No. 1:19-cv-1227-LPS on Dec. 3, 2021, 2 pages.
*EIS Inc.* v. *IntiHealth Ger GmbH et al.*, "Counterclaim Defendants EIS GmbH, Triple A Import GmbH, and Triple A Marketing GmbH's Answer and Affirmative Defenses to Defendant Novoluto's Counterclaims," filed with the United States District Court for the District of Delaware in connection with Case No. 1:19-cv-1227-LPS on Dec. 13, 2021, 54 pages.
*EIS Inc.* v. *IntiHealth Ger GmbH et al.*, "Plaintiff EIS Inc.'s Opening Brief in Support of its Motion for Temporary Restraining Order and Preliminary Injunction (Public Version)," filed with the United States District Court for the District of Delaware in connection with Case No. 1:19-cv-1227-LPS on Dec. 15, 2021, 26 pages.
*EIS Inc.* v. *IntiHealth Ger GmbH et al.*, "Plaintiff EIS Inc.'s Opening Brief in Support of its Motion for Temporary Restraining Order and Preliminary Injunction (Public Version), Exhibit A-12" filed with the United States District Court for the District of Delaware in connection with Case No. 1:19-cv-1227-LPS on Dec. 15, 2021, 22 pages.
*EIS Inc.* v. *IntiHealth Ger GmbH et al.*, "Letter to the Honorable Leonard P. Stark Regarding Motion for Temporary Restraining Order (Public Version)," filed with the United States District Court for the District of Delaware in connection with Case No. 1:19-cv-1227-LPS on Dec. 15, 2021, 6 pages.
*EIS Inc.* v. *IntiHealth Ger GmbH et al.*, "Letter to the Honorable Leonard P. Stark Regarding Reply in Support of Plaintiff EIS's Inc.'s Motion for Temporary Restraining Order and Preliminary Injunction (Public Version)," filed with the United States District Court for the District of Delaware in connection with Case No. 1:19-cv-1227-LPS on Dec. 15, 2021, 4 pages.
United States Patent and Trademark Office, "Final Office Action," issued in connection with U.S. Appl. No. 15/965,117, on Dec. 6, 2018, 15 pages.
United States Patent and Trademark Office, "Final Office Action," issued in connection with U.S. Appl. No. 15/965,208, on Dec. 10, 2018, 19 pages.
United States Patent and Tradmark Office, "Non-Final Office action," issued in connection with U.S. Appl. No. 15/354,599, on Nov. 13, 2018, 34 pages.
New Zealand Intellectual Property Office, "Further Examination Report," issued in connection with NZ Application No. 735229, on Aug. 23, 2018, 4 pages.
Singapore Patent Office, "Written Opinion," issued in connection with Singapore Application No. 11201707395T, on Jul. 24, 2018, 8 pages.
"Statement of Grounds and Particulars of Opposition," filed with the Australian Patent Office in connection with Australian Patent Application No. 2015386680 on Sep. 21, 2018, 11 pages.
Taiwan Patent Office, "English Translation of Office Action," issued in connection with Taiwanese Application No. 106132654, on Aug. 9, 2018, 3 pages.
United States Patent and Trademark Office, "Non-Final Office action," issued in connection with U.S. Appl. No. 15/719,085 on Aug. 31, 2018, 17 pages.
European Patent Office, "Search Report," issued in connection with European Application No. 17190856, on Apr. 27, 2018, 9 pages (includes English translation).
Singapore Patent Office, "Search Report and Written Opinion," issued in connection with Singapore Application No. 10201707736X, on May 18, 2018, 9 pages.
IP Australia, "Examination Report," issued in connection with Australian Application No. 2019247064 on Feb. 25, 2022, 4 pages.
IP Australia, "Examination Report," issued in connection with Australian Application No. 2019247064 on Jul. 15, 2022, 4 pages.
Canadian Patent Office, "Office Action," issued in connection with Canadian Patent Application No. 3095965 on Feb. 8, 2022, 5 pages.
Canadian Patent Office, "Office Action," issued in connection with Canadian Patent Application No. 3095965 on Jan. 23, 2023, 5 pages.
European Patent Office, "Notification under Article 94 (3) EPC," issued in connection with European Application No. 19787154.4 on Apr. 19, 2023, 10 pages (includes English translation).

(56) References Cited

OTHER PUBLICATIONS

German Patent and Trademark Office, "Examination Report," issued in connection with German Application No. 10 2018 107 961.3 on May 23, 2019, 22 pages (includes English translation).
"Preliminary Court Opinion," issued by the German Federal Patent Court in connection with appeal regarding German Patent No. 102013110501.7 on Dec. 14, 2022, 46 pages (includes English translation).
"Minutes of Oral Proceeding," issued by the German Federal Patent Court in connection with appeal regarding German Patent No. 102013110501.7 on Jan. 31, 2023, 9 pages (includes English translation).
*EIS Inc.* v. *IntiHealth Ger GmbH et al.*, "Official Transcript of Markman Hearing Held on Nov. 21, 2022," issued on Nov. 29, 2022, in connection with Case No. 1:19-cv-1227-GBW before the United States District Court for the District of Delaware, 208 pages.
*EIS Inc.* v. *IntiHealth Ger GmbH et al.*, "Memorandum Opinion," issued by the United States District Court for the District of Delaware in connection with Case No. 1:19-cv-1227-GBW on Jan. 9, 2023, 47 pages.
*EIS Inc.* v. *IntiHealth Ger GmbH et al.*, "Defendants' Reply in Support of Its Motion for Leave to File Early Motion for Partial Summary Judgment," filed with the United States District Court for the District of Delaware in connection with Case No. 1:19-cv-1227-GBW on Jan. 17, 2023, 6 pages.
*EIS Inc.* v. *IntiHealth Ger GmbH et al.*, "Plaintiff and Counterclaim-Defendants' Motion to Strike Untimely Doctrine of Equivalents Allegations," filed with the United States District Court for the District of Delaware in connection with Case No. 1:19-cv-1227-GBW on Mar. 6, 2023, 3 pages.
*EIS Inc.* v. *IntiHealth Ger GmbH et al.*, "Letter to the Honorable Gregory B. Williams Regarding Counterclaim-Defendants' Motion to Strike Untimely Doctrine of Equivalents Allegations," filed with the United States District Court for the District of Delaware in connection with Case No. 1:19-cv-1227-GBW on Mar. 6, 2023, 25 pages.
*EIS Inc.* v. *IntiHealth Ger GmbH et al.*, "Defendant/Counterclaimant Novoluto Gmbh's Motion to Strike Plaintiff and Counterclaim-Defendants' Election of Prior-Art-Based Invalidity Arguments Pursuant to IPR Estoppel, 35 U.S.C. § 315(E)(2)," filed with the United States District Court for the District of Delaware in connection with Case No. 1:19-cv-1227-GBW on Mar. 9, 2023, 3 pages.
*EIS Inc.* v. *IntiHealth Ger GmbH et al.*, "Letter to The Honorable Gregory B. Williams from Paul D. Brown Regarding Defendant and Counterclaimant Novoluto GmbH's Motion to Strike Plaintiff's and Counterclaim- Defendants' Election of Prior-Art-Based Invalidity Arguments Pursuant to IPR Estoppel, 35 U.S.C. § 315(E)(2)," filed with the United States District Court for the District of Delaware in connection with Case No. 1:19-cv-1227-GBW on Mar. 9, 2023, 640 pages.
*EIS Inc.* v. *IntiHealth Ger GmbH et al.*, "Letter to The Honorable Gregory B. Williams from Paul D. Brown Regarding Response to Counterclaim Defendants' Motion to Strike Doctrine of Equivalents Allegations," filed with the United States District Court for the District of Delaware in connection with Case No. 1:19-cv-1227-GBW on Mar. 13, 2023, 2 pages.
*EIS Inc.* v. *IntiHealth Ger GmbH et al.*, "Letter to The Honorable Gregory B. Williams from Jack B. Blumenfeld Regarding Opposition to Defendants' Motion to Strike EIS's Election of Prior-Art-Based Invalidity Arguments," filed with the United States District Court for the District of Delaware in connection with Case No. 1:19-cv-1227-GBW on Mar. 20, 2023, 16 pages.
*EIS Inc.* v. *IntiHealth Ger GmbH et al.*, "Letter to The Honorable Gregory B. Williams from Gregory E. Stuhlman, Esquire Regarding Reply Letter Regarding Defendant-Counterclaimant Novoluto GmbH's Motion to Strike Plaintiff's and Counterclaim-Defendants' Election of Prior-Art-Based Invalidity Arguments Pursuant to IPR Estoppel," filed with the United States District Court for the District of Delaware in connection with Case No. 1:19-cv-1227-GBW on Mar. 21, 2023, 9 pages.
*EIS Inc.* v. *IntiHealth Ger GmbH et al.*, "Letter to The Honorable Gregory B. Williams from Jack B. Blumenfeld Regarding Response to the Court's Oral Order," filed with the United States District Court for the District of Delaware in connection with Case No. 1:19-cv-1227-GBW on Mar. 30, 2023, 1 page.
*Novoluto GmbH* v. *Uccellini LLC*, "Motion for Entry of Default and for Leave to Move for Default Judgment Pursuant to Fed. R. Civ. P. 55(b)(2)," filed with the United States District Court for the District of Oregon in connection with Case No. 6:20-cv-02284-MK on Mar. 15, 2023, 5 pages.
*Novoluto GmbH* v. *Uccellini LLC*, "Declaration of Tammy J. Terry in Support of Motion for Entry of Default and for Leave to Move for Default Judgment," filed with the United States District Court for the District of Oregon in connection with Case No. 6:20-cv-02284-MK on Mar. 15, 2023, 3 pages.
"Judgment," issued by the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007) on Mar. 13, 2023, 2 pages.
United States Patent and Trademark Office, "Notice of Allowance," issued in connection with U.S. Appl. No. 16/339,969, dated Dec. 8, 2022, 7 pages.
United States Patent and Trademark Office, "Notice of Allowance," issued in connection with U.S. Appl. No. 15/888,568, dated Jan. 18, 2023, 8 pages.
United States Patent and Trademark Office, "Non-Final Office Action," issued in connection with U.S. Appl. No. 16/752,283, dated Jan. 19, 2023, 16 pages.
United States Patent and Trademark Office, "Non-Final Office Action," issued in connection with U.S. Appl. No. 17/029,974, dated Feb. 28, 2023, 100 pages.
United States Patent and Trademark Office, "Non-Final Office Action," issued in connection with U.S. Appl. No. 17/403,609, dated Mar. 16, 2023, 6 pages.
United States Patent and Trademark Office, "Non-Final Office Action," issued in connection with U.S. Appl. No. 17/461,470, dated Mar. 16, 2023, 6 pages.
United States Patent and Trademark Office, "Final Office Action," issued in connection with U.S. Appl. No. 16/811,907, dated Apr. 7, 2023, 32 pages.
United States Patent and Trademark Office, "Non-Final Office Action," issued in connection with U.S. Appl. No. 16/339,969, dated Apr. 12, 2023, 12 pages.
"Grounds on Appeal," issued by the German Federal Patent Court in connection with appeal regarding German Patent No. 102013110501.7 on May 22, 2023, 67 pages (includes English translation).
European Patent Office, Board of Appeals, "Oral Proceedings: Minutes," issued in connection with opposition of European Patent No. EP2976057 on May 24, 2023, 14 pages (includes English translation).
European Patent Office, Board of Appeals, "Copy of Decision of May 16, 2023," issued in connection with opposition of European Patent No. EP2976057 on Jun. 21, 2023, 46 pages (includes English translation).
European Patent Office, Board of Appeals, "Oral Proceedings: Minutes," issued in connection with opposition of European Patent No. EP3308762 on May 24, 2023, 16 pages (includes English translation).
European Patent Office, Board of Appeals, "Copy of Decision of May 16, 2023," issued in connection with opposition of European Patent No. EP3308762 on Jun. 21, 2023, 48 pages (includes English translation).
*EIS Inc.* v. *IntiHealth Ger GmbH et al.*, "Letter to The Honorable Gregory B. Williams from Jack B. Blumenfeld Regarding Discovery Dispute (Redacted Public Version)," filed with the United States District Court for the District of Delaware in connection with Case No. 1:19-cv-1227-GBW on Apr. 6, 2023 (redacted version filed Apr. 13, 2023), 433 pages (uploaded in 4 parts).

(56) References Cited

OTHER PUBLICATIONS

*EIS Inc.* v. *IntiHealth Ger GmbH et al.*, "Defendant-Counterclaimant Novoluto's Reply Letter to The Honorable Gregory B. Williams Regarding Alleged Privilege Waiver by Defendants," filed with the United States District Court for the District of Delaware in connection with Case No. 1:19-cv-1227-GBW on Apr. 12, 2023, 4 pages.
IP Australia, "Examination Report No. 1 for Standard Patent Application," issued in connection with Australian Application No. 2019438954, on Jan. 21, 2025, 5 pages.
European Patent Office, "Extended European Search Report," issued in connection with European Patent Application No. 24195102.9, dated Nov. 14, 2024, 17 pages (includes English translation).
United States Patent and Trademark Office, "Office Action," issued in connection with U.S. Appl. No. 16/339,969, dated Oct. 21, 2024, 15 pages.
IP Australia, "Examination Report No. 2 for Standard Patent Application," issued in connection with Australian Application No. 2020200457, on Oct. 22, 2024, 5 pages.
"Opposition to a European Patent," filed with the European Patent Office action in connection with opposition of European Patent No. 3773406 on Dec. 27, 2024, 176 pages (includes English translation).
"Opposition to a European Patent, Exhibit D7" filed with the European Patent Office action in connection with opposition of European Patent No. 3773406 on Dec. 27, 2024, 10 pages (includes English translation).
"Opposition to a European Patent, Exhibit D10" filed with the European Patent Office action in connection with opposition of European Patent No. 3773406 on Dec. 27, 2024, 30 pages (includes English translation).
European Patent Office, "Summons to Attend Oral Proceedings," issued in connection with opposition of European Patent No. 3267960 on Oct. 18, 2024, 48 pages (includes English translation).
"Response to the Complaint," filed with the European Patent Office in connection with opposition of European Patent No. EP3705106 on Nov. 19, 2024, 212 pages (includes English translation).
European Patent Office, "Summons to Attend Oral Proceedings," issued in connection with opposition of European Patent No. 3400926 on Dec. 5, 2024, 66 pages (includes English translation).
"Opposition to a European Patent," filed with the European Patent Office action in connection with opposition of European Patent No. 3998055 on Dec. 23, 2024, 237 pages (includes English translation).
United States Patent and Trademark Office, "Notice of Allowance," issued in connection with U.S. Appl. No. 16/339,969, dated Jan. 6, 2025, 13 pages.
United States Patent and Trademark Office, "Office Action," issued in connection with U.S. Appl. No. 17/044,501, dated Jun. 20, 2025, 14 pages.
European Patent Office, "Oral Proceedings: Forwarding Minutes, " issued in connection with opposition of European Patent No. 3685809 on Jun. 25, 2025, 11 pages (includes English translation).
Canadian Patent Office, "Office Action," issued in connection with Canadian Patent Application No. 3,069,463 on Jun. 30, 2025, 7 pages.
"Written Submission in Preparation to/during Oral Proceedings" filed with the European Patent Office in connection with opposition of European Patent No. 3267960 on Jul. 9, 2025, 94 pages (includes English translation).
"Written Submission in Preparation to/during Oral Proceedings, Exhibit D19" filed with the European Patent Office in connection with opposition of European Patent No. 3267960 on Jul. 9, 2025, 43 pages (includes English translation).
"Written Submission in Preparation to/during Oral Proceedings, Exhibit D21" filed with the European Patent Office in connection with opposition of European Patent No. 3267960 on Jul. 9, 2025, 65 pages (includes English translation).
"Written Submission in Preparation to/during Oral Proceedings, Exhibit D23" filed with the European Patent Office in connection with opposition of European Patent No. 3267960 on Jul. 9, 2025, 3 pages (includes English translation).
"Written Submission in Preparation to/during Oral Proceedings, Exhibit D24" filed with the European Patent Office in connection with opposition of European Patent No. 3267960 on Jul. 9, 2025, 18 pages (includes English translation).
"Written Submission in Preparation to/during Oral Proceedings, Exhibit D25" filed with the European Patent Office in connection with opposition of European Patent No. 3267960 on Jul. 9, 2025, 14 pages (includes English translation).
"Written Submission in Preparation to/during Oral Proceedings, Exhibit D26" filed with the European Patent Office in connection with opposition of European Patent No. 3267960 on Jul. 9, 2025, 11 pages (includes English translation).
United States Patent and Trademark Office, "Office Action," issued in connection with U.S. Appl. No. 17/029,974, dated Jul. 24, 2025, 260 pages.
Canadian Patent Office, "Office Action," issued in connection with Canadian Patent Application No. 3,095,965 on Jul. 3, 2025, 5 pages.
"Written Submission in Preparation to/during Oral Proceedings" filed with the European Patent Office in connection with opposition of European Patent No. 3400926 on Aug. 6, 2025, 128 pages (includes English translation).
"Written Submission in Preparation to/during Oral Proceedings, Exhibit D29" filed with the European Patent Office in connection with opposition of European Patent No. 3400926 on Aug. 6, 2025, 2 pages.
"Written Submission in Preparation to/during Oral Proceedings, Exhibit D30" filed with the European Patent Office in connection with opposition of European Patent No. 3400926 on Aug. 6, 2025, 3 pages.
"Written Submission in Preparation to/during Oral Proceedings, Exhibit D31" filed with the European Patent Office in connection with opposition of European Patent No. 3400926 on Aug. 6, 2025, 12 pages (includes English translation).
"Written Submission in Preparation to/during Oral Proceedings, Exhibit D32" filed with the European Patent Office in connection with opposition of European Patent No. 3400926 on Aug. 6, 2025, 9 pages (includes English translation).
"Written Submission in Preparation to/during Oral Proceedings, Exhibit D33" filed with the European Patent Office in connection with opposition of European Patent No. 3400926 on Aug. 6, 2025, 2 pages (includes English translation).
"Written Submission in Preparation to/during Oral Proceedings, Exhibit D34" filed with the European Patent Office in connection with opposition of European Patent No. 3400926 on Aug. 6, 2025, 47 pages (includes English translation).
"Written Submission in Preparation to/during Oral Proceedings" filed with the European Patent Office in connection with opposition of European Patent No. 3267960 on Aug. 11, 2025, 24 pages (includes English translation).
European Patent Office, "Summons to Attend Oral Proceedings," issued in connection with opposition of European Patent No. 3998055 on Aug. 14, 2025, 50 pages (includes English translation).
"Opposition to a European Patent," filed with the European Patent Office action in connection with opposition of European Patent No. 3946210 on May 21, 2025, 259 pages (includes English translation).
"Opposition to a European Patent, Exhibit D3a" filed with the European Patent Office action in connection with opposition of European Patent No. 3946210 on May 21, 2025, 1 page.
"Opposition to a European Patent, Exhibit D8a" filed with the European Patent Office action in connection with opposition of European Patent No. 3946210 on May 21, 2025, 1 page.
"Opposition to a European Patent, Exhibit D8b" filed with the European Patent Office action in connection with opposition of European Patent No. 3946210 on May 21, 2025, 1 page.
"Opposition to a European Pat, Exhibit D9b (color-coded copy of FIG. 3a of Japanese Pat. App. Pub. No. 2011-083423A)" filed with the European Patent Office action in connection with opposition of European Patent No. 3946210 on May 21, 2025, 1 page.
"Opposition to a European Patent, Exhibit D9c (color-coded copy FIG. 14b of Japanese Pat. App. Pub. No. 2011-083423A)" filed with the European Patent Office action in connection with opposition of European Patent No. 3946210 on May 21, 2025, 1 page.

(56) References Cited

OTHER PUBLICATIONS

"Opposition to a European Patent, Exhibit 10" filed with the European Patent Office action in connection with opposition of European Patent No. 3946210 on May 21, 2025, 30 pages (includes English translation).
"Opposition to a European Patent, Exhibit D11a (annotated copy of FIG. 2 of German Pat. App. Pub. No. DE 20 2005 004 843 U1" filed with the European Patent Office action in connection with opposition of European Patent No. 3946210 on May 21, 2025, 1 page.
"Opposition to a European Patent, Exhibit D11b (annotated and color-coded copy of FIG. 3 of German Pat. App. Pub. No. DE 20 2005 004 843 U1" filed with the European Patent Office action in connection with opposition of European Patent No. 3946210 on May 21, 2025, 1 page.
"Opposition to a European Patent, Exhibit D13a" filed with the European Patent Office action in connection with opposition of European Patent No. 3946210 on May 21, 2025, 1 page.
"Opposition to a European Patent, Exhibit D14a" filed with the European Patent Office action in connection with opposition of European Patent No. 3946210 on May 21, 2025, 6 pages (includes English translation).
"Opposition to a European Patent, Exhibit D14b" filed with the European Patent Office action in connection with opposition of European Patent No. 3946210 on May 21, 2025, 4 pages (includes English translation).
"Opposition to a European Patent, Exhibit D14e" filed with the European Patent Office action in connection with opposition of European Patent No. 3946210 on May 21, 2025, 246 pages (includes English translation).
"Opposition to a European Patent, Exhibit D17" filed with the European Patent Office action in connection with opposition of European Patent No. 3946210 on May 21, 2025, 1 page.
"Opposition to a European Patent, Exhibit D17a" filed with the European Patent Office action in connection with opposition of European Patent No. 3946210 on May 21, 2025, 1 page.
"Opposition to a European Patent, Exhibit D17b" filed with the European Patent Office action in connection with opposition of European Patent No. 3946210 on May 21, 2025, 1 page.
"Opposition to a European Patent, Exhibit D17c" filed with the European Patent Office action in connection with opposition of European Patent No. 3946210 on May 21, 2025, 1 page.
"Opposition to a European Patent, Exhibit D17d" filed with the European Patent Office action in connection with opposition of European Patent No. 3946210 on May 21, 2025, 1 page.
"Opposition to a European Patent, Exhibit D17e" filed with the European Patent Office action in connection with opposition of European Patent No. 3946210 on May 21, 2025, 1 page.
"Opposition to a European Patent, Exhibit D17f" filed with the European Patent Office action in connection with opposition of European Patent No. 3946210 on May 21, 2025, 1 page.
"Opposition to a European Patent, Exhibit D17g" filed with the European Patent Office action in connection with opposition of European Patent No. 3946210 on May 21, 2025, 3 pages (includes English translation).
"Opposition to a European Patent, Exhibit D17h" filed with the European Patent Office action in connection with opposition of European Patent No. 3946210 on May 21, 2025, 6 pages (includes English translation).
"Opposition to a European Patent, Exhibit D18" filed with the European Patent Office action in connection with opposition of European Patent No. 3946210 on May 21, 2025, 10 pages (includes English translation).
European Patent Office, "Summons to Attend Oral Proceedings," issued in connection with opposition of European Patent No. 3773954 on May 23, 2025, 25 pages (includes English translation).
European Patent Office, "Brief Communication—Opposition Proceedings," issued in connection with opposition of European Patent No. 3400926 on Aug. 12, 2025, 128 pages (includes English translation).
Canadian Patent Office, "Office Action," issued in connection with Canadian Patent Application No. 3,074,820 on Sep. 11, 2025, 8 pages.
IP Australia, "Examination Report No. 1 for Standard Patent Application," issued in connection with Australian Application No. 2024208803, on Nov. 10, 2025, 4 pages.
"Written Submission in Preparation to/during Oral Proceedings" filed with the European Patent Office in connection with opposition of European Patent No. 3773954 on Nov. 13, 2025, 43 pages (includes English translation).
European Patent Office, "Decision Revoking the European Patent," issued in connection with opposition of European Patent No. 3400926 on Nov. 24, 2025, 62 pages (includes English translation).
European Patent Office, "Summons to Attend Oral Proceedings," issued in connection with opposition of European Patent No. 3773406 on Sep. 5, 2025, 50 pages (includes English translation).
Canadian Patent Office, "Office Action," issued in connection with Canadian Patent Application No. 3,134,908 on Oct. 14, 2025, 5 pages.
European Patent Office, "Summons to Attend Oral Proceedings," issued in connection with opposition of European Patent No. 3946210 on Dec. 8, 2025, 96 pages (inlcuded English translation).
"Third-Party Submission Under 37 CFR 1.290," filed with the United States Patent and Trademark Office in connection with U.S. Appl. No. 19/043,047, on Jan. 21, 2026, 20 paes.
"Written Submission in Preparation to/during Oral Proceedings," filed with the European Patent Office in connection with opposition of European Patent No. 3773406 on Jan. 23, 2026, 21 pages (includes English translation).

* cited by examiner

DEVICE FOR STIMULATING A HUMAN EROGENOUS ZONE USING A VARIABLE PRESSURE FIELD

RELATED APPLICATIONS

This patent claims the benefit under 35 U.S.C. § 371 of International Patent Application No. PCT/DE2019/100860, filed Sep. 30, 2019, which claims priority to International Patent Application No. PCT/DE2019/100309, filed Apr. 4, 2019. Priority to International Patent Application No. PCT/DE2019/100860 and International Patent Application No. PCT/DE2019/100309 is hereby claimed. International Patent Application No. PCT/DE2019/100860 and International Patent Application No. PCT/DE2019/100309 are hereby incorporated by reference in their entireties.

FIELD OF THE DISCLOSURE

The invention relates to a device for stimulating a human erogenous zone using a variable pressure field.

BACKGROUND

DE 10 2013 110 501 A1 describes a stimulation device having a drivetrain, an electrochemical energy storage in the form of a rechargeable battery or a battery unit, and a control unit, the drivetrain of which consists of a rotating electric motor having an eccentric shaft, a connection rod, and a piston in at least one chamber of the stimulation device. By means of the control current in the form of direct current supplied by the rotating electric motor, the rotational speed of the electric motor and thus ultimately the frequency of the piston movement is varied or controlled. The stroke of the piston is established by the defined eccentric path and thus is not modifiable during operation.

DE 10 2016 105 019 B3 describes a stimulation device, the drive unit of which "simplifies the structure" of that in DE 10 2013 110 501 A1 and is intended to generate a "higher diversity of different vibrations." There is no rotating electric motor provided in the drivetrain here, but instead an electric linear motor with coil elements in the primary part and at least one magnetic core, which core is guided in an axially movable manner and arranged parallel to the coil element and has at least two permanent magnets arranged in an antipolar manner, as a secondary part. The magnetic core is mechanically connected to at least one actuating portion of the first chamber wall of the stimulation device. By supplying the coils or the winding of the electric linear motor or the coil elements with the supplied control current, the rotor-side magnetic core is moved axially back and forth. The maximum axial displacement path of the magnetic core is defined by the number, structure, arrangement and circuitry of the coils.

SUMMARY

The object of the invention is to provide a device for stimulating a human erogenous zone using a variable pressure field, which allows for a device with improved operating characteristics.

To achieve the object, a device for stimulating a human erogenous zone using a variable pressure field according to the independent claim 1. The dependent claims relate to embodiments.

According to one aspect, a device is produced for stimulating a human erogenous zone using a variable pressure field. The device has the following: a housing on which a handle portion and a stimulation portion are formed; a drive device that is arranged in the housing and designed to repeatedly provide a drive movement; a pressure chamber that is arranged in the housing in order to provide a variable pressure field and is surrounded by a chamber wall at least in portions; a movable chamber wall portion that forms a portion of the chamber wall and is coupled to the drive device such that the movable chamber wall portion can repeatedly move between different wall positions in response to the drive movement coupled thereto, as a result of which a chamber volume of the pressure chamber is repeatedly increased and decreased in order to generate the variable pressure field; a housing opening that is arranged in the stimulation portion and is fluidly connected to the pressure chamber such that the variable pressure field generated by means of the pressure chamber can be dispensed via the housing opening in the form of positive and negative pressures, particularly for acting on the clitoris; a sealing device, which is allocated to the housing opening and is arranged in the region of the stimulation portion and is designed to seal off the pressure chamber from the surrounding area while in operation; and a battery device that is designed to provide a drive energy for the drive device, wherein in the drive device, a coil device, through which an electric current flows during operation, is movably arranged in an assigned stationary permanent magnetic field and is coupled to the movable chamber wall portion in order to transmit the drive movement.

A variable pressure field within the meaning of the disclosure is a media pressure field varying in terms of time and location, said field having positive and negative pressures, a negative pressure being a media pressure that is below a reference pressure, for example the ambient pressure, and a positive pressure being a media pressure that is above the reference pressure. The medium may be a medium filling the pressure chamber. The medium may be a gas or liquid. The medium may be air, for example.

By means of the sealing device, the pressure chamber is sealed off, either entirely or for the most part entirely, from the surrounding area when the housing opening is applied to a body section of an erogenous zone. For example, the sealing device may have a sealing projection, for example having a sealing bead. The sealing device may be formed in an encircling continuous manner around the housing opening. The sealing device, in particular the sealing projection, may be adapted to the shape of the housing opening, for example designed in a circular manner.

The battery device may comprise a non-rechargeable and/or a rechargeable energy storage. For example, the battery device may comprise a rechargeable battery.

In the device, the permanent magnetic field designed to be stationary may be provided by means of one or more permanent magnets. Supplementally, one or more pole plates of the arrangement may be included with the permanent magnet(s). The magnetic flux can be concentrated by means of the pole plates.

In contrast to the electromagnetic drives, in which permanent magnets are moved in an electromagnetic field generated by a coil device for generating a drive movement, in the proposed device the coil apparatus is movably arranged in a stationary magnetic field. The control current from the control unit may be applied to the movably arranged coil device. In this case, the so-called Lorentz force can act on the current-conducting coil device movably arranged in the stationary permanent magnetic field, so that the coil moves correspondingly when energized. The strength of the Lorentz force depends on the amplitude of the control current, the length of the coil, the arrangement of the coil with respect to the magnetic field and the flux density of the magnetic field in the air gap. The flux density of the magnetic field in the air gap is in turn determined for a given air gap by the magnet material as well as the magnet volume and/or magnet weight. A high flux rate of the magnetic field can be achieved in otherwise identical conditions by increasing the magnet volume and/or the magnet weight of the stationary permanent magnets, without increasing the weight of the movable coil device. The mass to be moved can hereby be kept lower in comparison to the prior art. A lower mass can be moved more efficiently with comparatively better dynamics and be designed with fewer disruptive vibrations in the form of structure-borne sound as well as more favorable sound emissions in the form of airborne sound.

The drive device is designed as a linear drive device, which when operating generates a linear drive movement that is coupled to the movable chamber wall portion so that on the basis of its movement, the volume of the pressure chamber is repeatedly increased and decreased so that a pressure field is generated, which can be used for the contactless transmission of the stimulation of an erogenous zone. In contrast to stimulation devices in which a stimulation head is moved to transmit the stimulation waves via contact, the proposed device does not require moving such a mass of the stimulation head.

The variable pressure field generated by means of the pressure chamber may act on the erogenous zone, for example the clitoris, via the housing opening in the form of positive and negative pressures. For example, the variable pressure field generated by means of the pressure chamber acts on the erogenous zone via the housing opening when the housing opening is placed on the clitoris. The housing opening can fully or partially cover a clitoris. For example, the housing opening can cover the clitoral hood. A portion of the housing surrounding the housing opening may contact the skin. For example, the portion of the housing surrounding the housing opening may contact the clitoris and/or a skin region surrounding the clitoris. The housing portion may substantially lie in a closing manner. For example, the portion of the housing surrounding the housing opening may contact the skin such that a media movement is impeded by the housing opening. The pressure applied to the housing opening in the variable pressure field can then act on the erogenous zone. A low volume flow of the medium can hereby be made possible, which does not result in complete pressure equalization with respect to the ambient pressure at the housing opening. For example, the portion of the housing surrounding the housing opening may contact the skin in an interrupted manner in such a manner that by means of the interruptions, only a low volume flow of the medium is made possible, which does not result in complete pressure equalization with respect to the ambient pressure at the housing opening.

A chamber volume of the pressure chamber can be approximately 0.2 l at the most. Alternatively, the chamber volume of the pressure chamber can be 0.15 l at the most, alternatively 0.1 l at the most.

By sealing off the pressure chamber from the surrounding area and enclosing a small volume of air, the spring force on the linear motor increases. The spring force on the linear motor of the drive device also increases by means of the air volumes enclosed in the compact housing on the rear side of the membrane. The closed or at least largely closed volume of the housing on the rear side of the drive unit can be approximately 2 l at the most, alternatively 1 l at the most and further alternatively 0.5 l at the most.

The linear motor of the drive device is designed to generate the mentioned sought-after frequencies and pressure differentials despite the increased braking spring force by the two low volumes on the front side (pressure chamber) and rear side (housing) of the membrane.

A closed or at least largely closed volume region on the rear side of the drive device (drive unit) in the housing of the device for stimulating purposes can be approximately 2 l at the most. For this embodiment or others, a volume ratio between the volume of the pressure chamber and the (rear) volume region on the rear side of the drive unit in the housing can be approximately 1.5 at the most. Alternatively, this volume ratio can be approximately 1 at the most, and preferably approximately 0.5 at the most. This volume ration can be at least approximately 0.001. In a possible design, the information regarding the volume ratio can relate to the air-filled region in the housing, which is not occupied by other structural parts or components in the housing.

The housing opening may have a diameter of at least approximately 5 mm and at most approximately 50 mm. Alternatively, the diameter may be at least approximately 7 mm. It may be provided that the diameter is approximately 40 mm at the most. Diameter may also refer to other cross-sectional measurements of non-circular openings. In particular, the mentioned values apply both to a circular opening as well as to an oval or elliptical opening, for example. Corresponding values are then assumed for the large semi-axis of the ellipsis. The same applies correspondingly for openings of any other shapes, for example other round or angular shapes, wherein generally the size of an opening is preferably selected particularly in such a manner that the surface area of the opening corresponds to the surface of a circular opening in the range of the aforementioned dimensions.

Given a sealed pressure chamber, the drive device may be set up to generate a low-frequency pneumatic variable pressure field having an alternating frequency of approximately 0.5 Hz to approximately 150 Hz, alternatively having an alternating frequency of 1 Hz to approximately 125 Hz, or approximately 3 Hz to approximately 100 Hz. Within the meaning of the present disclosure, a variable pressure field refers to a varying pressure field, which in regard to the ambient pressure has both negative pressures as well as positive pressures, for example alternating negative pressure phases and positive pressure phases, or in another specified pattern of possibly identical or varying negative and positive pressures. This variable pressure field prevails in the pressure chamber, particularly in the region of the housing opening of the pressure chamber, i.e., parameters, such as the frequency and amplitude of the variable pressure field, are to be measured at the opening. Therefore, the term pressure field or variable pressure field refers to such a variable pressure field.

Given a sealed pressure chamber, the drive device may be designed to generate a pneumatic variable pressure field having a pressure differential between a minimum negative pressure and a maximum positive pressure of approximately 20 mbar to approximately 600 mbar, alternatively from approximately 30 mbar to approximately 400 mbar, from approximately 40 mbar to approximately 300 mbar. The pressure differential may be designed to be essentially symmetrical about an ambient pressure.

The pressure chamber may be designed to increase the chamber volume, changing from a neutral position of the movable chamber wall portion, by a volume change of approximately 1% to approximately 25%, and to decrease a volume change from approximately 1% to approximately 25%. Alternatively, the volume change may range from approximately 1.1% to approximately 15%, or from approximately 1.5% to approximately 11.5%. For this embodiment or others, in the neutral position the mount or bracket, which acts as a positioning or centering device for the support having the (moving) coil, is in a (neutral) starting or rest position, in which no deflection has occurred.

The movable chamber wall portion may have a diameter of at least approximately 5 mm and no more than approximately 60 mm. Alternatively, the diameter may be at least approximately 7 mm. The diameter may be less than or equal to 60 mm, alternatively less than or equal to 50 mm.

The battery device may be set up to provide a drive energy of alternating polarity for the coil device so that the coil device has electric current of alternating polarity passing through it to move the movable chamber wall portion about the neutral position.

Coil elements of the coil device can be arranged to encircle permanent magnets of the assigned stationary permanent magnetic field.

A regional diameter of a region, having the permanent magnets, encircled by the coil elements of the coil device may correspond at least to a diameter of the movable chamber wall portion.

The regional diameter and a diameter of the movable chamber wall portion are at a ratio of at least 0.3, alternatively at a ratio of at least 0.5 or 0.7. In other embodiments, the ratio of the regional diameter (diameter of the coil device) to the diameter of the movable chamber wall portion is at most 2, alternatively at most 1.8 or 1.5.

The movable chamber wall portion may have a flexibly deformable membrane. In this embodiment or others, the membrane may be formed of a plastics material.

The flexibly deformable membrane may have an elastic membrane portion, which, during the repeated movement of the movable chamber wall portion, is extended between the different wall positions and contracts again. Membrane portions may hereby be elastically extended and compressed. These elastic membrane portions may consist of a plastics or a rubber material for example.

The movable chamber wall portion may be formed entirely by the flexibly deformable membrane.

The movable chamber wall portion may have a rigid wall portion, which is repeatedly movable between different assigned wall positions in response to the coupled drive movement. The rigid wall portion is movable relative to the adjoining wall portions of the chamber wall. A combination of a rigid wall portion and one or more membrane portions may be provided. To enable movement of the rigid wall portion, the latter is movably integrated in the chamber wall, for example by the rigid wall portion coupling to an adjoining wall portion by means of a recessed channel or a spring element. Such a placement may be provided in general for the movable chamber wall portion.

First coil elements of the coil device may be arranged on the movable chamber wall portion. The first coil element may be arranged on the flexibly deformable membrane and/or rigid wall portion. The first coil element may be formed partially or entirely thereon. During operation, the first coil element then moves with the movable chamber wall portion.

The first coil elements may be inserted at least in portions into a membrane material of the flexibly deformable membrane. For example, the first coil element of the coil device may be molded into the membrane material. Alternatively or additionally, the first coil element may be incorporated in the membrane material between layers of said membrane material by means of a lamination process.

The movable chamber wall portion may have a wall portion having a wave shape. The wave shape of the wall portion may be elastically deformable when the movable chamber wall portion is moved during operation. The wave shape may correspond to a sine wave or a zig-zag wave for example.

At least some of the coil elements may be arranged in the region of the wave troughs and/or wave peaks of the wave shape.

Second coil elements of the coil device may be arranged on a coupling component which is coupled to the movable chamber wall portion. The second coil elements may be provided supplementally or alternatively to the first coil elements. The second coil elements may be arranged exclusively and completely on the coupling components, for example as a wire winding on a component body. For example, a moving coil construction may hereby be provided. A coil winding may be arranged on a rod-shaped component body, which, during operation, when electrical current is applied to the coil device, is immersed into the stationary permanent magnetic field and moved out of it again repeatedly in order to generate the drive movement. The drive movement provided hereby with the coupling component may be transmitted directly or conveyed via additional coupling components to the movable chamber wall portion.

The chamber wall may have an additional movable chamber wall portion which forms a portion of the chamber wall and is movable between different wall or movement positions. The additional movable chamber wall portion is formed separately from the movable chamber wall portion in the region of the chamber wall. For example, it may be arranged opposite the movable chamber wall portion. The additional movable chamber wall portion is movable or displaceable relative to the adjoining wall portions of the chamber wall. The additional movable chamber wall portion may not be coupled to the drive movement; it may be designed as a freely vibrating wall portion and thus as a sound absorption component. The coupling or integration of the additional movable chamber wall portion in the chamber wall may be designed in a comparable manner to or differently from the connection of the movable chamber wall portion; in contrast to the movable chamber wall portion, there is no coupling to the drive device. Mutual pairs of a movable and an additional movable chamber wall portion may be provided, for example such that the assigned chamber wall portions are arranged opposite each other. During operation, the additional movable chamber wall portion is optionally made to vibrate when the movable wall portion is repeatedly moved due to the drive movement.

The coil device may be at least partially arranged in an installation space between mutually opposite permanent magnets. At least in one of the operating positions, in which the coil device is moved toward the permanent magnets, the coil device may be arranged in the installation space between the mutually opposite permanent magnets. As an alternative to the design of an installation space between mutually opposite permanent magnets, it may be provided that the coil device is arranged only on one side opposite the permanent magnet or permanent magnets.

One or more permanent magnets, by means of which the assigned stationary permanent magnetic field is provided, may be arranged on the chamber wall. The permanent magnet(s) may be designed to form a chamber wall portion.

The pressure chamber may be formed having multiple pressure subchambers that are fluidly interconnected. The housing opening for the variable pressure field to act on the clitoris for contactless stimulation may be arranged in a distal or end-side pressure subchamber, whereas the movable chamber wall portion, which is repeatedly moved during operation in order to generate the variable pressure field, is arranged in the region of a proximal or front-side pressure subchamber. A passage for the fluid connection is formed between adjoining pressure subchambers, which passage may have a narrowed cross-section in contrast to the fluidly interconnected pressure subchambers.

During operation, it may be possible to operate separately formed coil elements of the coil device with different electric currents. If separately formed coil elements have different electric currents flowing through them, this makes it possible to design the repeated movement of the respective coil elements during operation so as to be individual, for example in regard to deflection amplitude and/or a deflection frequency, so that variable pressure fields of different types can be generated. For example, the variable pressure field can initially be generated substantially using one of the coil elements, in order to then model this pressure field using a movable chamber wall portion which is connected to another repeatedly movable coil element when operating.

The coil device may have an upper and a lower partial coil, which are arranged on the carrier of the coil winding in a superimposed manner. The upper and lower partial coil may have electrical contacts that are separate from each other. During operation, different electric currents may be optionally applied to them. The different electric currents may hereby differ in regard to one or more current parameters, for example amplitude, polarity and/or amplitude trend over time. The upper and lower partial coil are formed separately from the movable chamber portion on the carrier.

The upper and lower partial coil may be arranged, at least in the neutral rest position, about which there is then movement or vibration during operation, opposite permanent magnets or pole plates, although an embodiment may also be provided in which one of the partial coils is opposite permanent magnets, whereas the other partial coil is arranged opposite the pole plate.

In the various embodiments, the permanent magnets may be arranged on the inside or outside in relation to the coil windings. An arrangement of the permanent magnets below the coil winding(s) is also possible.

It may be the case that before operation, in which the movable chamber wall portion is moved forward and back (or up and down) in relation to the starting position, the coil winding(s) arranged on the carrier are moved (deflected) out of a neutral rest position to then be moved or displaced about this relocated position during operation. During operation, a current with a non-alternating polarity can be applied to the coil, which simplifies the electrical power supply. Such a preliminary movement or deflection may occur against a pretensioning device, which provides a pretensioning force against the deflection, for example a spring mechanism. During operation, the pretensioning device providing the pretension may have an assisting effect on moving the coil device and thus the movable chamber wall portion.

According to another aspect, a method for generating a variable pressure field is created that has the following steps: providing a stimulation device having a housing to which are formed a grip portion and a stimulation portion; the repeated providing of a drive movement by means of a drive device that is arranged in the housing; providing a variable pressure field in a pressure chamber that is arranged in the housing and is enclosed at least sectionally by a chamber wall; moving a movable chamber wall portion that forms a portion of the chamber wall and is coupled to the drive device in such a manner that the movable chamber wall portion is moved repeatedly between various wall positions as a response to the drive movement coupled to said chamber wall portion, by means of which a chamber volume of the pressure chamber is repeatedly increased and decreased to generate the variable pressure; action of the variable pressure field in the form of negative and positive pressures on the clitoris by means of a housing opening that is arranged in the stimulation section and is fluidically connected to the pressure chamber in such a manner that the variable pressure field generated by means of the pressure chamber can be emitted via the housing opening in the form of negative and positive pressures; and providing a drive energy for the drive device by means of a battery device, wherein in regard to the drive device, a coil device, which has an electric current flowing through it when operating, moves in an assigned stationary permanent magnetic field and couples to the movable chamber wall portion for transmitting the drive movement.

According to another aspect, a device is produced for stimulating a human erogenous zone, particularly the clitoris, using a variable pressure field. The device has the following: a housing to which are formed a grip portion and a stimulation portion; a drive device, which is arranged in the housing and is designed to repeatedly provide a drive movement; a pressure chamber that is arranged for providing a variable pressure field in the housing and is at least sectionally surrounded by a chamber wall; a movable chamber wall portion, which forms a portion of the chamber wall and couples to the drive device in such a manner that the movable chamber wall portion can be repeatedly moved between various wall positions in response to the drive movement coupled to said chamber wall portion, by means of which a chamber volume of the pressure chamber for generating the variable pressure field is repeatedly increased and decreased; a housing opening that is arranged in the stimulation portion and is fluidically connected to the pressure chamber in such a manner that the variable pressure field generated by means of the pressure chamber can be emitted via the housing opening in the form of positive and negative pressure, particularly for acting on the clitoris; and a battery device that is designed for providing drive energy for a drive device, wherein in regard to the drive device, a coil device, which has electrical current passing through when in operation, is movably arranged in an allocated stationary permanent magnetic field and couples to the movable chamber wall portion for transmitting the drive movement. A chamber volume of the pressure chamber is hereby approximately 0.2 l at the most.

In connection with the method for generating a variable pressure field by means of the stimulation device, the previously discussed embodiments may be provided correspondingly.

During operation, an electric current is applied to the coil device, the frequency and/or amplitude of which current are adjusted by a control device.

BRIEF DESCRIPTION OF THE FIGURES

Additional embodiments are described in greater detail below with reference to figures of a drawing. In the figures.

DETAILED DESCRIPTION

Figure 1A:
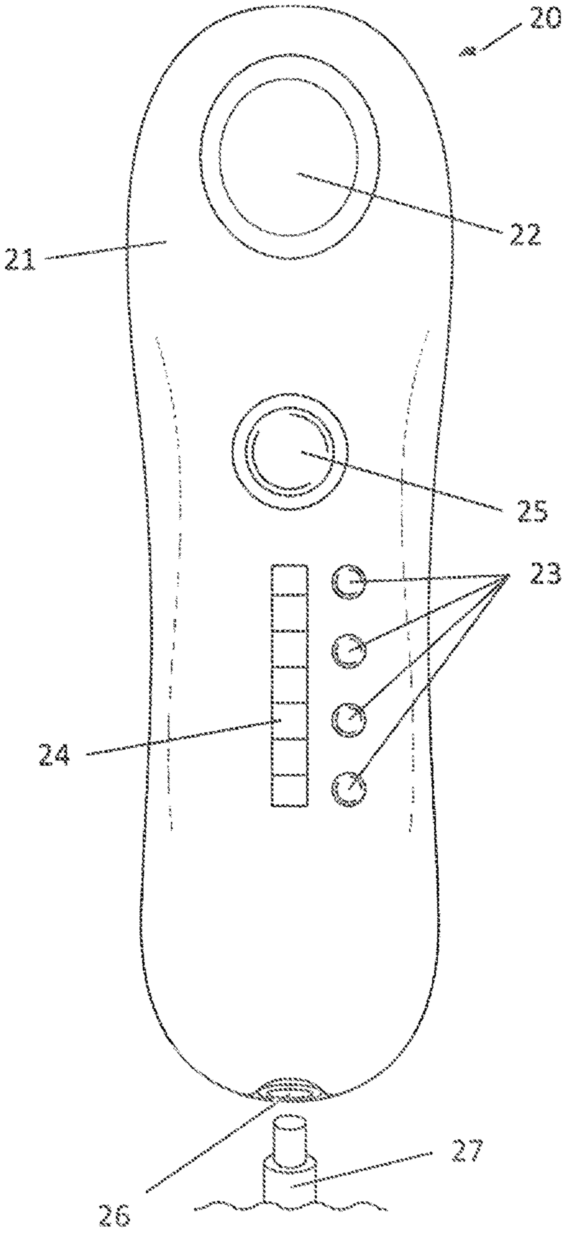
FIG. 1*a* is a schematic representation of a device for stimulating an erogenous zone using a variable pressure field in a front view.
Figure 1B:
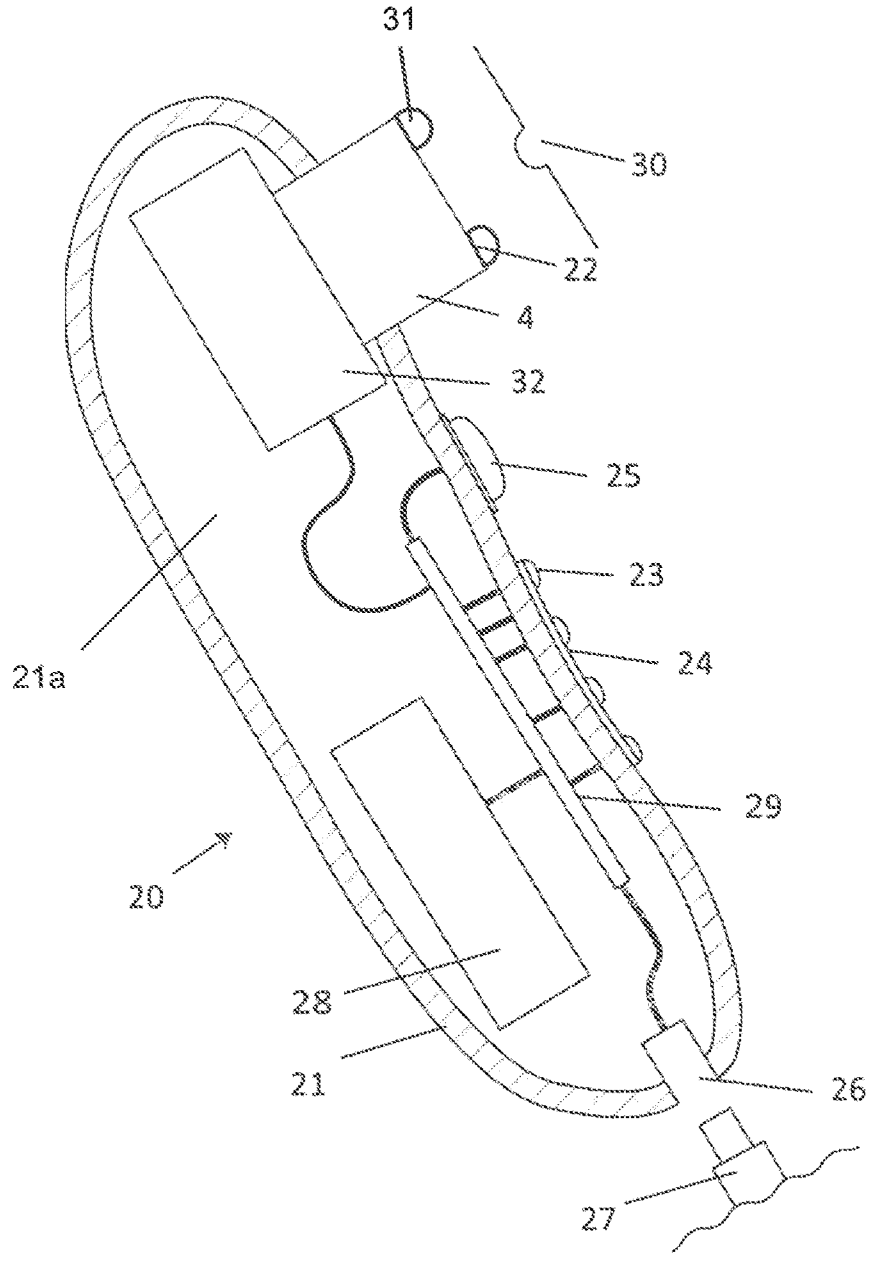
FIG. 1*b* is a cross-sectional view of the device for stimulating an erogenous zone from FIG. 1*a;*

FIG. 1*a* is a schematic representation of a device for stimulating (stimulation device) an erogenous zone using a variable pressure field in a front view; FIG. 1*b* shows the stimulation device in a cross-sectional view.

The stimulation device 20 is a, for example portable, electrical or small device, which has a housing 21, a housing opening 22 for placing onto the clitoris 30 for example, operating elements 23, a display 24, an on-off switch 25, an optional socket 26 and a battery device 28, for example having a rechargeable battery.

A sealing device 31 is provided, which in the depicted embodiment is formed with a sealing bead. While in operation, the sealing device 31 seals off the pressure chamber 4 from the surrounding area or nearly seals it off in such a manner that a variable pressure field can be generated in the pressure chamber 4.

The housing 21 may be ergonomically designed in such a manner that it can comfortably be held with one hand and has no sharp or pointed edges. Furthermore, the housing 21 may consist of plastics material, for example polycarbonate (PC) or acrylonitrile butadiene styrene (ABS). In addition, the handle regions or the entire housing 21 may be supplemented or provided with a haptically advantageous silicone, for example in the form of a silicone coating. The housing 21 may be designed to be at least water-repelling or water spray-repelling, for example with protection rating IP 24. Furthermore, the stimulation device 20 may be designed to be waterproof against immersion under water.

The operating element 23 or the operating elements 23 are used to adjust the operating mode of the device, i.e., adjusting the modulation of the variable pressure field. For example, the operating elements 23 may comprise at least one push button as well as at least one rotary switch, or at least one touch-sensitive switch. Furthermore, the operating elements 23 may emit visual feedback regarding actuation, for example by means of integrated light-emitting diodes (LEDs).

An optional display 24 is used to inform the user about the device status and/or the setting status. For example, the display 24 may be designed using one single light-emitting diode, a plurality of light-emitting diodes or as an LCD display. The displayed information may be for example the switched-on state of the device, the charge state of the battery device 28 or the current setting of the modulation of the pressure field.

The on-off switch 25 is used to activate and deactivate the stimulation device 20. This on-off switch 25 may be for example a push button, which turns the stimulation device 20 on or off when pressed for longer, or a latching slide switch.

A socket 26 is used for the external power supply to the stimulation device 20 via an external plug 27, which for example is connected to an external power adapter. To ensure water spray resistance of the stimulation device 20, instead of the socket 26 a magnetic-inductive transformer may be provided, which allows power transmission into the stimulation device 20 without an electrically conductive contact. The stimulation device 20 also has a battery device 28, having for example a rechargeable battery, for example a nickel metal hydride (NiMH) rechargeable battery, or a lithium rechargeable battery, for wireless operation. Alternatively or additionally, a (longer) power supply cable may lead out of the stimulation device. Likewise, alternatively or additionally, the magnetic contacts may be provided as a power supply terminal.

The schematic cross-section in FIG. 1*b* shows the housing opening 22 for placing on the clitoris 30, a pressure chamber 4, as well as the drive device 32 of the stimulation device 20.

A control device 29 controls the drive device 32, the operating elements 23 and the display 24. The control device 29 and the drive device 32 are supplied with power from the internal battery device 28 and/or the external power supply 27. The control device 29, which for example has a microcontroller or is hardwired, first controls the power supply of all loads of the stimulation device 20, and optionally a charging and discharging process of the battery device 28 and/or battery management. In particular, the control device 29 controls the drive unit 32, for example the modulation of the pressure field and so on. Furthermore, the control device 29 may have a memory, in which at least one modulation or stimulation pattern is stored. The excitation of the drive device 32 can now be controlled as chosen by the user of the stimulation device 20 according to this prestored stimulation pattern via the operating elements 23. The stimulation patterns of the pressure field may optionally also be individually generated and stored by the user via the operating elements.

A volume ratio between the volume of the pressure chamber 4 and a (rear-side or remaining) volume region 21 on the rear side of the drive unit 32 in the housing is for example no more than approximately 1.5 in the various embodiments.

For the closed or at least largely closed volume region 21*a* of the housing 21 on the rear side of the drive unit 32, there may be a volume of no more than approximately 2 l, alternatively no more than 1 l and further alternatively no more than approximately 0.5 l.

Embodiments for an arrangement for a stimulation device or arrangements for the drive unit 32 and the pressure chamber 4 are described below with reference to FIGS. 2 to 17, in each of which arrangements coil elements of an electromagnetic linear drive are moveably or movably arranged in a stationary permanent magnetic field.

Figure 2:
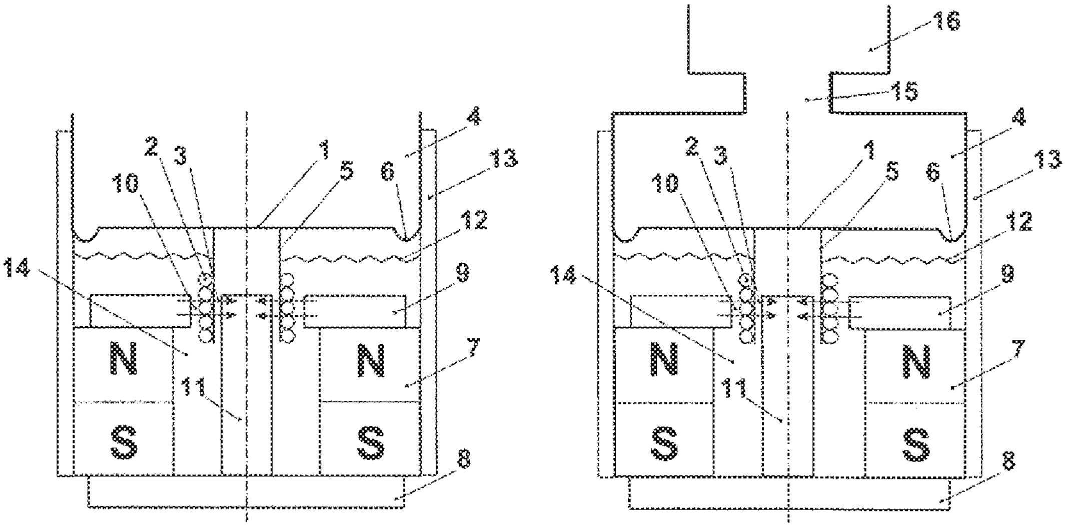
FIG. 2 is a schematic representation of arrangements for a stimulation device having a pressure chamber, which is formed having one or two pressure subchambers.

In the arrangements depicted in FIG. 2, a movable wall portion 1 connected to a carrier 5 is moved back and forth by at least one moving or plunger coil 2, attached to said carrier, corresponding to a coil power supply input by means of the control current in a magnetic field 3 provided by permanent magnets, in order to thereby move the wall portion 1 back and forth during operation in order to thereby generate a variable pressure field.

The movable wall portion 1 (for example made of a polymer or paper) as part of a pressure chamber 4 of the stimulation device is attached to the carrier 5 (for example made of aluminum, Kapton, or an aluminum-Kapton laminate). The movable wall portion 1 may be integrated into the chamber by means of a recessed channel 6, which mechanically follows the strokes of the movable wall portion 1 to the greatest extent possible without any mechanical strain. Wrapped around the carrier 5 are coil elements of a moving coil 2, which during operation are supplied with power by the control current from a control unit. The moving coil 2 consists of electrical conductors made of a material having the greatest electrical conductivity possible (for example copper or silver), which are insulated from each other and the carrier 5 by means of an electrically insulating lacquer. The magnetic field is provided by at least one permanent magnet 7, which may have a ring shape. The magnetic flux is carried by means of pole plates 9, which have a rear pole plate 8 (for example, as in FIG. 2, having a cylindrical shape) and an upper pole plate 9*a* (for example, as in FIG. 2, having a ring shape) across a, for example, ring-shaped air gap 10 to the cylindrical pole core 11. Just like the pole core 11, the rear pole plate 8 and upper pole plate 9 are made of a magnetic, highly permeable material (for example a soft magnetic material alloy).

For the inductance of the structurally narrowest air gap possible between the upper pole plate 9*a* and the pole core 11, the permanent magnet 7 requires as high a flux density as possible, which is why the strongest possible permanent magnets having flux densities of approximately 0.4 to approximately 1.2 T (for example, neodymium-iron-boron magnets) are used, which generate strong magnetic fields and have a low weight.

The carrier 5 with the moving coil 2 is, if applicable, structurally centered and guided in the air gap 10 by means of at least one bracket or mount 12 (for example, made of plastics material, textile fabric or paper) to prevent wobbling motions of the moving coil 2. The bracket or mount 12 is attached to a frame 13 (for example, made of plastics material, aluminum or magnesium). Alternatively, the wobble motion of the moving coil 2 can also be prevented by a guide on the pole core or the permanent magnet.

To move the movable wall portion 1, the moving coil 2 is supplied with power by a control alternating current from a control unit. Depending on the current direction or current polarity in the magnetic field of the air gap 10, the moving coil 2 is moved upward or downward by the Lorentz force. The directions of the Lorentz force, the magnetic field and the current flow are perpendicular to each other in FIG. 2. The stroke of the deflection of the moving coil 2 is determined by the amplitude of the control current. The frequency of the alternating current corresponds to the frequency of the moving coil motion and thus the frequency of the movement of the movable wall portion 1. The frequency and the stroke of the moving coil and thus the movement of the movable wall portion 1 may be controlled independently of each other in a comparatively simple manner by the current frequency and the current amplitude. The changing pressure field and the resulting variable positive and negative pressure at the erogenous body zone (clitoris) can be controlled independently of each other by the alternating compression and expansion of air from the motion of the movable wall portion 1 (or of multiple movable wall portions when operating), in other words in terms of frequency and amplitude.

Based on the direct transmission, an expanded frequency range from less than 1 Hz to several hundred Hz is easily possible using this principle. The direct current from the rechargeable battery must only be converted into alternating current. Conversion into an alternating current may comprise the turning on and off and/or the superimposition of direct current portions. An alternating current voltage can hereby be provided using a direct current offset. For example, an alternating current voltage may be provided which does not comprise any polarity change, but only a change of the voltage level given a constant voltage direction (polarity).

According to the image on the right in FIG. 2, the arrangement may have a pressure chamber with multiple pressure subchambers, with an additional pressure chamber 16 provided next to pressure chamber 4, so that connected pressure subchambers are provided that are connected via a connection channel 15. The housing opening for enabling the variable pressure to act on the erogenous zone is provided on the additional pressure chamber 16. The pressure chamber 4 and the additional pressure chamber 16 are also provided in the embodiment in FIG. 3.

Generating the variable pressure field by moving the movable wall portion 1 (and thus the positive and negative pressure) is accompanied by sounds being generated, i.e., local pressure fluctuations in the air, which can be heard by the human ear and propagate at the speed of sound. By means of suitable absolute dimensioning of the chamber volume of the pressure chamber 4 and the (remaining) volume 21*a* of the housing 21 as well as the ratio of these volumes taking into consideration the matching of the linear drive as well as the configuration of the coil elements and membrane of the movable wall portion 1 to achieve a high base resonance frequency while in operation, the generation of airborne sound is largely suppressed. Furthermore, the sounds inherent with the movement of the movable wall portion may be absorbed, i.e., the sound energy can be converted into heat.

Figure 3:
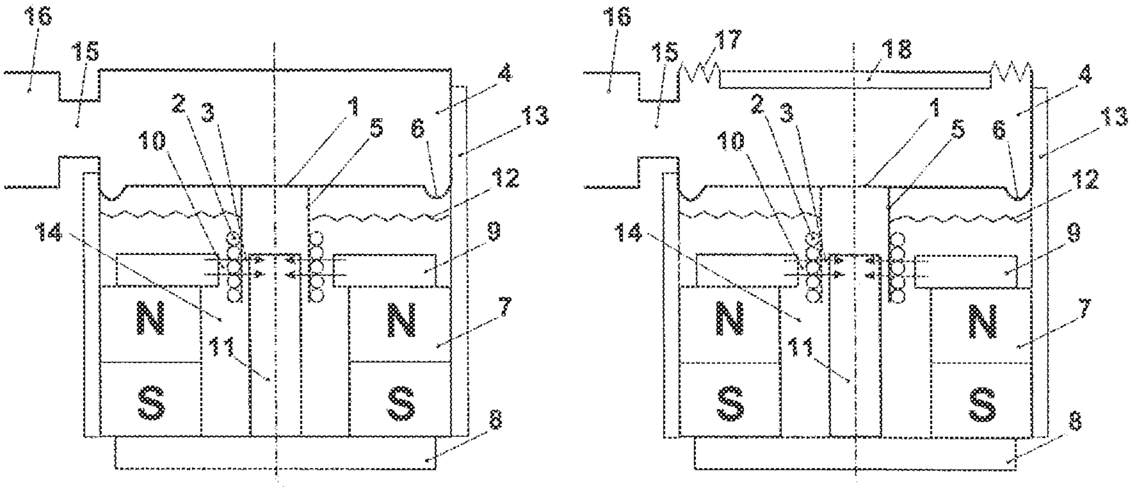
FIG. 3 is a schematic representation of arrangements for a stimulation device having two pressure subchambers each.

In FIG. 3 (right-hand side), the sounds are dissipated in the air as heat according to the absorption principle of a plate transducer by the friction in at least one of the chamber walls 18, which is formed with another movable wall portion, as well as by the friction of the vibrating chamber wall. The chamber wall 18 vibrating for sound absorption purposes is also integrated into the chamber by a spring device 17 acting in a spring-like manner. Acoustic energy is ultimately transformed into heat and dissipated by the deformation of the spring and the thus generated friction in the spring device 17. The plate transducer is a narrow-band resonance absorber, the weight and spring deflection of which are to be selected such that the characteristic absorber frequency for a preferably high level of sound absorption as a function of the sound frequency is preferably near or in the frequency range of the movement of the movable wall portion 1. In addition, the sounds created by the piston or membrane movement are to be dissipated as heat into a porous structure according to the absorption principle.

The chamber walls 18 may be formed having a porous structure and may be integrated in the plate transducer for example or alternatively mounted on the plate transducer. The sounds are absorbed by means of the viscous current losses of the air through friction on the porous damping material and the friction from the deformation of the material. The porous absorber is a broad-band absorber, the coating thickness and material of which are to be selected such that the characteristic absorber frequency for the highest possible level of absorption is near or in the frequency range of the movement of the movable wall portion 1. By means of the absorption according to the plate transducer principle or in a porous structure, sound propagation is reduced as much as possible.

The drive unit is formed with few movable, low-weight components and therefore has few unbalanced free inertial forces to initiate oscillations or vibrations of the components or the housing of the stimulation device at certain movable wall portions. By means of the low weight, a highest possible fundamental resonance of the movable part of the drive device 32 is achieved. In addition, as shown in FIG. 3, the other movable wall portion of the chamber wall 18 can be designed optionally to have a ferrofluid 14 for damping the resonances of the moving coil 2 and a frame 13 or an enclosed chamber (not completely filled), as a result of which the cooling of the moving coil 2 and the carrier 5 is also improved by the increased heat conduction compared to air. The heat capacity of the intentionally lightweight-built moving coil 2 and carrier 5 is low.

The flexibility in the design of the drive allows a large amount of freedom in designing the stimulation device to shape the drive in an elongated or wide manner, the shifting of the fundamental resonance of the movable portions of the linear drive for suppressing the airborne sound, and to also decrease the local pressure fluctuations propagating at the speed of sound by means of sound absorption measures in the chamber (cf. FIG. 3). Furthermore, measures similar to noise absorption can also be used in the volume of the housing 21 on the rear side of the movable pressure chamber wall portion 1.

The drive unit or device has a comparatively low complexity due to the direct conversion of the electrical energy from the battery unit 28, for example from the rechargeable battery, into a translational movement of a simple moving coil coupled to the movable wall portion 1, which may be formed in the various embodiments—regardless of the actual drive—for example having a piston, a rigid wall portion and/or a membrane, which may be made of an elastic material at least in portions. The direct conversion also results in potentially higher efficiency, compact construction and low weight.

The movable wall portion(s) 1 may be designed as an integral component of the chamber (pressure chamber—chamber, in which the variable pressure field is generated), as a result of which a good seal is ensured against compressible and non-compressible media up to a certain positive and negative pressure of the chamber.

Figure 4:
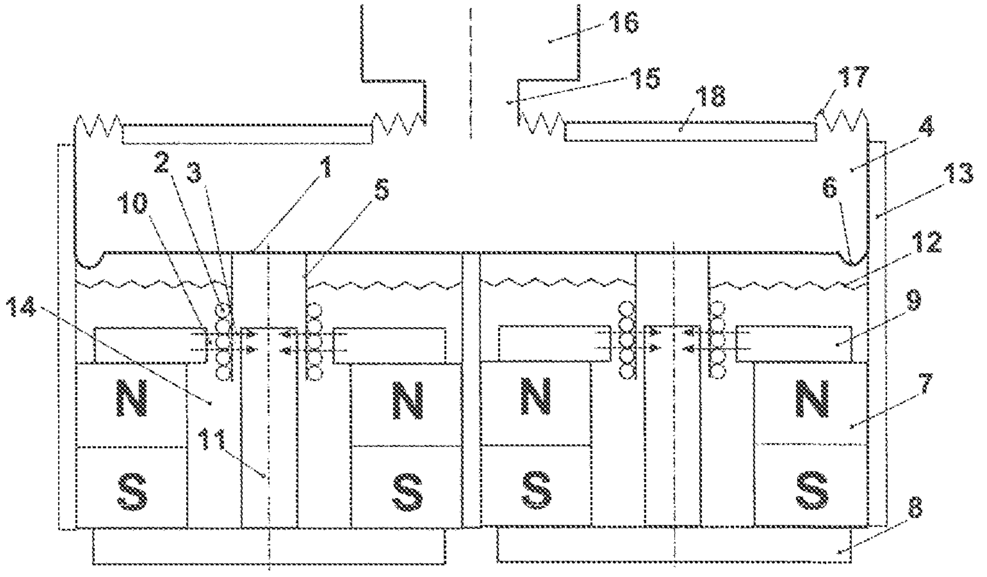
FIG. 4 is a schematic representation of an arrangement for a stimulation device, in which a double drive is provided.

To keep constant or increase the surface-specific force resulting from the carrier 5 on the movable wall portion 1 while simultaneously having a wide or flat design of the drive (i.e., with a compact moving coil 2 and the carrier 5), the movable wall portion 1 can be moved by means of more than one coil 2 and more than one carrier 5, as depicted in FIG. 4.

Figure 5:
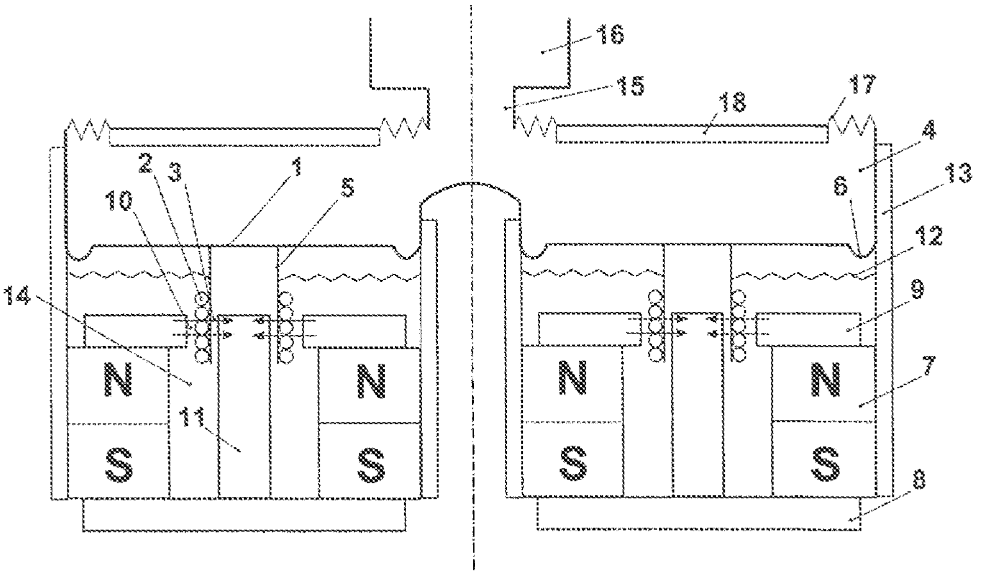
FIG. 5 is a schematic representation of an arrangement for a stimulation device, in which two actively movable chamber wall portions are provided in the region of the pressure chamber.

The flexibility of the drive at a constant or increased specific surface force on the movable wall portion 1 is also increased in the embodiment from FIG. 5. For absorption purposes, devices according to the plate transducer principle 17 or in the form of porous structures 18 are also provided here.

The sounds emitted on the rear side of the movable wall portion 1 are absorbed in all embodiments for example by a device according to the plate transducer principle or in a porous structure, and thereby reduced to the largest extent possible (not depicted).

Figure 6:
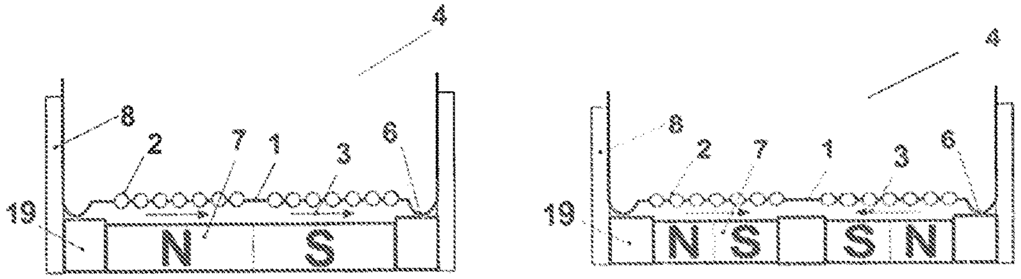
FIG. 6 is a schematic representation of arrangements for a stimulation device, in which coil elements are integrated in a movable chamber wall portion.

In the arrangement depicted in FIG. 6, fine conductors of the coil 2, through which conductors current flows, are located directly on at least one movable wall portion 1.

On at least one side of the movable wall portion 1, there is at least one permanent magnet 7, for example in the form of a bar magnet as shown in FIG. 6. For the inductance of the air gap 4 to be kept as structurally narrow as possible between the permanent magnet 7 and the movable wall portion 1 having the electrical conductors 2, the permanent magnet 7 requires the highest possible flux density, which is why the strongest possible permanent magnets with flux densities of 0.4 . . . 1.2 T (for example neodymium-iron-boron magnets) are used, which generate a strong magnetic field 3 and have a low weight. The movable wall portion 1 (for example made of a polymer or paper) as part of a first chamber of the stimulation device 20 may be integrated into the chamber by means of a recessed channel, which mechanically follows the strokes of the movable wall portion 1 to the largest extent without mechanical loads. The electrical conductors 2 on the movable wall portion 1 are made of the most electrically conductive material possible (for example copper or silver) and electrically insulated from each other by integration into the movable wall portion 1. The magnetic flux is carried by means of lateral pole plates 19 (for example, as in FIG. 6, in a rod shape) across the air gap 4. The lateral pole plates 19 are made of a material having high magnetic permeability (for example, a soft magnetic material alloy). The chamber of the stimulation device 20, the permanent magnet 7 as well as the lateral pole plates 19 are attached to a frame 8 (for example made of plastics material, aluminum or magnesium).

To move the movable wall portion 1, the thin electrical conductors 2 are supplied with a control alternating current from a control unit. The electrical conductors 2 are moved upward or downward by the Lorentz force depending on the current direction or current polarity in the magnetic field of the air gap 4. The drive forces engage uniformly with the entire surface of the movable wall portion 1. The directions of the Lorentz forces, the magnetic field and the current flow are perpendicular to each other in FIG. 6. In the variant with two permanent magnets arranged in an antipolar manner in FIG. 6 (right-hand side), the electrical conductors must be supplied with power via the two permanent magnets 7 each having a different polarity in order to effect the same movement.

The stroke of the deflection of the electrical conductors integrated in the movable wall portion 1 is determined by the amplitude of the control current. The frequency of the alternating current corresponds to the frequency of the conductor movement and thus the frequency of the movement of the movable wall portion 1. The frequency and the stroke of the movable wall portion 1 can thus be controlled independently of each other in a comparatively simple manner by the current frequency and current amplitude. The variable pressure field and the resulting positive and negative pressure on the erogenous body zone (clitoris) can be controlled independently of each other by the alternating compression and expansion of the air through the movement of the movable wall portion 1, in other words in terms of frequency and amplitude.

Due to the direct transmission, an expanded frequency range from below 1 Hz to several hundred Hz is possible using this principle. The direct current from the rechargeable battery must only be converted into alternating current. The conversion into an alternating current may comprise the turning on and off and/or the superimposition of direct current portions. An alternating current voltage having a direct current offset can hereby be provided. For example, an alternating current voltage can be provided that does not comprise any polarity change, but only a change of the voltage level given a constant voltage direction (polarity).

Figure 7:
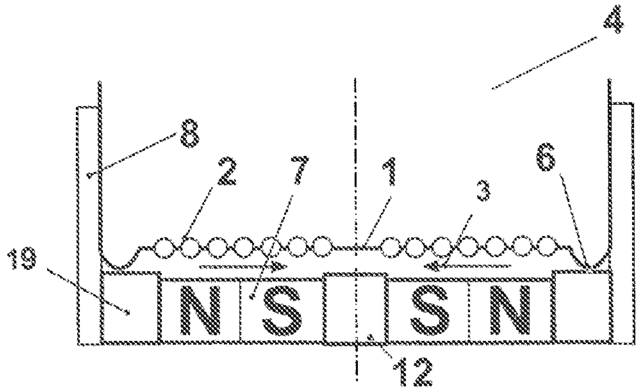
FIG. 7 is a schematic representation of an arrangement for a stimulation device, in which coil elements are also integrated in the movable chamber wall portion.

Alternatively, the drive unit may also be designed in a ring shape as depicted in FIG. 7.

Figure 8:
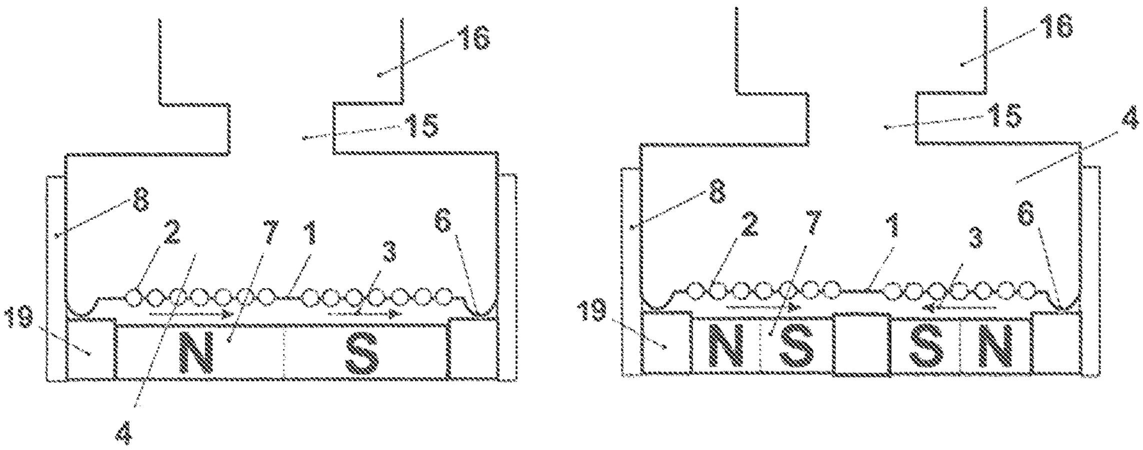
FIG. 8 is a schematic representation of arrangements for a stimulation device having a pressure chamber, which has two pressure subchambers, coil elements being integrated in a movable chamber wall portion.

In the electromagnetically planar ring-shaped transformer, the membrane is circular. The permanent magnet 7, the electrical conductors 2, the lateral pole plate 19 as well as the bracket are ring-shaped, for example. In the symmetrical axis of the drive unit, a pole core 11 is provided to better control the magnetic field. Alternatively, the drive unit may also be connected via a connection channel 10 to a second chamber 11, as depicted in FIG. 8.

Figure 9:
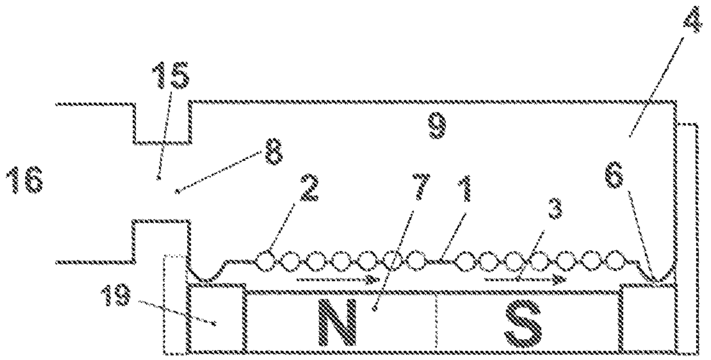
FIG. 9 is a schematic representation of an arrangement for a stimulation device, in which, in contrast to the design in FIG. 9, the pressure subchambers are connected to each other by means of a lateral passage.

Alternatively, also as in FIG. 9, there may be at least one second chamber 11 on the side of the drive unit.

Figure 10:
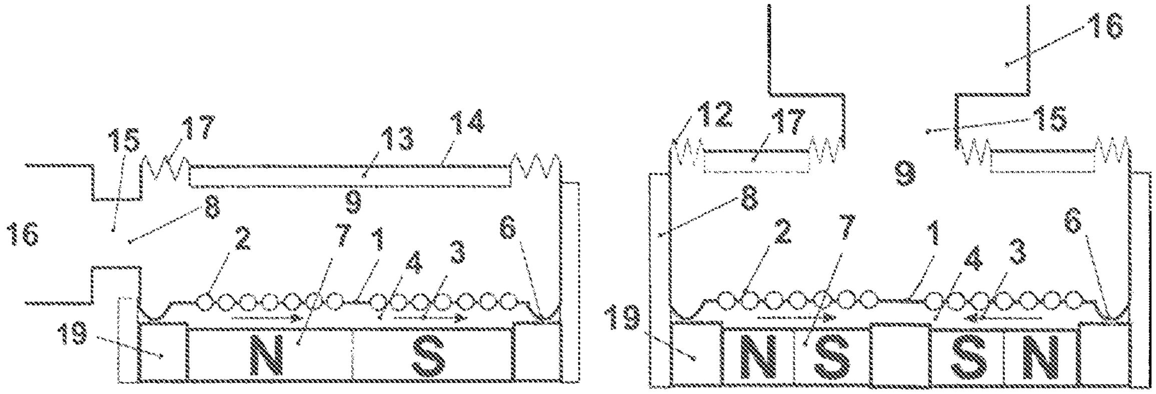
FIG. 10 is a schematic representation of arrangements for a stimulation device, one or two additional movable chamber wall portions being provided.
Figure 11:
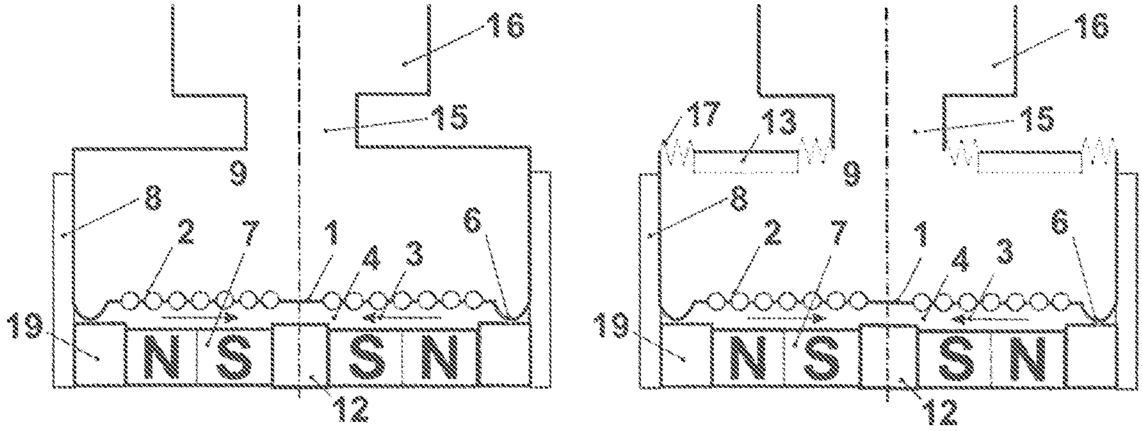
FIG. 11 is a schematic representation of arrangements for a stimulation device, in which the pressure chamber has two interconnected pressure subchambers.

In one embodiment having a second chamber 11 on the side (left) or opposite (right) of the movable wall portion 1, sound-absorbing devices may be provided according to the plate transducer principle or in a porous structure, as in FIG. 10.

By means of the sound-absorbing devices, the sound propagation inherent with the movement of the movable wall portion 1 is reduced to the greatest extent possible.

Alternatively, the two-chamber embodiments from FIG. 9 (right) and FIG. 10 (right) may also be ring-shaped.

Figure 12:
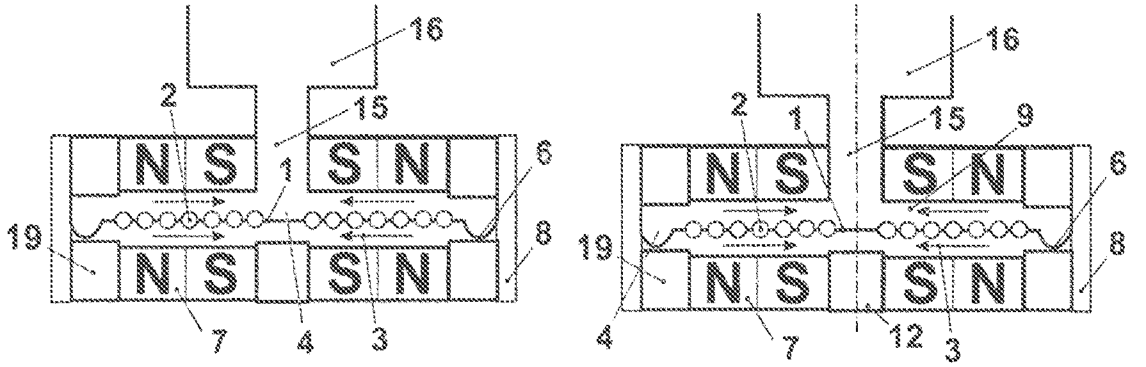
FIG. 12 is a schematic representation of arrangements for a stimulation device, in which a movable chamber wall portion is arranged between permanent magnets.

To generate the highest possible flux density in the air gap 4 to be kept as structurally narrow as possible and to thereby keep constant or increase the surface-specific force on the movable wall portion 1, permanent magnets 7, as depicted in FIG. 12, may alternatively be arranged on both sides of the movable wall portion 1.

The design of the drive with permanent magnets 7 on both sides of the movable wall portion 1 in FIG. 12 may be executed with two permanent magnets arranged in an antipolar manner in each case above and below the movable wall portion 1 (left) or alternatively with two ring-shaped permanent magnets above and below the movable wall portion 1 (right).

The sounds emitted on the rear side of the movable wall portion 1 are absorbed in all embodiments for example by a device according to the plate transducer principle or in a porous structure, and thereby reduced to the largest extent possible (not shown).

Figure 13:
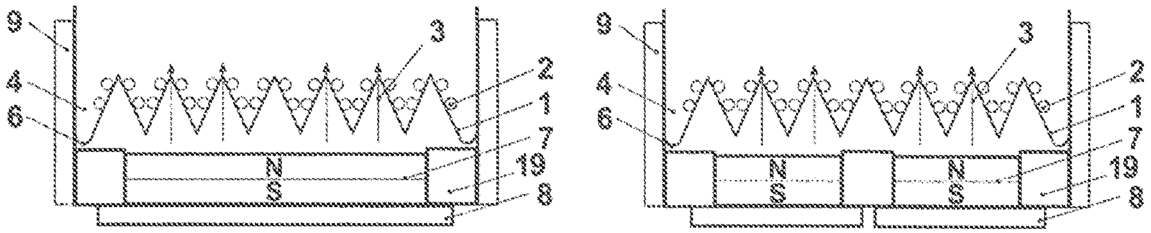
FIG. 13 is a schematic representation of arrangements for a stimulation device, in which a movable chamber wall portion has a wave shape.

In the electromagnetic transformer depicted in FIG. 13, fine conductors, through which current flows, are located directly on the movable wall portion 1, which has at least one thin membrane, which is folded in a lamella shape (lamellar membrane).

On at least one side of the lamellar membrane, there is at least one permanent magnet 7 (left) for example in the form of a bar magnet, as shown in FIG. 13. For the inductance of the air gap 4 to be kept as structurally narrow as possible between the permanent magnet 7 and the lamellar membrane with the electrical conductors 2, the permanent magnet 7 requires the highest possible flux density, which is why the strongest possible permanent magnets with flux densities of 0.4 . . . 1.2 T (for example neodymium-iron-boron magnets) are used, which generate a strong magnetic field 3 and have a low weight. The lamellar membrane (for example made of a polymer, e.g., polyamide, polyester or polyimide) as part of a first chamber of the stimulation device 20 may be integrated in the chamber by means of a recessed channel, which mechanically follows the travel of the movable wall portion 1 largely without mechanical loads. The electrically insulated conductors 2 on the lamellar membrane are made of the most electrically conductive material possible (for example copper or silver) and bonded onto the lamellar membrane for example. The magnetic flux is carried by means of lateral pole plates 19 (for example, as in FIG. 13, in a bar form) across the air gap 4. The lateral pole plates 19 are made of a material having high magnetic permeability (for example a soft magnetic material alloy). The chamber of the stimulation device 10, the permanent magnet 7 and the lateral pole plates 19 are attached in a frame 9 (for example made of plastics material, aluminum or magnesium).

As shown in FIG. 13, the lamellar membrane is overlaid in a meandering manner with parallel-running electrical conductor paths 2. The current flow direction must be identical for all conductor paths since the magnetic field 3 also has the same direction everywhere in the air gap 4 to be kept as structurally narrow as possible. On the lamellar membrane, the electrical conductors 2 are guided in a meandering manner in such a way that the adjoining lamella each have current flowing through them in the opposite direction. To move the lamellar membrane 1, the thin electrical conductors 2 are supplied with energy using a control alternating current from a control unit. Depending on the current flow direction or the polarity, the lamella move based on the Lorentz force toward or away from each other and press the air out of their intermediate space or suck it in. Alternatively, the movement of the lamellar membrane can also be achieved with an alternating current voltage, which does not comprise any polarity change, but only a change of the voltage level while the voltage direction (polarity) remains constant. By the folding into a lamellar shape, a significantly increased membrane surface becomes active. Despite the comparatively large membrane surface, the entire membrane surface is driven uniformly. Alternatively, multiple permanent magnets 7 in FIG. 13 (right) can be arranged under the lamellar membranes.

The stroke of the deflection of the electrical conductors integrated in the lamellar membrane is determined by the amplitude of the control current. The frequency of the alternating current corresponds to the frequency of the conductor movement and thus the frequency of the movement of the lamellar membrane. The frequency and the stroke of the lamellar membrane movement can thus be controlled independently of each other in a comparatively simple manner using the current frequency and current amplitude. The variable pressure field and the resulting positive and negative pressure on the erogenous body zone (clitoris) can be controlled independently of each other by the alternating compression and expansion of the air through the movement of the pulling together and pushing apart of the lamellar membrane, in other words in terms of frequency and amplitude.

Due to the direct transmission, an expanded frequency range from less than 1 Hz to several hundred Hz is possible using this principle. The direct current from the rechargeable battery must only be converted into alternating current. Conversion into an alternating current may comprise the turning on and off and/or the superimposition of direct current portions. An alternating current voltage can hereby be provided using a direct current offset. For example, an alternating current voltage may be provided which does not comprise any polarity change, but only a change of the voltage level given a constant voltage direction (polarity).

Figure 14:
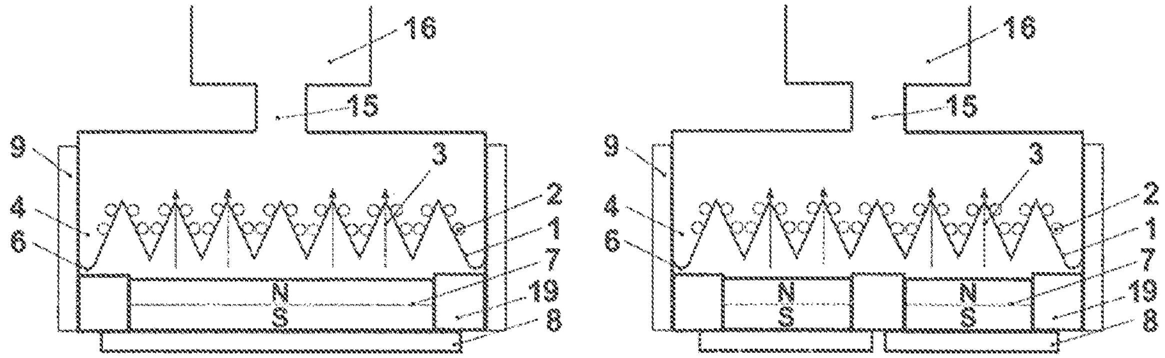
FIG. 14 is a schematic representation of arrangements for a stimulation device, in which the movable chamber wall portion has a wave shape, the pressure chamber being formed having two pressure subchambers.

Alternatively, the drive unit may also be connected via the connection channel 15 to the additional chamber 16, as depicted in FIG. 14.

Figure 15:
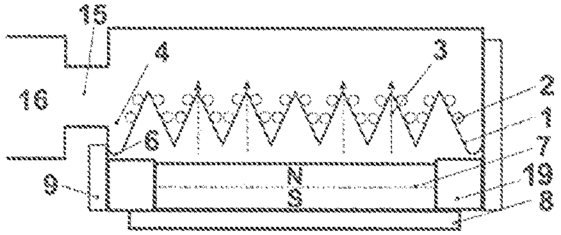
FIG. 15 is a schematic representation of an arrangement for a stimulation device, in which, in contrast to the design in FIG. 15, two pressure subchambers are interconnected via a lateral passage.

Alternatively, as in FIG. 15, there may also be at least one second chamber 16 on the side of the drive unit.

Figure 16:
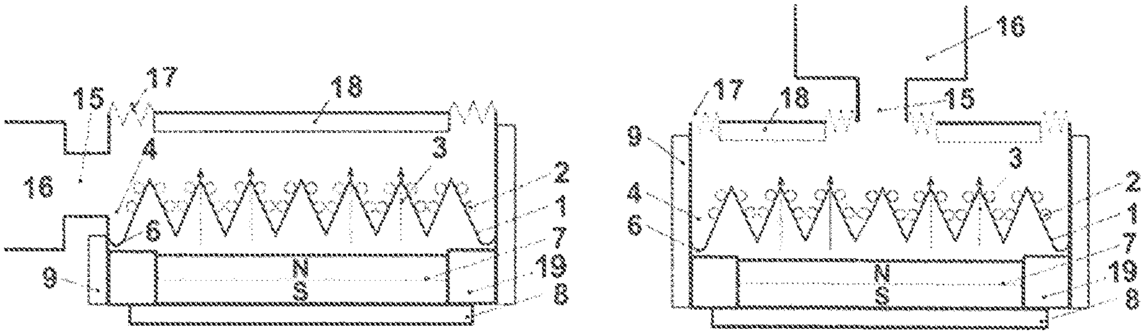
FIG. 16 is a schematic representation of arrangements for a stimulation device, in which the movable chamber wall portion has a wave shape, additional movable chamber wall portions being provided.

In one embodiment having a second chamber 16 on the side (left) or opposite (right) of the movable wall portion 1, sound-absorbing devices may be provided according to the plate transducer principle or in a porous structure, as in FIG. 16.

Figure 17:
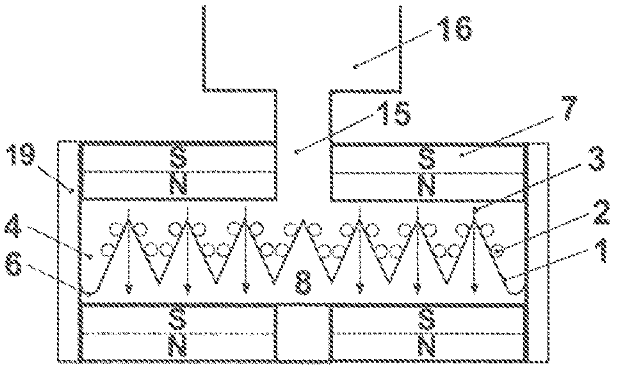
FIG. 17 is a schematic representation of an arrangement for a stimulation device, a movable chamber wall portion having a wave shape being arranged between two permanent magnets.

To generate the highest possible flux density in the air gap 4 to be kept as structurally narrow as possible and to thereby keep constant or increase the surface-specific force on the movable wall portion 1, permanent magnets 7, as depicted in FIG. 17, may alternatively be arranged on both sides of the movable wall portion 1.

In FIG. 17, the movable wall portion 1 is located directly between poles of the permanent magnets 7 and may also be designed having multiple permanent magnets 7 side by side.

The sounds emitted on the rear side of the movable wall portion 1 are absorbed in all embodiments for example by a device according to the plate transducer principle or in a porous structure, and thereby reduced to the largest extent possible (not shown).

FIGS. 18 to 24 depict additional embodiments of an arrangement for a stimulation device or arrangements for the drive unit 32 and the pressure chamber 4. In each case, coil elements of an electromagnetic linear drive are movably or displaceably arranged in a stationary permanent magnetic field. For the same features, the same reference signs are used as in the preceding figures.

Figure 25:
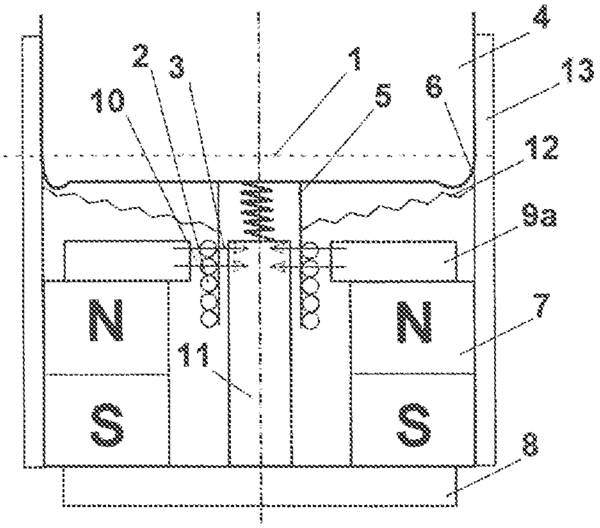
FIG. 25 is a schematic representation of an arrangement for a stimulation device, in which the moving coil is first moved out of a neutral rest or starting position.
Figure 26:
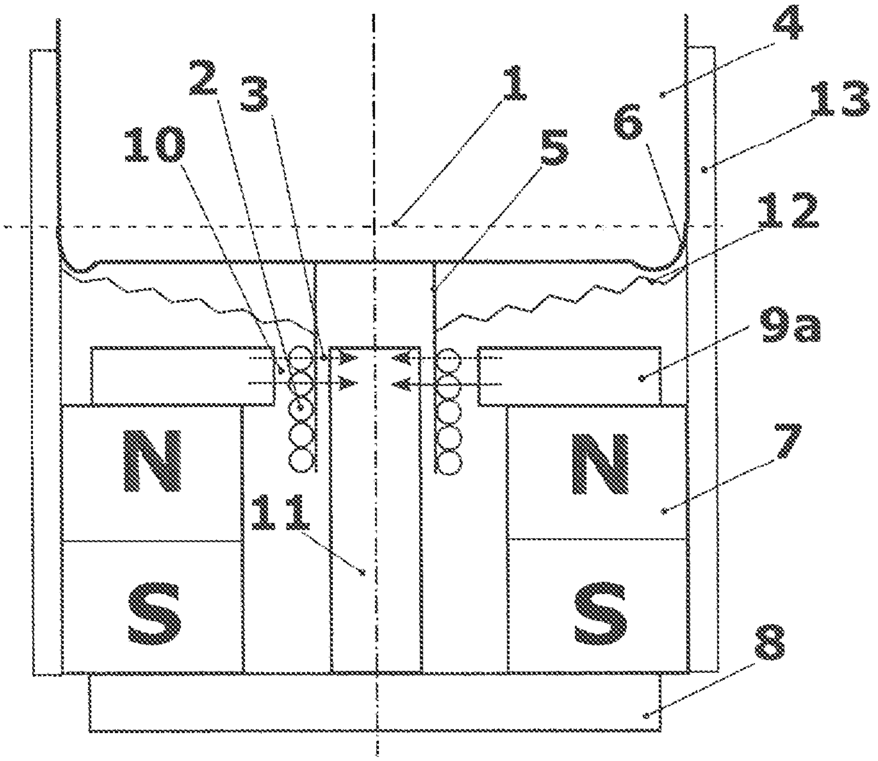
FIG. 26 is a schematic representation of an additional arrangement for a stimulation device, in which the moving coil is first moved out of a neutral rest or starting position.

In the embodiments in FIGS. 18 to 24, the mount or bracket 12, which acts as a positioning or centering device for the carrier 5 having the (moving) coil 2, is shown in a neutral starting state, in which no deflection has taken place. In contrast to this, FIGS. 25 and 26 show a design in which carrier 5 having the moving coil 2 moves from the neutral starting or zero position (cf. FIGS. 18 to 24) downward into the stationary permanent magnetic field 3. Together with the carrier 5, the movable chamber wall portion 1 is hereby moved downward. During operation, the carrier 5 having the moving coil 2 and the movable chamber wall portion 1 oscillate about the neutral rest position, starting from the deflected starting position shown in FIGS. 25 and 26. In other embodiments, in particular the examples shown in FIGS. 18 to 24, oscillations occur about this neutral starting position starting from the neutral rest position shown in FIGS. 18 to 24.

The designs in FIGS. 25 and 26 make it possible in particular to apply an electrical current with non-changing polarity to the moving coil 2 in order to operate same. By contrast, a current with changing polarity is provided in other embodiments, for example in one or more of the embodiments in FIGS. 18 to 24. During operation, embodiments other than those shown in FIGS. 25 and 26 may also be operated about a deflected position that differs from the neutral rest or starting position.

In the embodiments in FIGS. 18 to 21, the coil 2 has an upper subcoil 2*a* and a lower subcoil 2*b* with separate coil windings. In regard to the examples in FIGS. 18 and 19, the upper and lower subcoils 2*a*, 2*b* are each arranged opposite pole plates 9, wherein the permanent magnets 7 are arranged on the outside (FIG. 18) or the inside (FIG. 19) in relation to the coil 2. The design supports arranged on the inside forming an optimized magnetic inductance.

Figure 18:
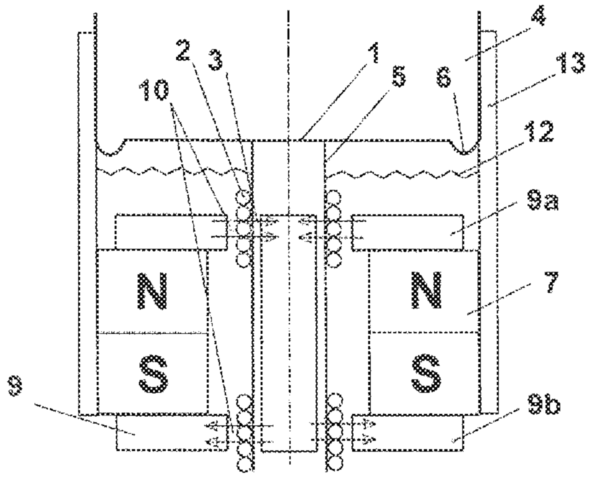
FIG. 18 is a schematic representation of an arrangement for a stimulation device, in which the coil device has separate coil windings and permanent magnets are arranged on the outside.
Figure 19:
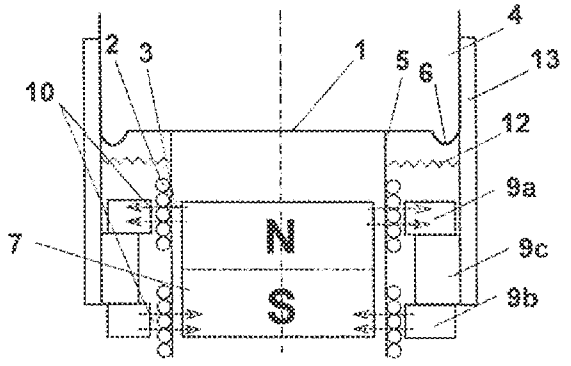
FIG. 19 is a schematic representation of an arrangement for a stimulation device, in which the coil device has separate coil windings and permanent magnets are arranged on the inside.
Figure 20:
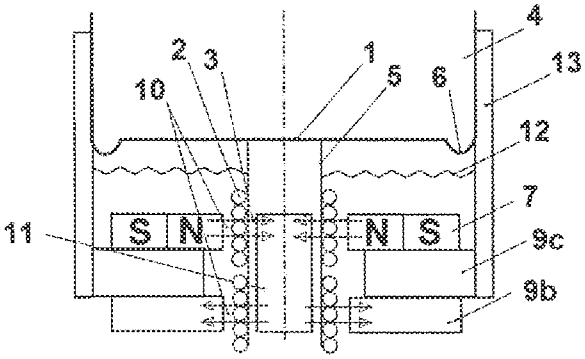
FIG. 20 is a schematic representation of an arrangement for a stimulation device, in which the coil device has separate coil windings and permanent magnets are arranged on the outside at the top.
Figure 21:
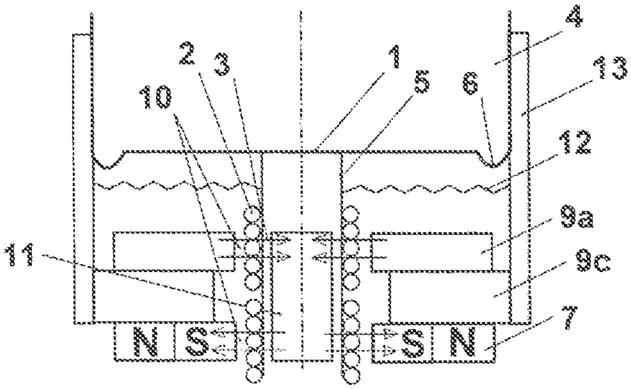
FIG. 21 is a schematic representation of an arrangement for a stimulation device, in which the coil device has separate coil windings and permanent magnets are arranged on the outside on the bottom.

Also in the examples in FIGS. 20 and 21, the permanent magnets 7 are arranged on the outside in relation to the moving coil 2. The arrangement shown there of the permanent magnets 7, which, in comparison to the embodiment in FIG. 18, are arranged instead of the upper pole cap 9*a* or the lower pole cap 9*b*, supports a flat design.

Figure 22:
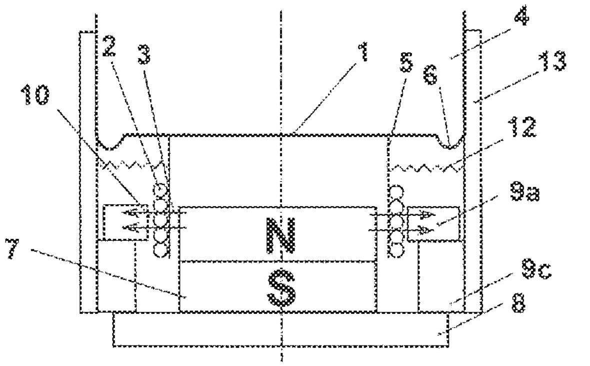
FIG. 22 is a schematic representation of an arrangement for a stimulation device, in which permanent magnets are arranged on the inside in relation to the moving coil.
Figure 23:
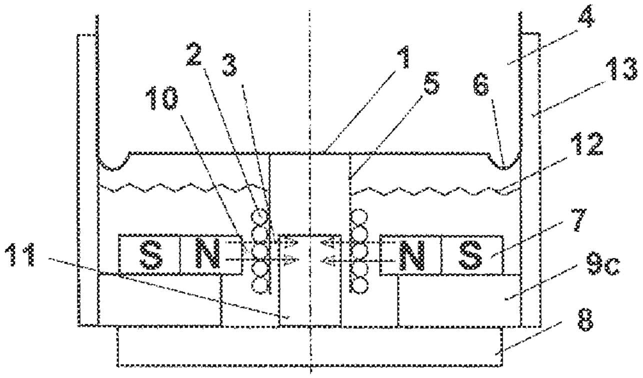
FIG. 23 is a schematic representation of an arrangement for a stimulation device, in which permanent magnets are arranged on the outside in relation to the moving coil.
Figure 24:
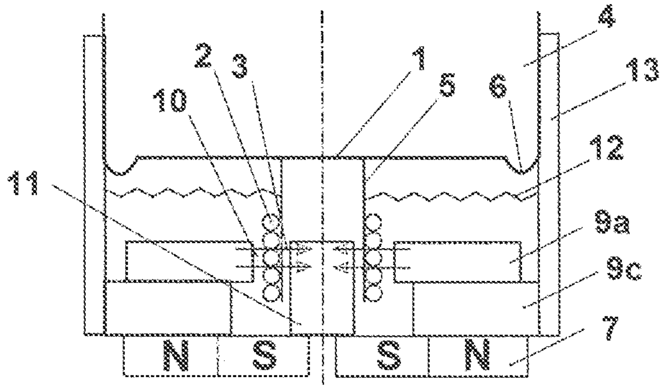
FIG. 24 is a schematic representation of an arrangement for a stimulation device, in which the permanent magnets are arranged underneath in relation to the moving coil.

In comparison to the embodiments in FIGS. 18 to 21, the designs in FIGS. 22 to 24 use a one-piece coil 2, where here, too, the permanent magnets 7 may be arranged on the inside and outside in relation to the coil 2 according to FIGS. 22 and 23. In the design in FIG. 24, the permanent magnets 7 are arranged below the moving coil 2.

In the example in FIG. 18, upper and lower pole caps 9*a*, 9*b* are provided, which are arranged above and below the permanent magnets 7. In the embodiment in FIG. 19, the upper and lower pole caps 9*a*, 9*b* are arranged above and below, and in contact with, a central pole cap 9*c*.

In the embodiments in FIGS. 25 and 26, the permanent magnets 7 are arranged between, and in contact with, the upper pole plate 9*a* and the rear pole plate 8. According to FIG. 25, a spring 40 is provided, which provides a spring pretension against the depicted deflected position of the carrier 5 having the moving coil 2. FIG. 26 depicts an alternative design, in which the spring 40 is omitted. A pretension can be provided here by means of the mount/bracket 12.

Figure 27:
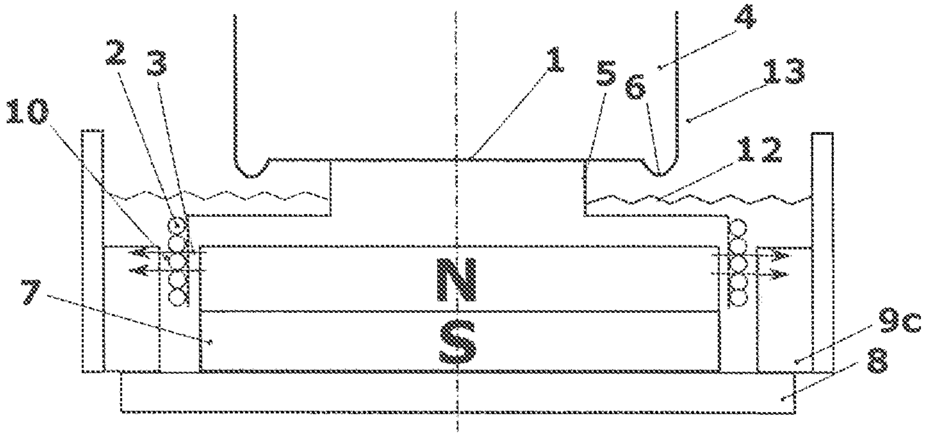
FIG. 27 is a schematic representation of a different arrangement for a stimulation device, in which the moving coil is moved from a neutral rest or starting position.

FIG. 27 depicts a design in which the coil device 2 encircles the permanent magnets 7 on the outside, in a manner comparable to the design in FIG. 22, wherein the depicted pole plates 9*c* can also be omitted as an option. In contrast to the design in FIG. 22, a regional diameter, which the coil device 2 encircles and in which the permanent magnets 7 are arranged, is greater than the diameter of the movable chamber wall portion 1. Alternatively, it may be provided (not depicted) that the regional diameter and the diameter of the movable chamber wall portion are essentially the same size. In this embodiment and others, the movable chamber wall portion 1 as well as the coil device 2 are arranged in a common central position (centered). Due to its selected structural properties, the design shown in FIG. 27 is particularly suited to execute a sufficient driving force for moving the movable chamber wall portion 1 about the (neutral) rest or starting position (in other words, rising and falling with respect to the rest and starting position) shown in FIG. 27 so that the desired variable pressure field can be generated in the small volumes.

The regional diameter, which corresponds to the diameter of the coil device 2, may be at a ratio of at least 0.3, alternatively at a ratio of at least 0.5 or 0.7, to the diameter of the movable chamber wall portion 1. For other embodiments, the ratio of the regional diameter (diameter of the coil device 2) to the diameter of the movable chamber wall portion 1 is at most 2, alternatively at most 1.8 or 1.5.

In regard to the embodiment of FIG. 27, the mount or bracket 12, which acts as a positioning or centering device for the support 5 having the (moving) coil 2, is shown in a neutral starting or rest position, in which no deflection has taken place. In contrast to this, FIGS. 25 and 26 show a design in which the support 5 having the moving coil 2 is moved out of the neutral starting or zero position (cf. FIG. 27) downward into the stationary permanent magnetic field 3.

The features disclosed in the preceding description, claims and drawings may be of significance both individually as well as in any combination for achieving the various embodiments.

The invention claimed is:

1. A device for stimulating a human erogenous zone, the device comprising:

a housing;

a drive device disposed in the housing, the drive device to provide a drive movement;

a pressure chamber disposed in the housing;

a movable wall, the drive device to cause at least a portion of the wall to repeatedly move between different wall positions to cause a volume of the pressure chamber to vary to cause pressure in the pressure chamber to modulate between positive pressures relative to an ambient pressure and negative pressures relative to the ambient pressure;

an opening fluidly connected to the pressure chamber, the positive pressures and the negative pressures to be output via the opening; and a seal proximate to the opening, the seal to seal the pressure chamber with respect to an ambient environment, the drive device including a movable coil through which an electrical current is to flow and a stationary permanent magnet, the movable coil disposed in a magnetic field of the stationary permanent magnet and coupled to the wall to transmit the drive movement to cause at least the portion of the wall to move in a direction of a coil axis of the movable coil, wherein a plane perpendicular to the coil axis extends through at least a portion of the movable coil and at least a portion of the stationary permanent magnet, wherein at least a portion of the movable coil encircles the stationary permanent magnet.

2. The device of claim 1, wherein a maximum volume of the pressure chamber is approximately 0.2 l.

3. The device of claim 1, wherein a minimum size of a diameter of the opening is approximately 5 mm and a maximum size of the diameter of the opening is approximately 50 mm.

4. The device of claim 1, wherein movement of at least the portion of the wall is to cause the volume of the pressure chamber is to increase by approximately 1% to approximately 25%.

5. The device of claim 1, wherein a minimum size of a diameter of the wall is approximately 5 mm and a maximum size of the diameter of the wall is approximately 60 mm.

6. The device of claim 1, wherein a diameter of a region defined by the portion of the movable coil encircling the stationary permanent magnet corresponds at least to a diameter of the wall.

7. The device of claim 6, wherein the diameter of the region corresponds to a diameter of the coil.

8. The device of claim 7, wherein a maximum ratio between the diameter of the region and a diameter of the wall is 2.

9. The device of claim 1, wherein at least a portion of the coil is carried by a carrier, the carrier coupled to the wall.

10. The device of claim 1, wherein movement of the wall is to cause the volume of the pressure chamber to decrease by approximately 1% to approximately 25%.

11. The device of claim 1, further including a battery to provide a drive energy for the drive device.

12. The device of claim 1, wherein the wall is rigid.

13. The device of claim 1, wherein the wall is a portion of a piston.

14. The device of claim 1, wherein the wall includes a flexible membrane.

15. A device for stimulating a human erogenous zone, the device comprising:

a housing;

a drive device disposed in the housing, the drive device to provide a drive movement;

a pressure chamber disposed in the housing;

a wall in the pressure chamber, the drive device to cause at least a portion of the wall to repeatedly move between different wall positions to cause a volume of the pressure chamber to vary to generate a variable pressure field of overpressures above an ambient pressure and underpressures below the ambient pressure;

an opening fluidly connected to the pressure chamber, the variable pressure field to be output via the opening in a form of the overpressures and the underpressures; and a seal proximate to the opening, the seal to seal the pressure chamber with respect to an ambient environment;

the drive device including a movable coil through which an electrical current is to flow and a stationary permanent magnet, the movable coil disposed in a magnetic field of the stationary permanent magnet and coupled to the wall to transmit the drive movement to cause at least the portion of the wall to move, wherein a volume ratio between a volume of the pressure chamber and an air-filled volume region of the housing on a rear side of the drive device is at most 1.

16. The device of claim 15, wherein at least a portion of the coil is carried by the wall.

17. The device of claim 15, wherein the movable coil is at least partially surrounded by the stationary permanent magnet.

18. The device of claim 15, wherein the wall is rigid.

19. The device of claim 15, wherein the wall is a portion of a piston.

20. The device of claim 15, wherein the wall includes a flexible membrane.

* * * * *